US011288666B1

(12) United States Patent
Hoffman

(10) Patent No.: US 11,288,666 B1
(45) Date of Patent: Mar. 29, 2022

(54) SYSTEM AND METHOD FOR REAL-TIME PROCESSING OF ON-LINE FINANCIAL TRANSACTIONS USING A UNIVERSAL FINANCIAL TOKEN AND A REMOTELY LOCATED RULE-MODULE CLEARINGHOUSE

(75) Inventor: Ned Hoffman, Sebastopol, CA (US)

(73) Assignee: EDGE MOBILE PAYMENTS LLC, Santa Cruz, CA (US)

( * ) Notice: Subject to any disclaimer, the term of this patent is extended or adjusted under 35 U.S.C. 154(b) by 317 days.

(21) Appl. No.: 11/305,448

(22) Filed: Dec. 15, 2005

Related U.S. Application Data

(60) Provisional application No. 60/650,367, filed on Feb. 2, 2005.

(51) Int. Cl.
*G06Q 20/40* (2012.01)
*G06F 21/34* (2013.01)
*G06Q 20/30* (2012.01)

(52) U.S. Cl.
CPC ............. *G06Q 20/40* (2013.01); *G06F 21/34* (2013.01); *G06Q 20/30* (2013.01)

(58) Field of Classification Search
USPC ..................................................... 705/50–79
See application file for complete search history.

(56) References Cited

U.S. PATENT DOCUMENTS

| | | | |
|---|---|---|---|
| 5,485,519 A | 1/1996 | Weiss | |
| 5,585,787 A | 12/1996 | Wallerstein | |
| 5,590,038 A * | 12/1996 | Pitroda | ........................... 705/41 |
| 5,613,012 A | 3/1997 | Hoffman | |
| 5,696,824 A | 12/1997 | Walsh | |
| 5,770,843 A * | 6/1998 | Rose et al. | .................... 235/380 |
| 5,802,199 A | 9/1998 | Pare, Jr. et al. | |
| 5,819,226 A | 10/1998 | Gopinathan | |
| 5,859,419 A * | 1/1999 | Wynn | ........................... 235/487 |
| 5,955,961 A | 9/1999 | Wallerstein | |
| 5,995,961 A | 11/1999 | Levy et al. | |
| 6,040,783 A * | 3/2000 | Houvener et al. | .......... 340/5.53 |
| 6,041,314 A | 3/2000 | Davis | |
| 6,164,533 A * | 12/2000 | Barton | ................... G06Q 20/04 235/379 |

(Continued)

OTHER PUBLICATIONS

"The Bank Credit Card Business", American Bankers Association, 1996, all pages.*

(Continued)

*Primary Examiner* — Jacob C. Coppola
(74) *Attorney, Agent, or Firm* — Antonio Papageorgiou; Lombard Geliebter LLP

(57) ABSTRACT

A method and a system for conducting financial transactions that include a user selecting from a plurality of proprietary financial accounts to authorize processing of a real-time, on-line electronic financial transaction using only one universal financial token and a remotely located rule-module clearinghouse. The universal financial token is a portable wireless proximity token for universal financial account access having dedicated short range contactless communications capabilities and is encoded with a user's unique user code. The rule-module clearinghouse contains at least one rule-module registered to a user which includes at least one pattern data of a user associated with at least one execution command of the user.

14 Claims, 26 Drawing Sheets

(56) References Cited

U.S. PATENT DOCUMENTS

| | | | |
|---|---|---|---|
| 6,327,578 B1* | 12/2001 | Linehan | 705/65 |
| 6,494,367 B1* | 12/2002 | Zacharias | 705/38 |
| 6,529,880 B1 | 3/2003 | McKeen | |
| 6,547,040 B2 | 4/2003 | Goodwin, III | |
| 6,631,358 B1* | 10/2003 | Ogilvie | G06Q 10/10 705/35 |
| 6,685,088 B1 | 2/2004 | Royer et al. | 235/380 |
| 6,732,919 B2 | 5/2004 | Macklin | |
| 6,950,949 B1* | 9/2005 | Gilchrist | 726/19 |
| 7,096,198 B1 | 8/2006 | Cuervo | |
| 7,191,150 B1 | 3/2007 | Shao | |
| 7,346,775 B2* | 3/2008 | Gasparinl et al. | 726/10 |
| 7,401,731 B1* | 7/2008 | Pletz et al. | 705/44 |
| 7,702,538 B2* | 4/2010 | Rau et al. | 705/21 |
| 2001/0011250 A1* | 8/2001 | Paltenghe et al. | 705/41 |
| 2001/0029493 A1 | 10/2001 | Pare, Jr. et al. | |
| 2001/0034720 A1* | 10/2001 | Armes | 705/65 |
| 2001/0039533 A1* | 11/2001 | Pare et al. | 705/39 |
| 2002/0026575 A1* | 2/2002 | Wheeler et al. | 713/156 |
| 2002/0062249 A1* | 5/2002 | Iannacci | 705/14 |
| 2002/0091635 A1 | 7/2002 | Dilip | |
| 2002/0111917 A1 | 8/2002 | Hoffman | |
| 2002/0128981 A1 | 9/2002 | Kawan | |
| 2002/0147653 A1 | 10/2002 | Shmueli | |
| 2003/0061157 A1* | 3/2003 | Hirka et al. | 705/39 |
| 2003/0061503 A1* | 3/2003 | Katz et al. | 713/200 |
| 2004/0002894 A1* | 1/2004 | Kocher | 705/13 |
| 2004/0010462 A1* | 1/2004 | Moon et al. | 705/39 |
| 2004/0044627 A1* | 3/2004 | Russell et al. | 705/50 |
| 2004/0093281 A1 | 5/2004 | Silverstein | |
| 2004/0128249 A1 | 7/2004 | Hoffman | |
| 2004/0206814 A1 | 10/2004 | Kawai | |
| 2004/0225880 A1* | 11/2004 | Mizrah | 713/155 |
| 2004/0232225 A1 | 11/2004 | Bishop | |
| 2004/0238620 A1 | 12/2004 | Cohagan | |
| 2005/0004866 A1 | 1/2005 | Bonalle | |
| 2005/0015332 A1 | 1/2005 | Chen | |
| 2005/0033688 A1 | 2/2005 | Peart | |
| 2005/0125343 A1* | 6/2005 | Mendelovich | 705/39 |
| 2005/0144133 A1* | 6/2005 | Hoffman et al. | 705/50 |
| 2005/0171898 A1* | 8/2005 | Bishop et al. | 705/39 |
| 2005/0177521 A1 | 8/2005 | Crosson Smith | |
| 2005/0193198 A1* | 9/2005 | Livowsky | 713/168 |
| 2005/0246728 A1 | 11/2005 | Cundiff et al. | |
| 2006/0064372 A1 | 3/2006 | Gupta | |
| 2006/0143441 A1* | 6/2006 | Giobbi | 713/155 |
| 2007/0067642 A1* | 3/2007 | Singhal | 713/186 |

OTHER PUBLICATIONS

Muller, "Desktop Encyclopedia of the Internet", 1999, Artech House Inc., Norwood, MA, all pages.*
Gralla, "How the Internet Works", Millennium Edition, 1999, Que Corporation, Indianapolis, IN, all pages.*
White, "How Computers Work", Millennium Edition, 1999, Que Corporation, Indianapolis, IN, all pages.*
Derfler, "How Networks Work", Bestseller Edition, 1996, Ziff-Davis Press, Emeryville, CA, all pages.*
Rankl et al., "Smart Card Handbook," Second Edition, 2000, Wiley & Sons, all pages.*
White, Ron, How Computers Work, 7th Ed., Que Corporation, Oct. 15, 2003.*
Derfler, Frank J. et al. How Networks Work, Millennium Ed., Que Corporation, Aug. 23, 2000.*
Gralla, Preston, How the Internet Works, 7th Ed., Que Corporation, Sep. 12, 2003.*
Strunk et al., "The Elements of Style," Third Edition, 1979, MacMillan Publ. Co., Inc., New York, NY, all pages.*
U.S. Appl. No. 09/737,277, filed Feb. 28, 2002, Wallerstein.
U.S. Appl. No. 10/192,488, filed Mar. 11, 2004, Michael J. Berardi.
U.S. Appl. No. 09/737,277, filed Feb. 28, 2002, Michael L. Maritzen.
U.S. Appl. No. 09/895,795, filed Mar. 7, 2002, Akira Ishibashi.

* cited by examiner

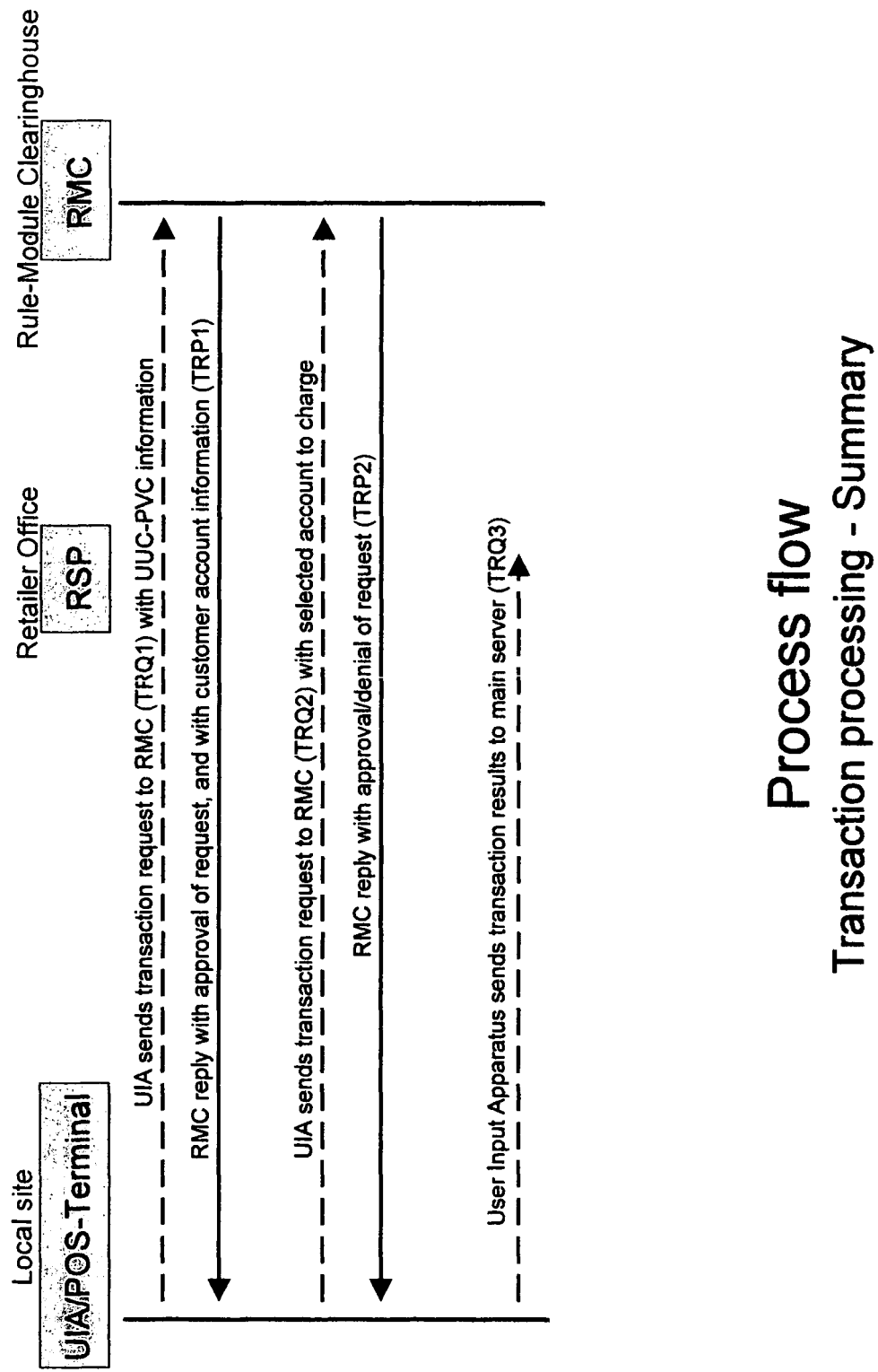

SYSTEM AND METHOD FOR REAL-TIME PROCESSING OF ON-LINE FINANCIAL TRANSACTIONS USING A UNIVERSAL FINANCIAL TOKEN AND A REMOTELY LOCATED RULE-MODULE CLEARINGHOUSE

CROSS-REFERENCE TO RELATED APPLICATIONS

This application claims the benefit of provisional patent application Ser. No. 60/650,367, filed on Feb. 2, 2005, which is incorporated herein by reference.

FIELD OF THE INVENTION

The invention relates generally to computer methods and systems to electronically process on-line financial transactions. More specifically, this invention relates to processing on-line financial transactions using: a universal financial wireless proximity token capable of dedicated short range contactless communications, and; a remotely located Rule-Module Clearinghouse.

BACKGROUND OF THE INVENTION

Electronic financial transaction systems have become a popular part of retail point of sale and internet commerce. Currently, over $3 trillion in commercial exchanges occur in the United States annually using electronic financial transaction systems, including transactions involving credit, debit, stored value, electronic check, electronic benefits transfer, scrip, and reward incentives.

A financial transaction is any electronic transfer of financial data having a predetermined monetary or monetary-equivalent unit value which is legal tender or a legal tender-equivalent, and which is honored by a financial administrator, such that a user's purchase, expenditure or usage of these units results in the user's purchase or sale of goods, services or currency involving a financial administrator. As used herein, financial data may be actual tender in the form of gift certificates, stored-value cards or paper coupons having a pre-determined dollar value. As such, each unit of financial data has a tender or real face value when used with the participating financial administrator. Financial data can also include minutes of telephone calling time, miles towards earning a free airplane flight, points towards a gallon of gas, and the like. A financial administrator is defined herein as any of the following: a bank, a merchant, a scrips provider, credit account organization, a government agency, an insurance company, a brokerage firm, a reward incentives provider, a services barter provider, a product barter provider, an internet payment provider. A financial account, storing related financial data, resides with a financial administrator if said financial administrator has the primary responsibility to directly administer, operate, adjust, and reconcile the financial data within the user's financial account.

Currently, financial transaction systems primarily rely on two types of token-based systems. First, most systems now use magnetic stripe cards, which can accommodate a user's on-line transactions with only one predetermined bank account for a debit or credit transaction. In this case, the bank logo or bank name on the front of the card denotes the designated bank or credit account with which the card can communicate as a function of the data encoded on the card's magnetic stripe. During a financial transaction, these magnetic stripe cards communicate on-line with the bank's remote platforms to determine available resources in the user's card-designated financial account, and to adjust the user's financial account as a function of the financial transaction being conducted.

The known problems with these magnetic stripe cards are largely two-fold: first, since each card can only communicate with one predetermined financial account of the user, the user is required to carry and use multiple cards, which is both expensive and cumbersome. The expense, due to the high costs of card manufacture, distribution, replacement and related security procedures, is borne by banks, and ultimately by merchants and consumers. Meanwhile, the cumbersome requirement to carry and manage multiple cards is familiar to every user who relies upon them. The average user has over 5 cards, and tens of millions of consumers have 10 or more.

The technology inherent in magnetic stripe cards has other costly and cumbersome limitations which are known to consumers, retailers, and banks alike. The additional cost is due to several factors: the magnetic stripe on the card can easily be de-magnetized or simply wear out, requiring a costly replacement; also, the magnetic stripe card readers themselves usually fail within less than 5 years from the repeated wear of reading the card magnetic stripes which are swiped through the reader, requiring expensive replacements. Further, the cumbersome process of using a magnetic stripe card during a financial transaction can be time-consuming and irritating: the user must first select and locate the card from amongst the several they usually carry; then, swiping the card through the reader can require repetition since the magnetic stripe may not be read the first or second time. Sometimes, users or retail personnel wipe the card on clothing, or wrap it in the thin plastic of a disposable bag to enhance the readability of the magnetic stripe. This delay also has real costs for retailers, which can lose the sale or delay processing other customers in line, slowing the "through-put" of selling products.

Beyond the magnetic stripe card, the second token-based system used in financial transactions is the smart card, which is embedded with a memory chip. In this instance, most of the financial account data is encoded within the card itself, and the financial transaction is processed off-line, with communications being confined directly between the user's smart card and the smart card reader into which is has been inserted. Here, no long distance computer- or tele-communications networks are used. The advantages of the smart card, as promoted by their manufacturers, is that an off-line transaction is faster, more secure and less costly than an on-line transaction. In addition, promoters say the smart card is capable of being encoded with multiple financial accounts of a user, thereby potentially relieving the user of having to carry any other token for financial transactions. Almost uniformly, prior art disclosing smart card financial transaction systems focus on ever-more complex smart cards to broaden applications of off-line transactions, or increasing the anti-fraud components of a token. Reasons cited in such teachings for using smart card transactions range from attempts to further limit transaction communications costs, increase transaction speed, and diminish dependence on potentially unreliable or insecure computer networks.

However, the problems with smart cards are also now known, and their adoption as a result has been limited. First, the significantly higher costs of smart card manufacture, distribution, replacement and related security procedures have made this token about 2 to 3 times more expensive than the magnetic stripe card. Second, the smart card's chip security has proven ineffective, as evidenced by experiments wherein 2 smart cards exchanged data with each other after simply being placed in a standard kitchen microwave oven. Third, with the plummeting costs of on-line telecommunications and computer networks, and the vast advances in on-line infrastructure stability, security and reliability, the off-line transaction no longer provides a material cost, time, or security advantage over on-line financial transactions. For these reasons, on-line transactions have remained the dominant and growing modality, with expanding capabilities in centralized and scalable improvements for broad-based, on-line financial transaction processing.

New portable wireless proximity tokens employing dedicated short range contactless communications, including radio frequency identification and infrared beams, have emerged as a new technology which has advantages beyond the traditional smart cards and magnetic stripe cards. However, most dedicated short range contactless communications tokens are dedicated to basic inventory tracking. In rare instances, a dedicated short range contactless communications token has been used to perform a very limited single-payment function, such as a dedicated short range contactless communications key fob permitting the user to buy only one brand of gas using a credit account proprietary to that branded gas company.

In view of the foregoing, there has long been a need for a new financial transaction system wherein one single token possesses the on-line capabilities to access a remotely located, centrally administered Rule-Module Clearinghouse for aggregating the management and accessibility of all of the financial accounts of a user. Further, there is a need for a new system that ensures user convenience by relieving the user of the cumbersome dependence on multiple tokens, all of which the user would otherwise be required to possess, carry, and manage in order to access any account at any particular time from any location. There is also a need for a new financial transaction system which dispenses with the functional limitations, and costly security and technologic vulnerabilities of, a system depending on off-line smart cards which otherwise would be needed for aggregating multiple financial account access via a single token.

There is further a need for a new on-line financial transactions system to uniquely capitalize on low-cost, durable, extended-use, energy-efficient PWP tokens which provide simple, reliable, fast, and convenient dedicated short range contactless communications capabilities, such as radio frequency identification (RFID), infrared beams, and similarly beneficial, short-range transmittal technologies which consume minimal energy to emit frequencies detectable within a short range of the token. Further still, there is a need for a new system: a) that uses only one such a portable wireless proximity token, to enable universal financial account access, so that a user can access any financial account from any place at any time, and; b) that requires a user's active assent for authorizing each financial transaction by way of submitting a personal verification code.

There is further a need for a new on-line financial transactions system which does not depend wholly on UUCs, as a UUC can be severely damaged, or fraudulently captured and duplicated, thereby becoming permanently compromised, since a UUC cannot be replaced or re-programmed. By contrast, a token-based system holds the inherent advantage that a compromised, damaged or lost token can indeed simply be replaced or re-programmed. Further, a portable wireless proximity device, embedded in a ubiquitous token like a wrist watch, cell phone or personal digital assistant, offers the added convenience of being part of a device that one would normally carry in most activities anyway.

In addition, there is a need for a financial transaction system that can accommodate a user's universal access to the user's financial accounts during any temporary period wherein the user's token may be rendered inactive or functionally comprised.

Lastly, such a system must be affordable and flexible enough to be operatively compatible with existing networks having a variety of electronic transaction devices and financial system configurations.

Objectives and Advantages of the Invention

Accordingly, it is the objective of the present invention to provide a new system and method of token-based financial transactions which address the above needs and provide benefits to user and financial administrators alike.

As such, the objectives of this invention are to provide a new on-line electronic financial transaction method and system comprising advantages that include:

a) One single token possesses the capability to universally access a remotely located Rule-Module Clearinghouse anytime and anywhere, which centrally aggregates and administers the management, modifications and accessibility of all of the financial accounts of a user;

b) This portable universal financial access token uses wireless proximity capabilities for short range, contactless transmissions, which are faster, more reliable and more durable than contact tokens, like smart cards and magnetic stripe cards.

c) The on-line technology advances and cost reductions in computer and telecommunications networks, including capabilities for electronically distributing downloadable upgrades to transaction hardware in the field;

d) The user is relieved of the cumbersome dependence on multiple tokens, all of which the user would otherwise be required to possess, carry, and manage in order to access any account at any particular time from any location;

e) The user is freed from the functional limitations, and costly security and technologic vulnerabilities of, a system depending on off-line smart cards which otherwise would be needed for aggregating access to multiple financial accounts via a single token;

f) Capitalizing on advances in low-cost, durable, extended-use, energy-efficient tokens which provide simple, reliable, fast, and convenient communications capabilities—namely, portable wireless proximity tokens using contactless radio frequency identification (RFID), infrared beams, and similarly beneficial, short-range transmittal technologies which consume minimal energy to emit frequencies detectable within a short range of the token. This low cost universal access token having long-lasting power storage can be a stand alone unit, or can be embedded within a portable token having other functions, such as a cell phone;

g) The user's active assent for authorizing each financial transaction is required by way of submitting a personal verification code, so that inadvertent or fraudulent financial transactions are avoided, and any security lapse can be rapidly adjusted with a simple change to the personal verification code;

h) The user retaining universal financial account access even during any temporary period wherein the user's token may be rendered inactive or functionally comprised;

i) The system being affordable and flexible enough to be operatively compatible with existing networks having a variety of electronic transaction devices and financial system configurations, which are convenient, secure and cost-effective;

j) Functioning at the retail point of sale and over the internet;

k) Being added in a simple and cost-effective manner to existing Terminals currently installed at points of sale and used over the internet.

Still further objectives and advantages of this invention will become apparent from a consideration of the ensuing description and drawings.

SUMMARY OF THE INVENTION

The present invention satisfies these needs by providing an improved system and method for real-time processing of on-line financial transactions using a universal financial token and a remotely located rule-module clearinghouse.

The invention describes a method comprising: a) a user rule-module registration step, wherein a rule-module is registered to a user within a rule-module clearinghouse, said registration rule-module further comprising at least one pattern data of a user associated with at least one execution command of the user; b) a universal financial token encoding step, wherein a portable wireless proximity token for universal financial account access having dedicated short range contactless communications capabilities is encoded with a user's unique user code; c) a user verification step, comprising electronic transmittal of a user's bid verification data to a verification platform for producing a matching determination to verify a user's authorization to access the rule-module clearinghouse, and; d) a financial account access step, whereupon the issuance of a positive matching determination by the verification platform, the user is authorized to invoke a rule-module registered to the user within the rule-module clearinghouse, to access a plurality of proprietary financial accounts of a user, from which the user can select for real-time processing of an on-line financial transaction; whereby, a user selects from a plurality of proprietary financial accounts to authorize processing of a real-time, on-line electronic financial transaction using a universal financial token and a rule-module clearinghouse.

In another embodiment of the method of the invention, the method further comprises a rule-module modification step, wherein a user's rule-modules can be modified by any of the following parties as authorized by the rule-module clearinghouse: the user; the rule-module clearinghouse; a financial institution; and a third-party with predetermined authorization.

In another embodiment of the method of the invention, the rule-module modification comprises any of the following: registering, deleting, and adding pattern data; registering, deleting, and adding execution commands; registering, deleting and adding associations between pattern data and execution commands.

In a preferred embodiment of the method of the invention, a user's registration rule-module further comprises any of the following pattern data of the user: the user's legal name, private code, a driver's license number, a unique user code, a personal verification code, a secondary personal verification code, an emergency alert code, a plurality of proprietary financial accounts, predetermined criteria for simultaneously accessing a plurality of proprietary financial accounts, demographic information, an email address, social security number, a mother's maiden name, a biometric sample, a facial photogragh, Internet browsing patterns, a telephone number, a mailing address, purchasing patterns, authorized subordinated users, authorized subordinated user authorization fields, data on pre-paid accounts or memberships for products or services, electronic data usage patterns, employee status, job title, data on user behavior patterns, a digital certificate, a network credential, an Internet protocol address, a digital signature, an encryption key, an instant messaging address, personal medical records, an electronic audio signature, and an electronic visual signature, financial account access authorization fields.

In a preferred embodiment of the method of the invention, the method further comprises a user bid verification data gathering step, wherein the user's bid verification data is gathered directly from the user by a user input apparatus during real-time processing of the financial transaction.

In a preferred embodiment of the method of the invention, the bid verification data further comprises any of the following data gathered in real-time during processing of the financial transaction by the user input apparatus: the user's bid unique user code as scanned directly from the user's universal financial token using the dedicated short range contactless communications capabilities; the user's personal verification code as gathered directly by the user; the user's secondary personal verification code as gathered directly by the user.

In a preferred embodiment of the method of the invention, the method further comprises the user's unique user code being provided to the clearinghouse's verification platform.

In a preferred embodiment of the method of the invention, the user verification step further comprises the clearinghouse's verification platform electronically comparing the user's bid unique user code and the user's bid personal verification code with a user's registration unique user code and a user's registration private verification code to output a matching determination of the user's authority to access the rule-module clearinghouse.

In another embodiment of the method of the invention, upon a positive matching determination, the verification platform outputs a verification approval code for the user to access the rule-module clearinghouse using predetermined authorization fields for any of the following: access to rule-modules in the rule-module clearinghouse; access to financial accounts; subordinated account user authority; access to third-party computers accessed by the rule-module clearinghouse.

In another embodiment of the method of the invention, upon a positive matching determination of a user's authority to access the rule-module clearinghouse, at least one registered rule-module of the user is invoked.

In another embodiment of the method of the invention, upon making a positive matching determination, the verification platform issues a verification approval code to invoke at least one registered rule-module of the user in the rule-module clearinghouse.

In another embodiment of the method of the invention, the unique user code comprises any of the following: a dynamic code which changes periodically based on predetermined criteria synchronized with the verification platform, and; a static code which remains constant based on a predetermined code synchronized with the verification platform.

In another embodiment of the method of the invention, the user's personal verification code comprises any alpha-numeric sequence selected by any of the following: the user, the rule-module clearinghouse.

In another embodiment of the method of the invention, the method further comprises a unique user code theft resolution step, wherein if the user's unique user code has been compromised, any of the following occurs: the user's personal verification code is changed, and; a new unique user code is encoded into the user's universal financial token.

In another embodiment of the method of the invention the method further comprises a personal verification code theft resolution step, wherein if the user's personal verification code has been compromised, any of the following occurs: the user's personal verification code is changed, and; a new unique user code is encoded into the user's universal financial token.

In another embodiment of the method of the invention, the user verification step further comprises a rule-module clearinghouse fraud detection step, wherein predetermined criteria by a fraud prevention platform are invoked for detecting fraudulent usage patterns usage of any of the following: a user's bid verification data; modifications to a user's rule-modules, and; a user's financial account access.

In another embodiment of the method of the invention, the method further comprises a fraud prevention registration step, whereupon a determination by the rule-module clearinghouse that the user has committed fraud prior fraud involving the rule-module clearinghouse, any of the following data of the user is registered with the fraud prevention platform: pattern data of the user, execution commands of the use, rule-modules of the user.

In another embodiment of the method of the invention, the method further comprises a rule-module clearinghouse verification step, wherein a private code, registered to the user, distinct from a user's personal verification code and not used in a user verification step, is transmitted to the user input apparatus from the rule-module clearinghouse for presentation to the user during processing of a financial transaction to verify to the user that the authentic rule-module clearinghouse has been accessed.

In another embodiment of the method of the invention, the private code is registered to the user in the rule-module clearinghouse by any of the following: the user, and; the rule-module clearinghouse.

In another embodiment of the method of the invention, the method further comprises a user emergency alert step, wherein an emergency code, registered to the user, distinct from a user's personal verification code and not used in the user verification step, is gathered from the user by the user input apparatus and transmitted to the rule-module clearinghouse to alert the rule-module clearinghouse of any of the following: that the user's bid verification data has been compromised; that the user's universal financial token has been compromised, and; that the user has been coerced to access the rule-module clearinghouse.

In another embodiment of the method of the invention, the user's universal financial token has been deemed compromised in the event of any of the following: loss, damage, and fraudulent duplication.

In another embodiment of the method of the invention, the emergency code comprises any of the following predetermined data: an alpha-numeric code, a visual icon, an audio output.

In another embodiment of the method of the invention, the emergency alert step further comprises execution by the rule-module clearinghouse of any of the following: transmittal to the user input apparatus of a visual output for display to the user of false account access; transmittal to the user input apparatus of an audio output for presentation to the user of a false account access; transmittal to a emergency authority of said emergency alert to invoke assistance for the user; cancellation of the user's unique user code; cancellation of the user's personal verification code.

In another embodiment of the method of the invention, the visual output presents to the user via the user input apparatus any of the following predetermined displays of data: a false financial account; a false limitation of resources in a financial account, confirmation of a emergency authority having been contacted.

In another embodiment of the method of the invention, the audio output presents to the user at the user input apparatus any of the following predetermined audible data: a false financial account; a false limitation of resources in a financial account, confirmation of a emergency authority having been contacted.

In another embodiment of the method of the invention, if the rule-module clearinghouse is notified that the user's unique user code has been compromised, the rule-module clearinghouse invokes the user's authority to submit the user's secondary personal verification code as an alternative to the user's unique user code during the user verification step based upon any of the following predetermined criteria for purposes of making a matching determination of the user's authorization to access the rule-module clearinghouse: limited time period for using the secondary personal verification code; limited financial account access when using the secondary personal verification code; limited frequency for usage for using the secondary personal verification code, and; limited geography for using the secondary personal verification code.

In another embodiment of the method of the invention, the secondary personal verification code comprises any of the following data gathered directly from the user by the user input apparatus during real-time processing of the financial transaction: an alpha-numeric code, and; an electronically scanned biometric sample.

In another embodiment of the method of the invention, the user verification step further comprises the verification platform electronically comparing the user's bid personal verification code and the user's bid secondary personal verification code with a user's registration personal verification code and a user's registration secondary personal verification code to output a matching determination of the user's authority to access the rule-module clearinghouse.

In another embodiment of the method of the invention, a financial transaction comprises any of the following internet or point-of-sale based transactions: credit, debit, scrip, rewards, echeck, private label, stored value, brokerage, automated surcharge based on predetermined criteria, electronic benefits transfer, buyer-seller exchange wherein a user's financial account balance is adjusted and a financial administrator's financial account is correspondingly adjusted, an user's intra-account transfers between financial accounts of the user without a buyer-seller exchange.

In another embodiment of the method of the invention, financial account access comprises any of the following electronic functions pertaining to at least one proprietary financial accounts: querying data related to a financial account; retrieving data from a financial account; communicating with a third-party computer to query data related to a financial account; communicating with a third-party computer to retrieve data from a financial account; presenting the user with a visual display, or an audio output via the user input apparatus; adjusting the balance in a financial account by making a credit to a financial account or making a debit from a financial account.

In another embodiment of the method of the invention, upon a positive matching determination of the user by the verification platform, the rule-module clearinghouse uses computer software and hardware to invoke a registered rule-module of the user based upon predetermined criteria to enable real-time simultaneous access to a plurality of proprietary financial accounts during processing of the financial transaction.

In another embodiment of the method of the invention, the user verification step further comprises a user facial photograph display step, whereupon if the verification platform makes a positive matching determination that the user is authorized to access the rule-module database, the rule-module clearinghouse transmits the user's registered facial photograph for display by the user input apparatus to enable a third-party present in real-time during the financial transaction, to visually compare the user's actual with the user's displayed facial photograph.

In another embodiment of the method of the invention, the user input apparatus is encoded with a unique hardware identification code previously registered with the rule-module clearinghouse, said unique hardware identification code being used by the verification platform of the rule-module clearinghouse to verify authenticity of any of the following: the user input apparatus; the financial administrator owning the user input apparatus; the geographic location of the user input apparatus; the demographic data associated with the users of the user input apparatus; upgrade software which the rule-module clearinghouse can download to the user input apparatus.

In another embodiment of the method of the invention, the method further comprises a financial administrator registration step, wherein a financial administrator registers at least one rule-module with the rule-module clearinghouse.

In another embodiment of the method of the invention, a financial administrator's registration rule-module further comprises any of the following pattern data of the financial administrator: the financial administrator's legal name, a user input apparatus hardware verification code, an employer identification number, financial account access authorization fields, a unique clearinghouse access code, a financial administrator verification code, an emergency alert code, a financial account, an email address, a telephone number, a mailing address, authority of at least one employee of the financial administrator, a digital certificate, a network credential, an Internet protocol address, a digital signature, an encryption key, electronic audio signature, and an electronic visual signature.

In another embodiment of the method of the invention, the financial administrator's registration rule-module further comprises execution commands for invoking any of the following: accessing a user's financial account, processing a user's financial transaction; presentation of selected data from user's rule-module data; notification of a emergency authority of predetermined criteria resultant from the rule-module clearinghouse receiving the user's emergency alert code.

In another embodiment of the method of the invention, the method further comprises a financial administrator verification step, whereupon during the financial account access step, the verification platform receives bid verification data from a financial administrator in real-time during the financial transaction, and makes determination whether the financial administrator is an authorized registrant of the rule-module clearinghouse.

In another embodiment of the method of the invention, the bid verification data comprises any registered pattern data of the financial administrator which enables the verification platform to verify that the financial administrator is an authorized registrant of the rule-module clearinghouse.

In another embodiment of the method of the invention, if the verification platform makes a positive matching determination of the financial administrator's authority to access the rule-module clearinghouse, any of the following predetermined authorization fields of financial administrator are invoked: restricted access to rule-modules in the rule-module clearinghouse; acceptance of a subordinated account user; access to third-party computers being accessed by the rule-module clearinghouse.

In another embodiment of the method of the invention, upon a positive matching determination of a financial administrator's authority to access the rule-module clearinghouse, at least one registered rule-module of the financial administrator is invoked.

In a preferred embodiment of the method of the invention, upon making a positive matching determination, the verification platform issues a verification approval code to invoke at least one registered rule-module of the user in the rule-module clearinghouse.

In another embodiment of the method of the invention, the method further comprises a fraud prevention registration step, whereupon if a determination is made by the rule-module clearinghouse that the financial administrator has committed fraud prior fraud involving the rule-module clearinghouse, at least one of any of the following data of the financial administrator is registered with the fraud prevention platform: pattern data; execution command, and; rule-module.

In a preferred embodiment of the method of the invention, a platform is a computer-based set of related data that can be electronically processed in any of the following ways with software using predetermined criteria associated with the rule-module clearinghouse: data storage, data queries, data retrieval and data modification.

In a preferred embodiment of the method of the invention, the rule-module clearinghouse is remotely located from the user input apparatus.

In a preferred embodiment of the method of the invention, wherein the rule-module clearinghouse is remotely located from the user input apparatus during real-time, on-line processing of the financial transaction.

In a preferred embodiment of the method of the invention, a plurality comprises at least two.

In a preferred embodiment of the method of the invention, a proprietary financial account comprises a financial account distinguishable from at least one other financial account because the respective accounts reside with different financial administrators.

In a preferred embodiment of the method of the invention, the plurality of proprietary financial accounts are rendered simultaneously accessible as a function of using the rule-module clearinghouse.

In another embodiment of the method of the invention, wherein the plurality of proprietary financial accounts are rendered simultaneously accessible solely as a function of using the rule-module clearinghouse.

In another embodiment of the method of the invention, during the financial account access step, financial transaction data comprising any of the following is transmitted to the rule-module clearinghouse: pricing information, a list of goods and services, payee verification data, financial administrator verification data, a date or time, a location, and an invoice number, transaction settlement data.

In another embodiment of the method of the invention, the payee and the financial administrator are identical.

In another embodiment of the method of the invention, the financial account access step further comprises a financial transaction settlement step comprising any of the following: an immediate adjustment to the balance of the user's financial account; a predetermined time delay in the adjustment to the balance of the user's financial account such as 30-day net settlement terms.

In a preferred embodiment of the method of the invention, a financial account resides with a financial administrator if said financial administrator has the primary responsibility to directly administer, operate, adjust, and reconcile the financial data within the user's financial account.

In a preferred embodiment of the method of the invention, a financial administrator comprises any of the following: a bank, a merchant, a scrips provider, credit account organization, a government agency, an insurance company, a brokerage firm, a reward incentives provider, a services barter provider, a product barter provider, an internet payment provider.

In a preferred embodiment of the method of the invention, the financial account comprises any computerized account which stores financial data having a predetermined monetary or monetary-equivalent unit value which is legal tender or a legal tender-equivalent, the use of which comprises any of the following: the purchase, the exchange, and the accrual of currency, products or services.

In a preferred embodiment of the method of the invention, wherein the financial account further comprises any of the following: a bank checking account, a credit account such as Visa®, MasterCard® or American Express®, a reward incentives account, an insurance account, brokerage account, a savings account, a scrip account, a pre-paid account, a checking account, a private label credit account, a services barter account, a product barter account, an internet payment account.

In another embodiment of the method of the invention, the reward incentives and scrip accounts comprise any of the following: gift certificates; stored-value units; electronic or paper coupons having a predetermined monetary value; minutes of telephone calling time; miles towards earning a free airplane flight, and; accruing units of a predetermined monetary value towards receiving a commodity or service.

In a preferred embodiment of the method of the invention, the financial account access step further comprises a financial account presentation step, wherein the rule-module clearinghouse retrieves data from a plurality of proprietary financial accounts of the user, transmits said retrieved data to the user input apparatus for electronic presentation to the user via the user input apparatus in real-time during transaction processing, for the user to select a financial account for processing the financial transaction, wherein said presentation comprises any of the following: a visual display, and an audio output.

In another embodiment of the method of the invention, the method further comprises a proprietary financial account ranking step, wherein within the rule-module clearinghouse, a plurality of proprietary financial accounts are tagged and ranked in an order based on predetermined criteria.

In another embodiment of the method of the invention, the predetermined criteria for ranking the financial accounts further comprises any of the following: improving transaction benefits to a financial administrator, and; improving transaction benefits to the user.

In another embodiment of the method of the invention, improving transaction benefits further comprises any of the following: increasing efficiency; increasing speed; increasing profit; increasing security; decreasing cost; increasing reward incentives, and; impact on a financial transaction surcharge.

In another embodiment of the method of the invention, the ranked financial accounts are electronically presented to the user via the user input apparatus in any of the following visual displays, wherein any one of said ranked financial accounts may be accepted or declined by the user for processing the transaction: a plurality of financial accounts displayed simultaneously, with visually displayable indicators for the respective rankings of the financial accounts, and; a plurality of financial accounts displayed in sequence as a function of their respective rankings.

In another embodiment of the method of the invention, the electronic visual signature is in the form of an electronic visual image comprising at least one of the following: streaming media, a video clip, a moving image, a holographic display, a graphical display, an alpha-numeric display, a textual display.

In another embodiment of the method of the invention, the ranked financial accounts are electronically presented to the user via the user input apparatus in a sequence of audio outputs reflecting the respective rankings of the financial accounts, and any one of said financial accounts may be accepted or declined by the user for processing the transaction.

In another embodiment of the method of the invention, the electronic audio signature is in the form of an form of an audio sound wave comprising any of the following: a musical fragment, speech, phonation, or a song.

In another embodiment of the method of the invention, the transaction surcharge adds a predetermined additional financial amount to the user's financial transaction, which is then debited from the financial account selected by the user for processing the transaction, and credited to a different financial account.

In another embodiment of the method of the invention, wherein the surcharge comprises any of the following: a fixed financial amount; a fixed percentage of the financial transaction, and; a variable financial amount.

In another embodiment of the method of the invention, the variable financial amount comprises a formula which calculates the surcharge as a function on any of the following: the user's income; the financial amount of the transaction; time; the user's purchasing frequency; a balance in a financial account of the user; an economic indicator, and; a predetermined financial objective of the user.

In another embodiment of the method of the invention, an invoked execution command causes execution of any of the following: accessing a user's financial account; processing a user's financial transaction; presenting a plurality of proprietary financial accounts of the user; settlement of a user's financial transaction; presentation of a user's rule-module data based upon predetermined criteria; notification of a emergency authority of predetermined criteria resultant from the rule-module clearinghouse receiving the user's emergency alert code.

In another embodiment of the method of the invention, the financial account access step further comprises a third-party access step, wherein during the, the rule-module clearinghouse communicates with one or more third-party computers for any of the following: user verification fraud detection; emergency alert; emergency authority notification; financial account access; financial account settlement, and; processing the financial transaction.

In another embodiment of the method of the invention, the financial account access step further comprises a resource verification step, whereupon the user's selection of a financial account, it is electronically determined if the user's financial account has sufficient resources for settlement of the financial transaction.

In another embodiment of the method of the invention, the method further comprises a financial transaction settlement step, whereupon the financial balance in user's selected financial account is adjusted as a function of the financial transaction in any of the following ways: the user's financial account is debited for a financial amount, and; the user's financial account is credited with a financial amount.

In a preferred embodiment of the method of the invention, the universal financial token encoding step further comprises transmitting and storing the unique user code in secure random access memory of the universal financial token.

In another embodiment of the method of the invention, the rule-module clearinghouse accesses said financial accounts by communicating with one or more external computers for any of the following: the user verification step, and; the financial account access step.

In another embodiment of the method of the invention, invoking a rule-module comprises any of the following: adjusting the user's financial account balance; invoking a rule-module clearinghouse authorization field; invoking a user's reward incentives program; invoking an advertising and upsell program; invoking an intelligent tracking and extrapolating agent, and; invoking an automated customer notification program.

In another embodiment of the method of the invention, the automated customer notification program invokes any of the following outgoing communications: an wireless phone text message; a paper mailing; a fax; a phone number dialing.

In a preferred embodiment of the method of the invention, the user input apparatus is embedded in any of the following: a wireless telephone, a wireless pager, a personal computer, a retail point of sale device, a vending machine, a venue admittance device, a personal digital assistant, an internet kiosk, a land line telephone, a television, a digital music player.

In a preferred embodiment of the method of the invention, the user input apparatus further comprises any of the following: a data entry touch screen; a data entry key pad; a visual display screen; an audio output speaker.

In a preferred embodiment of the method of the invention, the universal financial token is a portable wireless proximity token capable of dedicated short range contactless communications with the user input apparatus by any of the following means: a radio frequency, an infrared transmission, a digital signal, a cellular signal, a sonic output, a vibrational wave.

In a preferred embodiment of the method of the invention, the universal financial token is embedded in any of the following: a wireless telephone, a key fob; a wireless pager; a personal digital assistant; a wearable ornament; a digital media player; a refillable container; a removeably implantable computer chip, and; a refillable container.

In another embodiment of the method of the invention, the wearable ornament further comprises any of the following: jewelry, and; clothing.

In another embodiment of the method of the invention, the refillable container further comprises any of the following: a beverage container, and; a gasoline container.

In a preferred embodiment of the method of the invention, the on-line financial transaction further comprises communicating with a remotely located central computer via a computer network.

In a preferred embodiment of the method of the invention, the computer network further comprises any of the following: a cable TV network, a wireless telephone network, a land-line telephone network, the Internet, an intranet, a LAN, a WAN, or an X.25 network.

In a preferred embodiment of the method of the invention, the real-time processing of the financial transaction further comprises the actual time the user input apparatus remains on-line using a computer network in communicating with the rule-module clearinghouse, measured from commencement of the user verification step to completion of the financial account access step.

In another embodiment of the method of the invention, the completion of the financial account access step comprises any of the following: denial of the financial transaction by a financial administrator, and; settlement of the financial transaction by a financial administrator.

In another embodiment of the method of the invention, the financial account access step further comprises a resource determination comprising any of the following performed by a financial administrator: a positive determination that the selected financial account has sufficient resources, wherein said financial account is debited and another financial account is credited for an amount specified in the transaction, and; a negative determination that the selected financial account has insufficient resources, whereupon at least one other financial account of the user is automatically displayed to the user by the user input apparatus based upon predetermined criteria.

In a preferred embodiment of the method of the invention, a rule-module further comprises any of the following: pattern data that is associated with a plurality of execution commands; a plurality of pattern data associated with an execution command, and; a plurality of pattern data associated with a plurality of execution commands.

In another embodiment of the method of the invention, the rule-module clearinghouse comprises any of the following: at least one master rule-module clearinghouse containing all of the pattern data, execution commands, and rule-modules registered by users and financial administrators, and; at least one subset rule-module clearinghouse containing a subset of all of the pattern data, execution commands, and rule-modules registered by users and financial administrators.

In another embodiment of the method of the invention, the rule-module clearinghouse includes at least one master in-house registry, containing all of the financial accounts of the user.

In another embodiment of the method of the invention, the subset rule-module clearinghouse contains a subset of data selected by any number of predetermined rule-module clearinghouse criteria for the user: geography; frequency; recency; demographics, and volume financial transactions.

In another embodiment of the method of the invention, the subset rule-module clearinghouse includes at least one subset in-house registry, containing a subset of data of the financial accounts of the user.

In another embodiment of the method of the invention, the method further comprises a user re-registration check step, wherein the user registration rule-module is compared against previously registered rule-modules wherein if a match occurs, the rule-module clearinghouse is alerted to the fact that the user is attempting to re-register.

In another embodiment of the method of the invention, the biometric sample comprises a scanned template of any of the following human characteristics: a finger, a retina, an iris, a voice, a face.

In another embodiment of the method of the invention, the method further comprises a user notification step, whereupon completion of the financial transaction, the user receives notification of the results of the transaction via the user input apparatus, said notification comprising any of the following: denial of the financial transaction by a financial administrator, and; settlement of the financial transaction by a financial administrator.

In another embodiment of the method of the invention, the user notification comprises any of the following: a visual display; an audio output; and a printed receipt.

In another embodiment of the method of the invention, an emergency authority comprises any of the following: a government agency, and; a private company.

In another embodiment of the method of the invention, the subset rule-module clearinghouse contains data selected by any of the following predetermined rule-module clearinghouse criteria for the financial administrator: geography; frequency; recency; demographics, and volume financial transactions.

In another embodiment of the method of the invention, the rule-module registration step further comprises an aggregation consent step, whereupon the user's consent after registering with the rule-module clearinghouse, the rule-module clearinghouse aggregates and manages any of the following for a plurality of proprietary financial accounts of a user: invoicing procedures; payment procedures; scrip calculations and adjustments; reward incentive calculations and adjustments; intelligent data tracking and extrapolating agents.

The invention also describes a computer system comprising: a) an electronic rule-module clearinghouse, comprising at least one registration rule-module further comprising at least one pattern data of a user associated with at least one execution command of the user; b) a universal financial token, comprising a token for universal financial account access comprising a dedicated means which is encoded with a user's unique user code; c) verification platform, comprising means for comparing a user's bid verification data to verification data from registered users, thereby producing a matching determination to verify a user's authorization to access the rule-module clearinghouse, and; d) a financial account access means, whereupon the issuance of a positive matching determination by the verification platform, a rule-module registered to the user is invoked by within the rule-module clearinghouse, thereby accessing a plurality of proprietary financial accounts of a user, from which the user can select for real-time processing of an on-line financial transaction; whereby, a user selects from a plurality of proprietary financial accounts to authorize processing of a real-time, on-line electronic financial transaction using a universal financial token and a rule-module clearinghouse.

In another embodiment of the system of the invention, the system further comprises a rule-module modification means, wherein a user's rule-modules can be modified by any of the following parties as authorized by the rule-module clearinghouse: the user; the rule-module clearinghouse; a financial institution; and a third-party with predetermined authorization.

In another embodiment of the system of the invention, the rule-module modification comprises any of the following: registering, deleting, and adding pattern data; registering, deleting, and adding execution commands; registering, deleting and adding associations between pattern data and execution commands.

In a preferred embodiment of the system of the invention, a user's registration rule-module further comprises any of the following pattern data of the user: the user's legal name, private code, a driver's license number, a unique user code, a personal verification code, a secondary personal verification code, an emergency alert code, a plurality of proprietary financial accounts, predetermined criteria for simultaneously accessing a plurality of proprietary financial accounts, demographic information, an email address, social security number, a mother's maiden name, a biometric sample, a facial photogragh, Internet browsing patterns, a telephone number, a mailing address, purchasing patterns, authorized subordinated users, authorized subordinated user authorization fields, data on pre-paid accounts or memberships for products or services, electronic data usage patterns, employee status, job title, data on user behavior patterns, a digital certificate, a network credential, an Internet protocol address, a digital signature, an encryption key, an instant messaging address, personal medical records, an electronic audio signature, and an electronic visual signature, financial account access authorization fields.

In a preferred embodiment of the system of the invention, the system further comprises a user bid verification data gathering means, wherein the user's bid verification data is gathered directly from the user by a user input apparatus during real-time processing of the financial transaction.

In a preferred embodiment of the system of the invention, the bid verification data further comprises any of the following data gathered in real-time during processing of the financial transaction by the user input apparatus: the user's bid unique user code as scanned directly from the user's universal financial token using the dedicated short range contactless communications capabilities; the user's personal verification code as gathered directly by the user; the user's secondary personal verification code as gathered directly by the user.

In a preferred embodiment of the system of the invention, the system further comprises the user's unique user code being provided to the clearinghouse's verification platform.

In a preferred embodiment of the system of the invention, the user verification means further comprises the clearinghouse's verification platform electronically comparing the user's bid unique user code and the user's bid personal verification code with a user's registration unique user code and a user's registration private verification code to output a matching determination of the user's authority to access the rule-module clearinghouse.

In an embodiment of the system of the invention, upon a positive matching determination, the verification platform outputs a verification approval code for the user to access the rule-module clearinghouse using predetermined authorization fields for any of the following: access to rule-modules in the rule-module clearinghouse; access to financial accounts; subordinated account user authority; access to third-party computers accessed by the rule-module clearinghouse.

In a preferred embodiment of the system of the invention, upon a positive matching determination of a user's authority to access the rule-module clearinghouse, at least one registered rule-module of the user is invoked.

In another embodiment of the system of the invention, upon making a positive matching determination, the verification platform issues a verification approval code to invoke at least one registered rule-module of the user in the rule-module clearinghouse.

In another embodiment of the system of the invention, the unique user code comprises any of the following: a dynamic code which changes periodically based on predetermined criteria synchronized with the verification platform, and; a static code which remains constant based on a predetermined code synchronized with the verification platform.

In another embodiment of the system of the invention, the user's personal verification code comprises any alpha-numeric sequence selected by any of the following: the user, the rule-module clearinghouse.

In another embodiment of the system of the invention, the system further comprises a unique user code theft resolution means, wherein if the user's unique user code has been compromised, any of the following occurs: the user's personal verification code is changed, and; a new unique user code is encoded into the user's universal financial token.

In another embodiment of the system of the invention the system further comprises a personal verification code theft resolution means, wherein if the user's personal verification code has been compromised, any of the following occurs: the user's personal verification code is changed, and; a new unique user code is encoded into the user's universal financial token.

In another embodiment of the system of the invention, the user verification means further comprises a rule-module clearinghouse fraud detection means, wherein predetermined criteria by a fraud prevention platform are invoked for detecting fraudulent usage patterns usage of any of the following: a user's bid verification data; modifications to a user's rule-modules, and; a user's financial account access.

In another embodiment of the system of the invention, the system further comprises a fraud prevention registration means, whereupon a determination by the rule-module clearinghouse that the user has committed fraud prior fraud involving the rule-module clearinghouse, any of the following data of the user is registered with the fraud prevention platform: pattern data of the user, execution commands of the use, rule-modules of the user.

In another embodiment of the system of the invention, the system further comprises a rule-module clearinghouse verification means, wherein a private code, registered to the user, distinct from a user's personal verification code and not used in a user verification means, is transmitted to the user input apparatus from the rule-module clearinghouse for presentation to the user during processing of a financial transaction to verify to the user that the authentic rule-module clearinghouse has been accessed.

In another embodiment of the system of the invention, the private code is registered to the to user in the rule-module clearinghouse by any of the following: the user, and; the rule-module clearinghouse.

In another embodiment of the system of the invention, the system further comprises a user emergency alert means, wherein an emergency code, registered to the user, distinct from a user's personal verification code and not used in the user verification means, is gathered from the user by the user input apparatus and transmitted to the rule-module clearinghouse to alert the rule-module clearinghouse of any of the following: that the user's bid verification data has been compromised; that the user's universal financial token has been compromised, and; that the user has been coerced to access the rule-module clearinghouse.

In another embodiment of the system of the invention, the user's universal financial token has been deemed compromised in the event of any of the following: loss, damage, and fraudulent duplication.

In another embodiment of the system of the invention, the emergency code comprises any of the following predetermined data: an alpha-numeric code, a visual icon, an audio output.

In another embodiment of the system of the invention, the emergency alert means further comprises execution by the rule-module clearinghouse of any of the following: transmittal to the user input apparatus of a visual output for display to the user of false account access; transmittal to the user input apparatus of an audio output for presentation to the user of a false account access; transmittal to a emergency authority of said emergency alert to invoke assistance for the user; cancellation of the user's unique user code; cancellation of the user's personal verification code.

In another embodiment of the system of the invention, the visual output presents to the user via the user input apparatus any of the following predetermined displays of data: a false financial account; a false limitation of resources in a financial account, confirmation of a emergency authority having been contacted.

In another embodiment of the system of the invention, the audio output presents to the user at the user input apparatus any of the following predetermined audible data: a false financial account; a false limitation of resources in a financial account, confirmation of a emergency authority having been contacted.

In another embodiment of the system of the invention, if the rule-module clearinghouse is notified that the user's unique user code has been compromised, the rule-module clearinghouse invokes the user's authority to submit the user's secondary personal verification code as an alternative to the user's unique user code during the user verification means based upon any of the following predetermined criteria for purposes of making a matching determination of the user's authorization to access the rule-module clearinghouse: limited time period for using the secondary personal verification code; limited financial account access when using the secondary personal verification code; limited frequency for usage for using the secondary personal verification code, and; limited geography for using the secondary personal verification code.

In another embodiment of the system of the invention, the secondary personal verification code comprises any of the following data gathered directly from the user by the user input apparatus during real-time processing of the financial transaction: an alpha-numeric code, and; an electronically scanned biometric sample.

In another embodiment of the system of the invention, the user verification means further comprises the verification platform electronically comparing the user's bid personal verification code and the user's bid secondary personal verification code with a user's registration personal verification code and a user's registration secondary personal verification code to output a matching determination of the user's authority to access the rule-module clearinghouse.

In another embodiment of the system of the invention, a financial transaction comprises any of the following internet or point-of-sale based transactions: credit, debit, scrip, rewards, echeck, private label, stored value, brokerage, automated surcharge based on predetermined criteria, electronic benefits transfer, buyer-seller exchange wherein a user's financial account balance is adjusted and a financial administrator's financial account is correspondingly adjusted, an user's intra-account transfers between financial accounts of the user without a buyer-seller exchange.

In another embodiment of the system of the invention, financial account access comprises any of the following electronic functions pertaining to at least one proprietary financial accounts: querying data related to a financial account; retrieving data from a financial account; communicating with a third-party computer to query data related to a financial account; communicating with a third-party computer to retrieve data from a financial account; presenting the user with a visual display, or an audio output via the user input apparatus; adjusting the balance in a financial account by making a credit to a financial account or making a debit from a financial account.

In another embodiment of the system of the invention, upon a positive matching determination of the user by the verification platform, the rule-module clearinghouse uses computer software and hardware to invoke a registered rule-module of the user based upon predetermined criteria to enable real-time simultaneous access to a plurality of proprietary financial accounts during processing of the financial transaction.

In another embodiment of the system of the invention, the user verification means further comprises a user facial photograph display means, whereupon if the verification platform makes a positive matching determination that the user is authorized to access the rule-module database, the rule-module clearinghouse transmits the user's registered facial photograph for display by the user input apparatus to enable a third-party present in real-time during the financial transaction, to visually compare the user's actual with the user's displayed facial photograph.

In another embodiment of the system of the invention, the user input apparatus is encoded with a unique hardware identification code previously registered with the rule-module clearinghouse, said unique hardware identification code being used by the verification platform of the rule-module clearinghouse to verify authenticity of any of the following: the user input apparatus; the financial administrator owning the user input apparatus; the geographic location of the user input apparatus; the demographic data associated with the users of the user input apparatus; upgrade software which the rule-module clearinghouse can download to the user input apparatus.

In another embodiment of the system of the invention, the system further comprises a financial administrator registration means, wherein a financial administrator registers at least one rule-module with the rule-module clearinghouse.

In another embodiment of the system of the invention, a financial administrator's registration rule-module further comprises any of the following pattern data of the financial administrator: the financial administrator's legal name, a user input apparatus hardware verification code, an employer identification number, financial account access authorization fields, a unique clearinghouse access code, a financial administrator verification code, an emergency alert code, a financial account, an email address, a telephone number, a mailing address, authority of at least one employee of the financial administrator, a digital certificate, a network credential, an Internet protocol address, a digital signature, an encryption key, electronic audio signature, and an electronic visual signature.

In another embodiment of the system of the invention, the financial administrator's registration rule-module further comprises execution commands for invoking any of the following: accessing a user's financial account, processing a user's financial transaction; presentation of selected data from user's rule-module data; notification of a emergency authority of predetermined criteria resultant from the rule-module clearinghouse receiving the user's emergency alert code.

In another embodiment of the system of the invention, the system further comprises a financial administrator verification means, whereupon during the financial account access means, the verification platform receives bid verification data from a financial administrator in real-time during the financial transaction, and makes determination whether the financial administrator is an authorized registrant of the rule-module clearinghouse.

In another embodiment of the system of the invention, the bid verification data comprises any registered pattern data of the financial administrator which enables the verification platform to verify that the financial administrator is an authorized registrant of the rule-module clearinghouse.

In another embodiment of the system of the invention, if the verification platform makes a positive matching determination of the financial administrator's authority to access the rule-module clearinghouse, any of the following predetermined authorization fields of financial administrator are invoked: restricted access to rule-modules in the rule-module clearinghouse; acceptance of a subordinated account user; access to third-party computers being accessed by the rule-module clearinghouse.

In another embodiment of the system of the invention, upon a positive matching determination of a financial administrator's authority to access the rule-module clearinghouse, at least one registered rule-module of the financial administrator is invoked.

In another embodiment of the system of the invention, upon making a positive matching determination, the verification platform issues a verification approval code to invoke at least one registered rule-module of the user in the rule-module clearinghouse.

In another embodiment of the system of the invention, the system further comprises a fraud prevention registration means, whereupon if a determination is made by the rule-module clearinghouse that the financial administrator has committed fraud prior fraud involving the rule-module clearinghouse, at least one of any of the following data of the financial administrator is registered with the fraud prevention platform: pattern data; execution command; and; rule-module.

In a preferred embodiment of the system of the invention, a platform is a computer-based set of related data that can be electronically processed in any of the following ways with software using predetermined criteria associated with the rule-module clearinghouse: data storage, data queries, data retrieval and data modification.

In a preferred embodiment of the system of the invention, the rule-module clearinghouse is remotely located from the user input apparatus.

In a preferred embodiment of the system of the invention, wherein the rule-module clearinghouse is remotely located from the user input apparatus during real-time, on-line processing of the financial transaction.

In a preferred embodiment of the system of the invention, a plurality comprises at least two.

In a preferred embodiment of the system of the invention, a proprietary financial account comprises a financial account distinguishable from at least one other financial account because the respective accounts reside with different financial administrators.

In a preferred embodiment of the system of the invention, the plurality of proprietary financial accounts are rendered simultaneously accessible as a function of using the rule-module clearinghouse.

In another embodiment of the system of the invention, wherein the plurality of proprietary financial accounts are rendered simultaneously accessible solely as a function of using the rule-module clearinghouse.

In another embodiment of the system of the invention, during the financial account access means, financial transaction data comprising any of the following is transmitted to the rule-module clearinghouse: pricing information, a list of goods and services, payee verification data, financial administrator verification data, a date or time, a location, and an invoice number, transaction settlement data.

In another embodiment of the system of the invention, the payee and the financial administrator are identical.

In another embodiment of the system of the invention, the financial account access means further comprises a financial transaction settlement means comprising any of the following: an immediate adjustment to the balance of the user's financial account; a predetermined time delay in the adjustment to the balance of the user's financial account such as 30-day net settlement terms.

In a preferred embodiment of the system of the invention, a financial account resides with a financial administrator if said financial administrator has the primary responsibility to directly administer, operate, adjust, and reconcile the financial data within the user's financial account.

In a preferred embodiment of the system of the invention, a financial administrator comprises any of the following: a bank, a merchant, a scrips provider, credit account organization, a government agency, an insurance company, a brokerage firm, a reward incentives provider, a services barter provider, a product barter provider, an internet payment provider.

In a preferred embodiment of the system of the invention, the financial account comprises any computerized account which stores financial data having a predetermined monetary or monetary-equivalent unit value which is legal tender or a legal tender-equivalent, the use of which comprises any of the following: the purchase, the exchange, and the accrual of currency, products or services.

In a preferred embodiment of the system of the invention, wherein the financial account further comprises any of the following: a bank checking account, a credit account such as Visa®, MasterCard® or American Express®, a reward incentives account, an insurance account, brokerage account, a savings account, a scrip account, a pre-paid account, a checking account, a private label credit account, a services barter account, a product barter account, an internet payment account.

In another embodiment of the system of the invention, the reward incentives and scrip accounts comprise any of the following: gift certificates; stored-value units; electronic or paper coupons having a predetermined monetary value; minutes of telephone calling time; miles towards earning a free airplane flight, and; accruing units of a predetermined monetary value towards receiving a commodity or service.

In a preferred embodiment of the system of the invention, the financial account access means further comprises a financial account presentation means, wherein the rule-module clearinghouse retrieves data from a plurality of proprietary financial accounts of the user, transmits said retrieved data to the user input apparatus for electronic presentation to the user via the user input apparatus in real-time during transaction processing, for the user to select a financial account for processing the financial transaction, wherein said presentation comprises any of the following: a visual display, and an audio output.

In another embodiment of the system of the invention, the system further comprises a proprietary financial account ranking means, wherein within the rule-module clearinghouse, a plurality of proprietary financial accounts are tagged and ranked in an order based on predetermined criteria.

In another embodiment of the system of the invention, the predetermined criteria for ranking the financial accounts further comprises any of the following: improving transaction benefits to a financial administrator, and; improving transaction benefits to the user.

In another embodiment of the system of the invention, improving transaction benefits further comprises any of the following: increasing efficiency; increasing speed; increasing profit; increasing security; decreasing cost; increasing reward incentives, and; impact on a financial transaction surcharge.

In another embodiment of the system of the invention, the ranked financial accounts are electronically presented to the user via the user input apparatus in any of the following visual displays, wherein any one of said ranked financial accounts may be accepted or declined by the user for processing the transaction: a plurality of financial accounts displayed simultaneously, with visually displayable indicators for the respective rankings of the financial accounts, and; a plurality of financial accounts displayed in sequence as a function of their respective rankings.

In another embodiment of the system of the invention, the electronic visual signature is in the form of an electronic visual image comprising at least one of the following: streaming media, a video clip, a moving image, a holographic display, a graphical display, an alpha-numeric display, a textual display.

In another embodiment of the system of the invention, the ranked financial accounts are electronically presented to the user via the user input apparatus in a sequence of audio outputs reflecting the respective rankings of the financial accounts, and any one of said financial accounts may be accepted or declined by the user for processing the transaction.

In another embodiment of the system of the invention, the electronic audio signature is in the form of an form of an audio sound wave comprising any of the following: a musical fragment, speech, phonation, or a song.

In another embodiment of the system of the invention, the transaction surcharge adds a predetermined additional financial amount to the user's financial transaction, which is then debited from the financial account selected by the user for processing the transaction, and credited to a different financial account.

In another embodiment of the system of the invention, wherein the surcharge comprises any of the following: a fixed financial amount; a fixed percentage of the financial transaction, and; a variable financial amount.

In another embodiment of the system of the invention, the variable financial amount comprises a formula which calculates the surcharge as a function on any of the following: the user's income; the financial amount of the transaction; time; the user's purchasing frequency; a balance in a financial account of the user, an economic indicator, and; a predetermined financial objective of the user.

In another embodiment of the system of the invention, an invoked execution command causes execution of any of the following: accessing a user's financial account; processing a user's financial transaction; presenting a plurality of proprietary financial accounts of the user; settlement of a user's financial transaction presentation of a user's rule-module data based upon predetermined criteria; notification of a emergency authority of predetermined criteria resultant from the rule-module clearinghouse receiving the user's emergency alert code.

In another embodiment of the system of the invention, the financial account access means further comprises a third-party access means, wherein during the, the rule-module clearinghouse communicates with one or more third-party computers for any of the following: user verification; fraud detection; emergency alert; emergency authority notification; financial account access; financial account settlement, and; processing the financial transaction.

In another embodiment of the system of the invention, the financial account access means further comprises a resource verification means, whereupon the user's selection of a financial account, it is electronically determined if the user's financial account has sufficient resources for settlement of the financial transaction.

In another embodiment of the system of the invention, the system further comprises a financial transaction settlement means, whereupon the financial balance in user's selected financial account is adjusted as a function of the financial transaction in any of the following ways: the user's financial account is debited for a financial amount, and; the user's financial account is credited with a financial amount.

In a preferred embodiment of the system of the invention, the universal financial token encoding means further comprises transmitting and storing the unique user code in secure random access memory of the universal financial token.

In another embodiment of the system of the invention, the rule-module clearinghouse accesses said financial accounts by communicating with one or more external computers for any of the following: the user verification means, and; the financial account access means.

In another embodiment of the system of the invention, invoking a rule-module comprises any of the following: adjusting the user's financial account balance; invoking a rule-module clearinghouse authorization field; invoking a user's reward incentives program; invoking an advertising and upsell program; invoking an intelligent tracking and extrapolating agent, and; invoking an automated customer notification program.

In another embodiment of the system of the invention, the automated customer notification program invokes any of the following outgoing communications: an wireless phone text message; a paper mailing; a fax; a phone number dialing.

In a preferred embodiment of the system of the invention, the user input apparatus comprises any of the following: a wireless telephone, a wireless pager, a personal computer, a retail point of sale device, a vending machine, a venue admittance device, a personal digital assistant, an internet kiosk, a land line telephone, a television, a digital music player.

In a preferred embodiment of the system of the invention, the user input apparatus further comprises any of the following: a data entry touch screen; a data entry key pad; a visual display screen; an audio output speaker.

In a preferred embodiment of the system of the invention, the universal financial token is a portable wireless proximity token capable of dedicated short range contactless communications with the user input apparatus by any of the following means: a radio frequency, an infrared transmission, a digital signal, a cellular signal, a sonic output, a vibrational wave.

In a preferred embodiment of the system of the invention, the universal financial token is embedded in any of the following: a wireless telephone, a key fob; a wireless pager; a personal digital assistant; a wearable ornament; a digital media player; a refillable container; a removeably implantable computer chip, and; a refillable container.

In another embodiment of the system of the invention, the wearable ornament further comprises any of the following: jewelry, and; clothing.

In another embodiment of the system of the invention, the refillable container further comprises any of the following: a beverage container, and; a gasoline container.

In a preferred embodiment of the system of the invention, the on-line financial transaction further comprises communicating with a remotely located central computer via a computer network.

In a preferred embodiment of the system of the invention, the computer network further comprises any of the following: a cable TV network, a wireless telephone network, a land-line telephone network, the Internet, an intranet, a LAN, a WAN, or an X.25 network.

In a preferred embodiment of the system of the invention, the real-time processing of the financial transaction further comprises the actual time the user input apparatus remains on-line using a computer network in communicating with the rule-module clearinghouse, measured from commencement of the user verification means to completion of the financial account access means.

In another embodiment of the system of the invention, the completion of the financial account access means comprises any of the following: denial of the financial transaction by a financial administrator, and; settlement of the financial transaction by a financial administrator.

In another embodiment of the system of the invention, the financial account access means further comprises a resource determination comprising any of the following performed by a financial administrator: a positive determination that the selected financial account has sufficient resources, wherein said financial account is debited and another financial account is credited for an amount specified in the transaction, and; a negative determination that the selected financial account has insufficient resources, whereupon at least one other financial account of the user is automatically displayed to the user by the user input apparatus based upon predetermined criteria.

In a preferred embodiment of the system of the invention, a rule-module further comprises any of the following: pattern data that is associated with a plurality of execution commands; a plurality of pattern data associated with an execution command, and; a plurality of pattern data associated with a plurality of execution commands.

In another embodiment of the system of the invention, the rule-module clearinghouse comprises any of the following: at least one master rule-module clearinghouse containing all of the pattern data, execution commands, and rule-modules registered by users and financial administrators, and; at least one subset rule-module clearinghouse containing a subset of all of the pattern data, execution commands, and rule-modules registered by users and financial administrators.

In another embodiment of the system of the invention, the subset rule-module clearinghouse contains data selected by any number of predetermined rule-module clearinghouse criteria for the user: geography; frequency; recency; demographics, and volume financial transactions.

In another embodiment of the system of the invention, the rule-module clearinghouse includes at least one master in-house registry, containing all of the financial accounts of the user.

In another embodiment of the system of the invention, the subset rule-module clearinghouse includes at least one subset in-house registry, containing a subset of data of the financial accounts of the user.

In another embodiment of the system of the invention, the system further comprises a user re-registration check means, wherein the user registration rule-module is compared against previously registered rule-modules wherein if a match occurs, the rule-module clearinghouse is alerted to the fact that the user is attempting to re-register.

In another embodiment of the system of the invention, the biometric sample comprises a scanned template of any of the following human characteristics: a finger, a retina, an iris, a voice, a face.

In another embodiment of the system of the invention, the system further comprises a user notification means, whereupon completion of the financial transaction, the user receives notification of the results of the transaction via the user input apparatus, said notification comprising any of the following: denial of the financial transaction by a financial administrator, and; settlement of the financial transaction by a financial administrator.

In another embodiment of the system of the invention, the user notification comprises any of the following: a visual display; an audio output; and a printed receipt.

In another embodiment of the system of the invention, an emergency authority comprises any of the following: a government agency, and; a private company.

In another embodiment of the system of the invention, the subset rule-module clearinghouse contains data selected by any of the following predetermined rule-module clearinghouse criteria for the financial administrator: geography; frequency; recency; demographics, and volume financial transactions.

In another embodiment of the system of the invention, the rule-module clearinghouse further comprises an aggregating billing means, whereupon the user's consent having been registered with the rule-module clearinghouse, the rule-module clearinghouse aggregates and manages the user's billing and payment procedures for a plurality of proprietary financial accounts.

In another embodiment of the system of the invention, the rule-module registration means further comprises an aggregation consent means, whereupon the user's consent after registering with the rule-module clearinghouse, the rule-module clearinghouse aggregates and manages any of the following for a plurality of proprietary financial accounts of a user: invoicing procedures; payment procedures; scrip calculations and adjustments; reward incentive calculations and adjustments; intelligent data tracking and extrapolating agents.

In another embodiment of the method of the invention, there is an automatic user prior fraud check step, wherein the user's bid unique user code and bid personal verification code are compared against previously registered unique user codes and personal verification codes in the prior fraud platform wherein if a match occurs, the rule-module clearinghouse is alerted to the fact that the user has attempted to re-access the rule-module clearinghouse after having already been registered with the prior fraud platform.

In another embodiment of the system of the invention, there is an automatic user prior fraud check means, wherein the user's bid unique user code and bid personal verification code are compared against previously registered unique user codes and personal verification codes in the prior fraud platform wherein if a match occurs, the rule-module clearinghouse is alerted to the fact that the user has attempted to re-access the rule-module clearinghouse after having already been registered with the prior fraud platform.

Further, the invention is designed to be cost-effectively integrated with existing electronic data systems currently installed in corporate intranets and over the Internet.

These and other advantages of the invention will become more fully apparent when the following detailed description of the invention is read in conjunction with the accompanying drawings.

BRIEF DESCRIPTION OF THE DRAWINGS

FIG. 22 through FIG. 27 show process flow embodiments of Rule-Module Clearinghouse processing of financial transactions.

GLOSSARY

Figure 1:
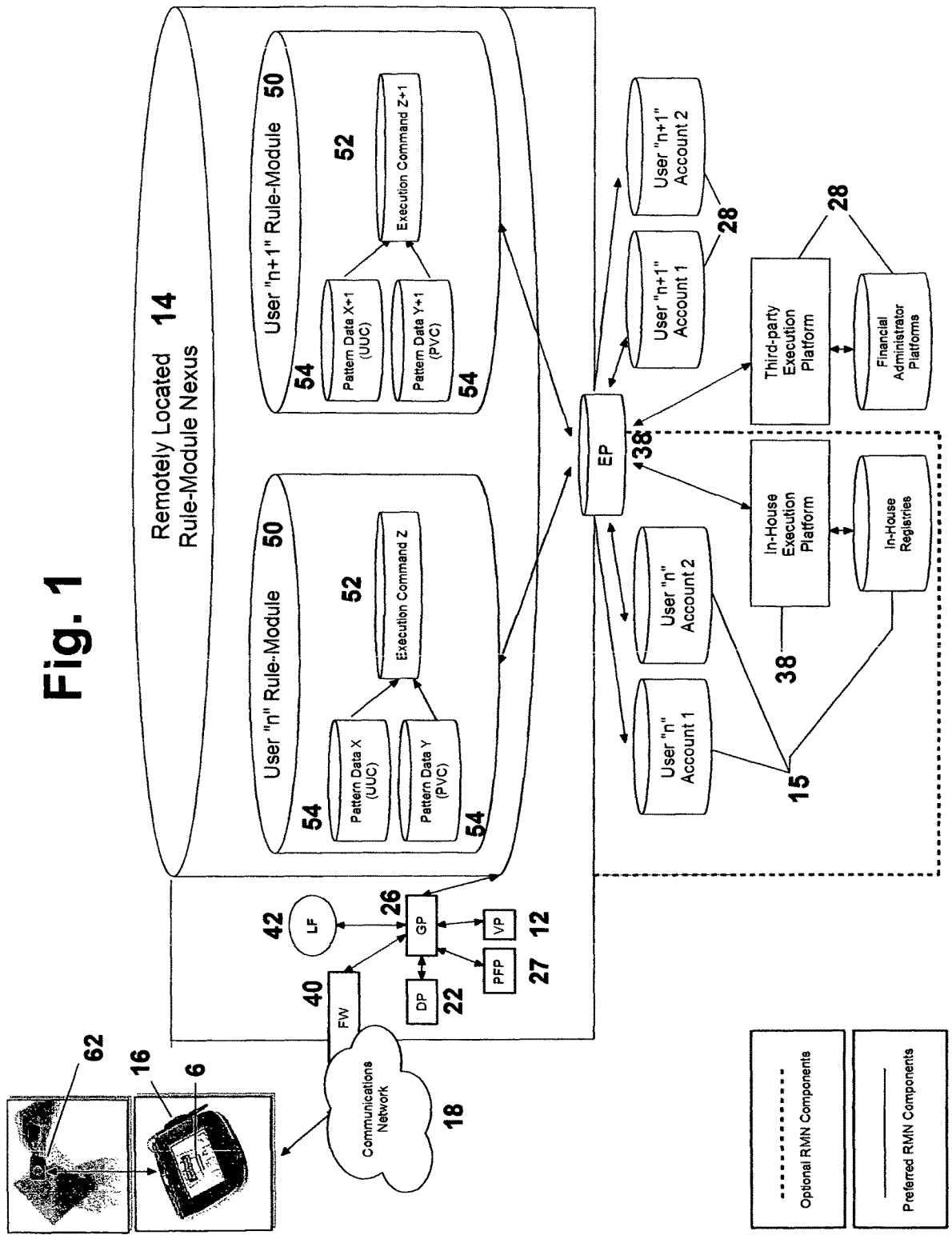
FIG. 1 shows a preferred embodiment of the Rule-Module Clearinghouse (RMC), with a Universal Financial Token (UFT) and a User Input Apparatus (UIA).

SUBSET PLATFORM (or Local Computer): Both defined the same, as computing hardware and software storing a set of related data which represents only a portion of all data stored in the Master Computer or Master Platform.

MASTER PLATFORM (or Master Computer): Both defined the same, as computing hardware and software storing a complete set of all data being used in the invention.

INTERMEDIARY PLATFORM (or Intermediary Computer): Both defined the same, as computer hardware and software storing a more complete set of data than the Subset Platform, but storing less data than the Master Platform.

RSP: Retail Subset Platform; a Platform residing with a Retailer, containing a subset of all data in the RMC pertaining to a user UAP: UIA Authorization Platform: contains the list of parties, whether users, individuals or financial administrators, authorized to use modify and issue UIA devices.

UOP: User Input Apparatus Owner Platform: central repository containing the geographic and contact information on the owner of each UIA.

ASCII: American Standard Code for Information Interchange

ATM: Automated Teller Machinery; uses encoded UUC-PVC verification information to obtain access to a financial administrator or third-party platform, including authorizing cash dispensing and account management.

UIA: User input apparatus; gathers UUC and PVC data directly from user, encodes and encrypts it, and makes it available for authorizations. Comes in various hardware models and software embodiments.

UIA-VC: User Input Apparatus hardware Verification Code; a unique code which is assigned to a UIA unit, which is appended to a financial transaction and transmitted to the Rule-Module Clearinghouse in order to verify the authenticity of the UIA to the Rule-Module Clearinghouse.

UUC: A unique user code, encoded in the universal financial token, which is distinct for each user of the system.

UUC-ID: An identifier used by the system to uniquely verify an individual's UUC record (IRID—Individual Record ID)

UPP: UUC-PVC Platform: a software platform in the RMC maintains a registry of which UUC's are assigned to which PVC's, including a registry of algorithmically dissimilar UUC's linked to the same PVC.

BRT: Banking Retail Terminal-UIA. UUC Registration and Re-Coding UIA's, located at retail banking outlets, BRU's combine UUC registration information with an individual-selected PVC and selected personal information to register individuals with the system.

CBC: Cipher Block Chaining: an encryption mode for the DES.

CCD: Charged-Coupled Device

EXECUTION COMMANDS: A program or subroutine residing in Rule-Modules of the RMC that performs a specific task, activated by a request message sent from a UIA-equipped Terminal.

CPT: Cable-TV Point-of-Sale UTA: combines an onscreen display simulcast digital signal informing TV-top cable box of product information with product video, and an UIA controller remote which performs the UUC-PVC validation using the CATV communications network. Order/autho/mailing-addressitem-id forwarded to merchant. Results of authorization are displayed on the TV.

CST: Customer Service Terminals; provide system customer service personnel with varying degrees of access (based on access privilege) the ability to retrieve and modify information on individuals in order to help people with account problems.

DAUIA SEALING STEP: The conversion of plain text to cipher text (known as "encryption") in combination with the encrypted checksumming of a message that allows information to remain in plain text while at the same time providing a means for detecting any subsequent modification of the message.

DES: Digital Encryption Standard: a standard for the cryptographic protection of digital data. See standard ANSI X3.92-1981

DETERMINATION: the status of the command processed during the execution step.

RMC: Rule-Module Clearinghouse is a subset or master data processing center, with a plurality of platforms, where the hardware, software, and personnel are co-located to support a UUC-PVC verification platform, and invoke Rule-Modules to access and processes electronic messages, most of which involve performing a financial transfer, or sending a fax, or sending electronic mail, etc.

RM: Rule-Modules, comprising software associations between Pattern Data and Execution Commands DSP: Digital Signal Processor: a class of integrated circuits that specialize in the mathematical operations required by the signal processing applications.

DUKPT: Derived Unique Key Per Transaction: See standard ANSI/ABA X9.24-1992

EMERGENCY CODE: the alpha-numeric sequence, visual icon or audio signal selected by an individual which, when accessed, will result in a transaction being labeled by the system as an emergency transaction, potentially causing the display of false screens and/or the notification of authorities that said individual has been coerced into performing a transmission or transaction.

ESP: Electronic Signature Platform: central repository containing all MD5 and electronic signatures of all documents signed by anybody, referenced by authorization number.

EST: Electronic Signature Terminal; uses UIA to verify, computer calculates checksum on document, sends checksum to system, system validates, timestamps, saves checksum, and returns with sig code. Uses Internet as transport. EST also verifies signatures given a sig code and an MD5 calculation.

FAR (False Accept Rate): the statistical likelihood that one user's UUC-PVC algorithmic verification will be incorrectly verified as the UUC-PVC of another user.

FALSE SCREENS: Displays of information which has been intentionally pre-determined to be subtly inaccurate such that a coercing party will not illegally obtain accurate data about an individual's financial assets, all the while remaining unaware of the alteration of the information.

FDDI: Fiber Digital Device Interface: a networking device that utilizes a fiber optic token ring.

FS: Field Separator

FW: Firewall Platform: the network-Local or Subset net router that regulates traffic into and out of the RMC.

GP: Gateway Platform: the main communications directing platforms in the RMC; which direct the flow of electronic messages to other platforms within the RMC and with third-party platforms.

UUCP: Unique User Code Platform: central repository for unique user codes. Queries against the UUCP are used to verify authority for financial transactions.

FAP: Financial Administrator Platform: central repository containing data for financial administrators that are allowed to add and delete financial asset account numbers with the system.

INTERNET REUIAILER: a retail account selling services or good to consumers by means of the Internet electronic network IPT: Internet Point-of-Sale Terminal: items and merchant code from the internet, UIA UUC-PVC for validation, sent to system using Internet, autho/order/PO # forwarded to merchant. System response using internet as well, displaying results on screen.

FINANCIAL ADMINISTRATOR: the party registered with the RMC with which resides a financial account of a user.

FINANCIAL ADMINISTRATOR BATCH: A collection of "add" and "delete" instructions complete with UUC-IDs, financial asset accounts, and account index codes verified and submitted by an financial administrator to the RMC.

FT: Financial administrator Terminals; provides a batch connection to the system for financial administrators to add and remove (their own) financial asset account numbers from specific individual's UUC records.

ITT: Internet Teller UIA; authorizes network UIA session using encrypted credential obtained from RMC using UUC-ID.

IHR: In-House Registry; a platform containing financial accounts of the user.

LCD: Liquid Crystal Display: a technology used for displaying text and visual images.

MAC: Message Authentication Code: an encrypted checksum algorithm, the MAC provides assurance that the contents of a message have not been altered subsequent to the MAC calculation. See standard ANSI X9.9-1986

MACP: Message Authentication Code Platform: a software platform in the RMC that handles MAC validation and generation for inbound and outbound packets.

MDP: Message Decrypt Platform: a software platform in the RMC that encrypts and decrypts packets from or destined to an UIA device.

MPP: Message Processing Platform: a software platform in the RMC that performs the processing of request packets.

NETWORK CREDENTIAL: Both the user and the financial administrator are identified by the RMC to create the network credential. The credential includes the individual's identification as well as the context of the connection (i.e., the TCP/IP source and destination ports). RMC creates a network credential using the individual's account id, the time of day, and the bank code. The RMC signs this credential using Public Key Encryption and the RMC's Private Key.

PFP: Prior Fraud Platform: central repository for UUCP records which have had prior fraud associated with them. Every new customer's UUCs and biometrics are checked against all PFP records with the intent of reducing recidivism.

PVC: Personal Verification Code; a code for protecting access to an individual's account through secret knowledge, formed from either numbers, symbols, or alphabetic characters.

POS: Point-Of-Sale; a place where goods are sold.

PPU: Phone Point-of-Sale UIA; combines phone number with merchant price and product information to authorize a transaction over a UIA-equipped telephone. Order/authorization/mailing-address/PO forwarded to merchant. Resulting authorization is displayed on phone LCD, or "spoken", along with the individual's private code.

RAM: Random Access Memory

RF: Radio Frequency: generally refers to radio frequency energy emitted during the normal operation of electrical devices.

REGISTERS: Memory reserved for a specific purpose, data set aside on chips and stored operands to instructions REQUESTS: electronic instructions from the UIA to RMC instructing the RMC to verify the individual and thereby process the individual's command in the event the identification is successful RMP: Remote Merchant Platform: contains all merchant identification codes for merchant telephone and Cable TV order shops; indexed by merchant ID. Contains per-merchant system encryption codes as well.

RPU: Retail Point-of-Sale UIA; combines encoded UUC verification information with retail transaction information (possibly from an electronic cash register) and formulates authorization requests of the system using X.25 networks, modems, etc.

SNP: Sequence Number Platform: a software platform in the RMC that handles the DUKPT sequence number processing for inbound request packets. Sequence number processing protects against replay attacks.

TERMINAL: A device that uses the UIA to gather UUC's and PVC's and form request messages that are subsequently sent to the RMC for authorization and execution. Terminals almost always append ancillary information to request messages, verifying counterparties and the like.

TITLE INDEX CODE: Alpha-numeric sequence uniquely verifying an individual's authorized role or capacity within the context of his employment UFT: Universal Financial Token; a portable wireless proximity token for universal financial account access having dedicated short range contactless communications capabilities is encoded with a user's unique user code. The UFT embodiments include: radio frequency identification; infrared beams, audio signals; and the like.

TRACKING CODE: An alpha-numeric sequence assigned to data stored in or transmitted by the RMC, such that said sequence may be used to recall the data or obtain a report on the status of the transmission of the data.

VAD: Valid Apparatus Platform: central repository in which each UIA (with associated unique encryption codes) is identified, along with the owner of the UIA.

VAC: Verification Approval Code, output by the Verification Platform upon a Positive Matching Determination.

DETAILED DESCRIPTION OF THE INVENTION

The invention provides a Rule-Module Clearinghouse method and system for a financial User to authorize a financial transactions using financial accounts either at the retail point of sale or over the Internet. A Rule-Module Clearinghouse 14 and a Verification Platform 12 are used to accomplish these goals.

A Unique User Code (UUC) 200 is defined as any data string, unique to a User, which is encoded into a User's Universal Financial Token (UFT) 62, and comprises any of the following: a dynamic code which changes periodically based on predetermined criteria synchronized with the verification platform, and; a static code which remains constant based on a predetermined code synchronized with the verification platform. One such UUC is registered for the User with the Rule-Module Clearinghouse 14.

A Personal Verification Code (PVC) 202, distinct from the Unique User Code 200, comprises any alpha-numeric sequence or data string, not necessarily unique to a User, which is input by the User during a financial transaction. At least one such PVC 202 is registered for the User with the Rule-Module Clearinghouse 14.

A Rule-Module 50 is defined as any Pattern Data 54 associated with an Execution Command 52. At least one such Rule-Module 50 is registered for the User with the Rule-Module Clearinghouse 14.

To process a financial transaction another is provided when the User scans a User Input Apparatus (UIA) 16 scans his UFT 62 for a bid UUC 200 and enters his PVC 202 to process a financial transaction. This UUC-PVC data string is compared by an electronic Verification Platform (VP) 12, which is a computer that uses this comparison to validate or deny the verification of the User's authorization to access the Rule-Module Clearinghouse 14 and Financial Accounts.

FIG. 23 through 27 shows the process flow of a financial transaction, including: the User inputs a bid Personal Verification Code (PVC) 202 into a User Input Apparatus (UIA) 16, and also presents a Universal Financial Token (UFT) 62 to the User Input Apparatus (UIA) 16 for scanning of a bid UUC 200. The UIA 16, optionally integrated with a POS-Terminal 2, builds an encrypted packet for a transaction request, wherein the UUC 200, the PVC 202, a UIA Verification Code (UIA_VC) 204 and a reply key are encrypted. Additional financial transaction data is appended to the packet from the POS-Terminal 2, wherein the Retail Subset Platform (RSP) forwards the encrypted packet to the Rule-Module Clearinghouse 14. The Rule-Module Clearinghouse 14 platforms check the sequence number of the Verification Code of the UIA (UIA_VC) 204, decrypt the UUC 200 and the PVC 202, using a Message Authentication Code (MAC) for checking the integrity of the encrypted message. The Verification Platform (VP) 12 then compares bid UUC-PVC with registered UUC-PVC's, to output a matching determination. If there is a positive matching determination, VP 12 issues a Verification Approval Code (VAC) 206, and the RMC 14 invokes at least one Rule-Module 50 of the user, including Pattern-Data 54 and Execution Command 52, to access Financial Account(s) of the User.

The transmittal of the financial transaction optionally occurs over a Network 18 such as an intranet, extranet or the Internet, whether using a Local or Subset area network (LAN) or wide area network (WAN). It is the essence of this invention that the User not present a plurality of contact-required tokens, such as smart cards or magnetic stripe cards, during an on-line financial transaction, in order to access all of the User's financial accounts.

An embodiment of the Rule-Module Clearinghouse 14 financial transactions is characterized by verifying the User using the User's bid PVC 202, and the User's bid UUC 200 from the User's UFT 62 that is submitted through a UIA 16. The UIA 16 is preferably directly connected via dial-up, leased lines or wireless modem 56 to the Internet 18.

Alternatively, a bid UUC 200 is submitted or through a UIA 16 in an intranet 18 or through a UIA 16 incorporated to any Terminal 2 such as an electronic cash register, a desktop personal computer, a notebook computer, or a public Terminal 2 or kiosk such as an Automated Teller Machine (ATM). In a preferred embodiment, the User is identified through UUCs 200 while participating third-party entities 28 such as Financial Administrators are verified through authentication of a digital certificate issued by an authorized certifying authority.

Execution of a Rule-Module (RM) 50 or an Execution Command (EC) 52 by the Execution Platform (Execution Platforms) 38 may result in a declined transmission due to an unidentifiable bid UUC 200 sample, a lack of an identifiable Financial Administrator 28, a closed or inoperative participating Financial Administrator 28, or some other immediately detectable problem condition. If the transmission is declined, the Master Rule-Module Clearinghouse 14 or the Verification Platform 12 transmits the decline notification back to the UIA 16.

In one embodiment, the UIA 16 is actually built-in and/or integrated with a personal computer, although the invention does not require that the personal computer contain any resident User-customized data, such as Pattern Data (PD) 54, Execution Commands 52 or private encryption keys.

The Computer System of this Invention Comprises the Following Components:
Universal Financial Token (UFT);
User Input Apparatus (UIA);
Communication lines for a Network;
Rule-Module Clearinghouse (RMC);

These components together allow a financial transaction to occur without requiring the User to use a plurality of financial cards, paper coupons, credit cards, debit cards, or other physical objects.

User Input Apparatus (UIA)

The UIA is a device that Gathers or contains verification information for use in authorizing financial transactions. Each UIA conducts one or more of the following operations:

Gathers UUC 200 input from scanning a UFT 62 a Financial Administrator or User;

Gathers a PVC code or password from a Financial Administrator or User, using a keypad, touch screen, or audio microphone;

Secure Network communication between UIA and RMC using encryption;

Secure storage of secret encryption keys;

Store and retrieve a unique Financial Administrator UIA_VC;

Secure enclosure & components from unauthorized tampering;

Display information, allow parties to approve or cancel a financial transaction;

Automated data scanning for dedicated short range contactless communications from a portable wireless proximity token, using an RFID sensor, an infrared sensor, or an audio frequency sensor, and the like;

Store, verify, and retrieve a Financial Administrator's digital verification code;

Allow parties to select among choices of Financial Administrator and a plurality of a User's Proprietary Financial Accounts.

UUC 200 input is gathered using a UUC 200 sensor located within the UIA 16. UUC 200 sensor is a dedicated short range contactless communications sensor, however it is understood that other types of UUC 200 sensors for wireless tokens can be used, such as infrared and the like.

For gathering a PVC 202, the UIA 16 has PVC 202 input means comprising using a keypad, touch screen or an audio microphone also located securely inside the UIA 16.

For User Input Apparatus 16 using a secondary PVC 202, such as a biometric, the UIA 16 also includes a sensor which can electronically read any of the following: a fingerprint, an iris, a retina, a voice, a palm, a face.

Communication security over the Network 18 is provided by encryption using unique secret keys known only to that specific UIA 16 and the RMC 14, and the DES encryption algorithm, preferably triple-encrypted. Triple encryption means successive encrypt/decrypt/encrypt operations using two distinct 56-bit DES keys. This provides significantly higher security than a single encryption operation with one 56-bit DES key. Alternately, a public/private key system may also be used to encrypt information that passes between UIA 16 and RMC 14. Both DES and public key encryption is well known in the industry.

The UIA 16 also has secure memory that can store and retrieve the unique secret encryption keys used to enable secure communications with the RMC 14. In this embodiment, this is battery backed-up RAM that is set up to be erased whenever the tamper-detect circuitry reports that tampering has been detected.

To use encryption keys, a key management system must be employed to assure that both sender and receiver are using the same key. When using DES, a preferred key management system is DUKPT, which is well known in the industry. DUKPT is designed to provide a different DES key for each transaction, without leaving behind the trace of the initial secret key. The implications of this are that even successful capture and dissection of a UIA will not reveal messages that have previously been sent, a very important goal when the effective lifetime of the information transmitted is years. DUKPT is fully specified in ANSI X9.24. The DUKPT key table is stored in the secure memory.

Each UIA 16 preferably has a hardware verification code, unique to each UIA 16, and this UIA-VC 204 that is registered with the RMC 14 at the time of manufacture. This makes the UIA 16 uniquely identifiable to the RMC 14 in all financial transactions from that device. This UIA hardware verification code is stored in write-once memory.

UIA 16 physical security is assured by standard mechanisms. Preferably, these comprise tamper-detect circuitry, an enclosure that cannot be easily opened without visibly injuring the enclosure, erasable memory for critical secrets such as encryption keys, write-once memory for hardware verification, tight integration of all components, and "potting" of exposed circuitry.

Information such as the amount of a transaction, the verification of a User, or other transaction-related information is displayed using an integrated LCD screen 6. It is preferable that the LCD screen 6 be connected securely to the other components in the UIA 16 to maintain security.

Approval or cancellation of a financial transaction is done using the UIA keypad or touch screen.

An automated data scanner in the UIA 16 is used to read data about the User, such as the UUC 200, encoded within the UFT 62.

Optionally, the UIA 16 also validates public key digital certificates. In one embodiment, public keys of a particular certifying authority are initially stored in the UIA 16 at the time of construction. This provides the mechanism to verify a Financial Administrator's digital certificates that are signed by the certifying authority, or a Financial Administrator's digital certificates that are signed by the certifying authority.

Although a preferred embodiment is described above, there are many different variations on specific UIA 16 implementations. Fundamentally any device that is secure, can verify a User, a Financial Administrator or a Financial Administrator with a high degree of certainty, and can connect to the Master RMC 14 via some form of communication line can serve as a UIA 16.

In some embodiments, specifically the home use and public use instances, the UIA_VC 204 is not used to verify either the Financial Administrator or the User.

Registration

Parties that wish to either originate or receive financial transactions must first register with the Rule-Module Clearinghouse 14, and its Verification Platform 12. The verification and financial information registered with the system for a given party depends on the mode used to originate or receive settlement. A User must register at least one UUC 200 and a PVC 202, as well as a Pattern Data 54 such as financial accounts, along with establishing a Rule-Module 50 with at least one Execution Command 52 that can govern the accessing, deposit, display, deducting, and disbursing of financial data using at least one financial account. In the case of a Financial Administrator receiving electronic transfer of financial, the counter-party must also register: verification data unique to that Financial Administrator, such as a digital certificate, and; a financial account of the User. A Financial Administrator, usually a corporate entity, must register verification data unique to that entity with the RMC 14, such as a digital certificate and their UIA_VC 204.

For the User, this includes registering a User's registration financial accounts from magnetic stripe cards, paper checks, coupons, smart cards, and the like, and; a User's registration to link any such data to the User's UUC 200 and PVC 202 verification data, including the User's Rule-Modules 50. The User is assigned a UFT 62, encoded with the UUC 200 for that User.

Further data which is linked during registration to the User's UUC 200 may include: a driver's license number, a passport number, a debit account, a credit account, a checking account, a money-market account, a stored-value account containing pre-paid financial, and the like. Optionally, a stored value account with a participating Financial Administrator may be pre-credited with funds, or financial, from the Financial Administrator and for the use of which the User has pre-paid a premium to the Financial Administrator.

A User registers by submitting a registration PVC 202 obtained from the User, and the user being assigned UUC 200 which is encoded into a UFT 62. The UIA 16 confirms that the PVC 202 code is accurate, and in a preferable embodiment, scans the User's UFT 62 to determine that it and its encoded UUC 200 are non-fraudulent. The UIA 16 then translates and compresses this UUC-PVC encrypted packet into a format suitable for rapid electronic transmittal to the RMC 14. In one embodiment, the User selects and enters a PVC 202 into the UIA keypad or touch screen.

Next, the person associates at least one financial account with the registration UUC 200 in the system. Preferably, this is accomplished by automatically scanning a bar-code or a magnetic stripe through the data reader attached to the UIA 16. In one embodiment, this bar-code or magnetic stripe contains not only the User's financial account number, but also the verification of the Financial Administrator or financial institution with which this account is associated.

Preferably, an attendant verifies that the User actually owns the financial account by comparing personal photo id (a driver's license, passport, id card, etc) to the name listed on the financial card.

The UIA 16 transmits the registration data to the RMC 14. The Master RMC 14 then inserts the UUC 200 (or UUC-PVC) into the appropriate Verification Platform 12 platform and generates a Financial User Verification Approval Code 206 that is unique to the User. From this point on, any time the User is identified by the Verification Platform 12, the Financial User Verification Approval Code 206 is forwarded to the Master Rule-Module Clearinghouse 14 where it invokes at least one Rule-Module 50 for that User. In the Master Rule-Module Clearinghouse 14 platform, a Rule-Module 50 is created that is identified by the Financial User Verification Approval Code 206. In one embodiment, before a new UUC 200 (or UUC-PVC) record is enabled to originate or execute a financial transaction, the individual's submitted UUCs 200 are checked against previously registered UUC 200 in the electronic Verification Platform 12 using the same UUC 200 comparison techniques as those used in the individual verification procedure. If a match is found for the newly submitted UUC 200 record, the UUC 200 record's status is set to "prior registration". If the prior registration check was executed as part of a registration request, the Gateway Platform 26 forwards a "registering individual with prior registration" warning to the Prior Fraud Platform 27, indicating that the person has attempted to register with the system more than once.

In one embodiment, the Master RMC 14 validates the financial account data submitted during registration. This involves making certain that the financial account being registered is a valid account.

Any Financial Administrator may register verification data that is unique to that entity, such as an alpha-numeric verification code, a digital certificate, or a UIA_VC 204 to verify itself to the RMC 14. Digital certificates are available from certifying authorities, and they provide the assurance that the entity with the certificate is the authentic owner of that verifier. These certificates contain readable text and other information that describes the entity. This can include a corporate logo, the address, as well as the company name.

This entity verification data is then linked to at least one User Financial Account or a Financial Administrator Account. These financial accounts are respectively used to electronically debit or credit financial when the entity verification data is used to verify the Financial Administrator.

UIA_VC's 204 are unique numbers assigned to UIA 16 devices at the time of manufacture. A participating Financial Administrator installing UIA 16 devices at the point of sale can register User Input Apparatus 16 with the RMC 14. This causes any transaction, either registration or purchase, flowing through those registered User Input Apparatus 16 to automatically verify the participating Financial Administrator which owns the UIA_VC 204.

Preferably, the security surrounding the registration of an entity's digital certificates or UIA hardware verification codes to financial account numbers is extremely strong, as this is a potential source for large losses over a short period of time.

Network Communications

Communications via a Network 18 between the UIA 16 and the Verification Platform 12 occur via many different communication methods. Most depend on the particular communication networks already deployed by the organization or retailer that deploys the transmission authorization system.

In an embodiment the User Input Apparatus 16 are connected via Ethernet 18 to a Local or Subset router 18, which is itself connected to a network operations center (NOC) via frame relay lines. At least one Verification Platform 12 is located at the NOC. Messages are sent from UIA 16 to the Verification Platform 12 using TCP/IP over this network. In another embodiment, the User Input Apparatus 16 are connected via a cellular digital packet data (CDPD) modem to a CDPD provider, who provides TCP/IP connectivity from the UIA 16 to an intranet 18 to which at least one Verification Platform 12 is attached.

In yet another embodiment, a UIA 16 is connected via the Internet, as is at least one Verification Platform 12. TCP/IP is used to transmit messages from UIA 16 to to Verification Platform 12. There are many different ways to connect UIA 16 to Verification Platform 12, both tethered and wireless, that are well understood in the industry, including but not limited to: the Internet 18; an intranet 18; an extrane 18; a Local or Subset area network ("LAN") 18; and a wide area network ("WAN") 18.

Financial Transactions

Financial transactions optionally occur at a retail point of sale, across a network such as an intranet or the Internet 18, or at home or public Terminal 2.

Rule Module Clearinghouse

Data Processing Centers (RMC) 14 serve to verify the Financial Administrator and the User in a transaction, retrieve financial and financial account information for verified parties, and perform the execution that will result in settlement of transactions and financial delivery to a Financial Administrator for the financial transaction. The Data Processing Center 14 is comprised of an electronic Verification Platform 12, a Master Rule-Module Clearinghouse 14, an internal Execution Platform 38, a Firewall 24, a Decryption Platform 22, a Gateway Platform 26, and a Logging Platform 42.

Figure 2:
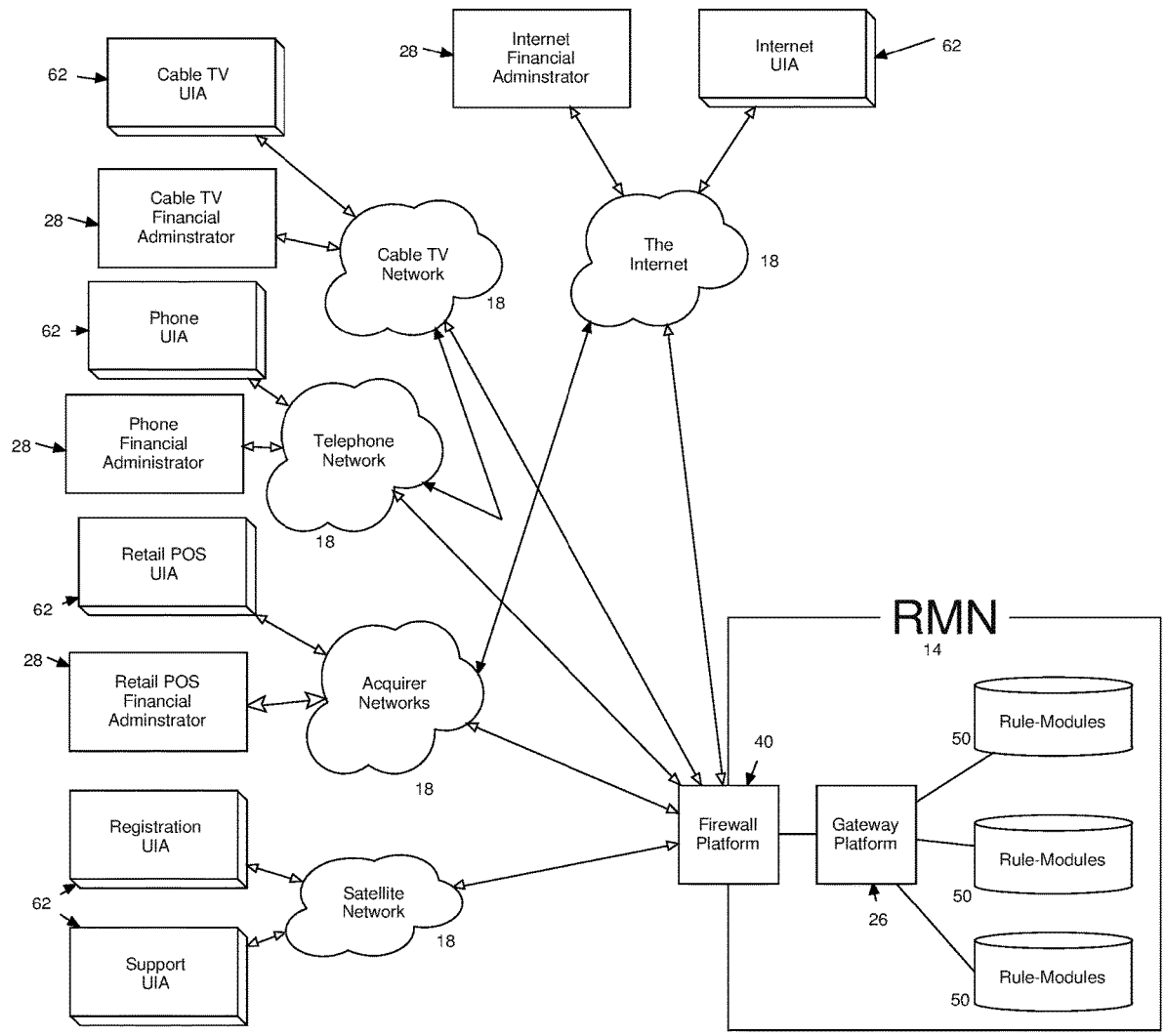
FIG. 2 shows a preferred embodiment of the Rule-Module Clearinghouse, showing the network connections with various Financial Administrators (FA).

As seen in FIG. 2, the Master RMC 14 is connected to a network, like the Internet 18 or intranet 18, using a firewall machine 40 that filters out all messages that are not from legitimate UIA 16 devices.

In a preferred embodiment, the messages are decrypted. For this, the transaction processor uses the Decryption Platform (DP) 22, which utilizes the hardware verification code of the UIA 16 to verify the encryption codes that is required to decrypt the message from the UIA 16.

Once decrypted, the verification of parties to the transaction is determined using the to electronic Verification Platform 12.

Electronic Verification Platform

The electronic Verification Platform 12 (Verification Platform) serves to verify the User in an electronic financial transaction. The Verification Platform 12 compares a User's bid UUC 200 from the User's UFT 62 with previously stored UUC 200 from registered Users, in order to verify the User. If a bid UUC 200 from the User's UFT 62 is successfully matched against a registered UUC 200 sample, and the User is positively identified, the User Verification Approval Code 206 which had been assigned to the User during initial registration will be forwarded to the Master Rule-Module Clearinghouse 14. The User Verification Approval Code transmitted by the Verification Platform 12 is used by the Master Rule-Module Clearinghouse 14 to locate the Rule-Modules 50 that are customized to that User.

As seen in FIG. 1, a Firewall machine 24 connects the Verification Platform 12 to the Internet 18 or intranet 18. Messages are sent to a Gateway Platform 26, which is responsible for overseeing the steps required to process the financial transaction, including forwarding the financial transaction to the Verification Platform 12 and the Master Rule-Module Clearinghouse 14.

Preferably, electronic messages transmitted between the UIA 16 and the Master RMC 14 are encrypted. For this, the financial transaction processor uses the Decryption Platform (DP) 22, which utilizes the hardware verification code of the UIA 16 to verify the encryption codes that is required to decrypt messages from the UIA 16. Once decrypted, the verification of the User is determined using Verification Platform 12, which provides storage, retrieval and comparison of UUC 200 from the User's UFT 62.

In an embodiment, during the User verification step, the Verification Platform 12 requests the User to submit their PVC, and this PVC is used by the Verification Platform 12 in to combination with the User's bid UUC 200 from the User's UFT 62 for purposes of validating the authorization of the User.

In another embodiment, the Verification Platform 12 provides periodic User re-verification queries. In this embodiment, in order for a User to extend an on-line session, the User is requested by the Verification Platform 12 to re-verify themselves using any of the following: a User bid UUC 200 from the User's UFT 62 or Pattern Data 54, such as a personal verification code ("PVC").

In another embodiment, a Financial Administrator or a Financial Administrator is also identified by the Verification Platform 12 using any of the following electronic verification means: a entity Financial Administrator Platform Code, a digital certificate, an Internet protocol ("IP") address, a UUC 200, a UIA_VC 204, or any other code, text or number that uniquely identifies the entity. In this way, the Verification Platform 12 is enabled to provide the User with confirmation that the correct entity participated in the electronic financial transaction. Examples include confirming that the correct web site or remote platform was accessed by the User, that the correct entity designee received the User's email or instant message, and the like.

In another embodiment, the Verification Platform 12 platform is integrated with the Master Rule-Module Clearinghouse 14 platform.

In a preferred embodiment, more than one Verification Platform 12 provides fault tolerance from either natural or man-made disasters. In this embodiment, each Verification Platform 12 uses a backup power generator, redundant hardware, mirrored platforms, and other standard fault tolerant equipment known in the industry.

Identification of the entity and the User occurs using different methods, depending on the verification information that is provided by the UIA 16. The Verification Platform 12 has subsystems for each type of information that is received by the Verification Platform 12, and each subsystem is highly optimized to provide rapid verification as outlined below.

In a preferred embodiment, Verification Platform 12 comprises subsystems that can verify parties from the following information:
UUC 200 data and Personal Verification Code (PVC);
UUC 200 data alone;
digital verification (digital certificates);
UIA_VC;
Biometric Identification Subsystem (BID).

In one embodiment of the Verification Platform 12, wherein a User registers with the RMC 14 a secondary PVC 202 with a biometric template, the BID subsystem comprises at least two BID processors, each of which is capable of verifying Users only from their scanned biometric sample, comprising any of the following biometrics: finger, retina, voice, face, hand, palm, iris.

In one embodiment, each BID processor contains the entire platform of registered biometrics. To distribute the financial transactions evenly across processors without undue effort, the Verification Platform 12 determines randomly which BID processor will be used for a given electronic financial transaction, and delegates the verification request to that BID processor. That BID processor performs a search of its BID platform in order to find a matching registered biometric sample. In another embodiment, there is a financial User re-registration check step, wherein the User's registration biometric is compared against previously registered biometrics wherein if a match occurs, the Rule-Module Clearinghouse 14 is alerted to the fact that the User has attempted to re-register, and a warning message is sent to the PFP 17.

In another embodiment, other information is present that assists the BID processor in searching the platform. For finger images, this includes information such as the classification of the image (whirl, arch, etc.), and other information about the finger ridge structure that is useful for selecting out biometrics that are not likely to match, or information on biometrics that are likely to match. Such biometric-based sorting and classification systems using mathematical algorithms, are known in the art for fingerprints and for other biometrics such as retina of the eye, voice print, and face vascular patterns.

In another embodiment, other information is present that assists the BID processor in searching the platform, including a User's primary PVC 202 or a User's UUC 200. The User's biometric is stored in a basket labeled with the User's UUC 200 or primary PVC 202, which may be non-unique. The PVC-labeled basket may contain a plurality of registered biometrics of a plurality of distinct Users, all of whom happen to have the same PVC 202. A biometric basket labeled with a PVC 202 contains a subset of all biometrics registered with the RMC 14, and therefore is more efficient, more cost-effective and more accurate to search. This is known as a "one-to-some" or "one-to-many". By contrast, conducting a "cold search" of all the biometric records stored in the system, without the aid of a PVC-labeled basket, can be far more expensive, slower and less accurate. This is known as a "one-to-all" search. The UUC-labeled basket can contain only one User's registered biometric(s). Conducting a search with the aid of the UUC-labeled basket can be the most efficient and accurate. This is known as a "one-to-one" search.

UUC-PVC Verification Platform

In a preferred embodiment, the Verification Platform (VP) 12 further comprises at least two Subset VP's 12, all being are capable of verifying parties from their UUC 200 and PVC 202.

Preferably, the records of parties identifiable from UUC-PVC combinations are distributed equally across all Subset VP's 12. In one embodiment, one Subset Verification Platform 12 is responsible for verifying Users with PVCs numbered 1-10, another Subset Verification Platform 12 is responsible for verifying Users with PVCs numbered 11-20, and a third Subset Verification Platform 12 is responsible for verifying Users with PVCs numbered 21-30. For example, all messages from the UIA 16 containing a PVC numbered would be routed to Verification Platform 12 for verification of the User.

Once a Verification Platform 12 receives a bid UUC 200 scanned from the User's UFT 62 by a UIA 16, along with a bid PVC 202 as entered by the User into the UIA 16, for verification, the processor searches through its platform, retrieving all registered UUC 200 that match or correspond to that particular bid PVC. Once all corresponding registered UUC 200 are retrieved, the Verification Platform 12 compares the bid UUC 200 obtained from the electronic financial transaction to all retrieved registered UUC's 200. If a match occurs, the Verification Platform 12 transmits the verification of the User or the User Verification Approval Code 206 to the Master Rule-Module Clearinghouse 14. If no match is found, the Verification Platform transmits a "not identified" message back to Gateway Platform 26 and to the logging facility 42.

In one embodiment, there is a UUC theft resolution step, wherein the financial User's PVC 202 is changed if the financial User's UUC 200 is determined to have been fraudulently duplicated.

Digital Identification Subsystem

In a preferred embodiment, the Digital Identification subsystem comprises multiple processors, each of which is capable of verifying an entity from their digital certificates. In this embodiment, digital certificates are used to perform digital verification of an entity. Preferably, these include corporate web site addresses and certifying authorities only. Where possible, computers provide digital certificates for verification of the Financial Administrator, and Users use their UUCs for verification of the User.

Verifying that a particular digital certificate is valid requires a public key from the certifying authority that issued that particular digital certificate. This requires that the digital verification subsystem have a list of certifying authorities and the public keys used to validate the digital certificates they issue. This table must be secure, and the keys stored therein must be kept up to date. These processes and others relating to the actual process for validating digital certificates are well understood in the industry.

UTA Hardware Identification Subsystem (UHI)

In a preferred embodiment, UIA_VC's 204 are translated into entity verification by the UHI subsystem. This subsystem maintains a list of all User Input Apparatus 16 manufactured. Preferably, when a particular User uses a UIA 16, that User's geographic location is identified by their use of that particular UIA 16 during that electronic financial transaction session.

In another embodiment, the UIA_VC 204 does not serve to verify either the User or an entity. This is the case in User Input Apparatus 16 installed in public venues such as airport Terminals 2, Automated Teller Machines in banks, or computers with User Input Apparatus 16 for home use.

Financial User Verification Approval Code

A User Verification Approval Code 206 or Financial User Verification Approval Code is an electronic message transmitted to the Master Rule-Module Clearinghouse 14, which informs the Master Rule-Module Clearinghouse 14 that a User has been successfully identified, and instructs the Master Rule-Module Clearinghouse 14 to invoke the Rule-Modules 50 for that particular User.

Rule-Module Clearinghouse

In a preferred embodiment, once the User is identified by the Verification Platform 12, the User Verification Approval Code 206 is forwarded to the Master Rule-Module Clearinghouse 14. The Master Rule-Module Clearinghouse 14 instructs the Execution Platform 38 to take the necessary steps for executing the Execution Commands 52 that are associated with the Pattern Data 54 registered with the Master Rule-Module Clearinghouse 14.

Rule-Modules

The Master Rule-Module Clearinghouse 14 is comprised of at least one Rule-Module 50 which contains Pattern Data or an Execution Command which is distinct to one registered User (hence, "User-Unique"). Therefore, at least one Rule-Modules 50 is unique and exclusive to an individual User. In the event that a Rule-Module contains pattern data and an execution command that is indexed to one or more registered Users, said Rule-Module is customized to a User but not unique to that User (hence, "User-Customized"). The Master Rule-Module Clearinghouse 14 functions as a central storage facility for registering, indexing, updating, and invoking various Rule-Modules 50, whereby the Rule-Modules 50 govern the deposit, the display, the deducting, and the dispensing of financial. Each of these Rule-Modules 50 is composed of at least one Pattern Data 54 which is associated with or electronically linked to at least one Execution Command. As defined herein, User-customized does not necessarily mean that any Pattern Data 54 or the Execution Command 52 is unique to a User, but rather that they are indexed to or are assigned to a specific User. As such, the same Pattern Data 54 or Execution Command 52 may be assigned to several specific Users, and hence would not be unique to any one User.

The Master Rule-Module Clearinghouse 14 optionally stores User-customized Pattern Data 54 that is unassociated with any User-customized Execution Commands 52 and optionally stores User-customized Execution Commands 52 that are not associated with any User-customized Pattern Data 54. Therefore, such unassociated Pattern Data 54 or Execution Commands 52 are optionally stored within the Master Rule-Module Clearinghouse 14 until they are associated with a Pattern Data 54 or an Execution Command 52 together thereby forming an executable Rule-Module 50.

In one embodiment, the Financial Administrator and the User register with the Rule-Module Clearinghouse 12 a roster of the User's financial data, including proprietary financial accounts of the User, along with any products or services of a Financial Administrator, each having a predetermined financial value. The value for each unit of financial data could be a dollar amount, a number of minutes of telephone calling time, points towards the purchase of a product or service, a percentage discount on current or future purchases, and the like. For rewards transactions, the Financial Administrator then designates the number of financial to be disbursed to Users based upon the occurrence of predetermined criteria. This criteria may include a credit or debit of financial in the User's financial account based on the User's purchasing patterns as a function of any of the following: time, demographics, frequency, recency, and amount of expenditure.

Once the Verification Platform 12 outputs a positive matching determination for a User, the User Verification Approval Code 206 is forwarded to the Master Rule-Module Clearinghouse 14. The Master Rule-Module Clearinghouse 14 takes the User Verification Approval Code 206, optionally along with the UIA_VC 206, the UIA 16 location data and the financial transaction request, and searches among the User's customized Rule-Modules 50 to invoke all of the Pattern Data 54 relevant to the financial transaction being undertaken.

In another embodiment, the Master Rule-Module Clearinghouse 14 stores and manages the account balances of financial accounts for participating Financial Administrators, Users, and counter-party entities in an In-House Registry 15. Further, The Master Rule-Module Clearinghouse 14 may contain Execution Commands 52 to display the financial account status, calculations, and adjustments, and the like for participating Financial Administrators, counter-party entities, and Users.

Pattern Data (PD)

As previously noted, Pattern Data 54 may be provided by the User, by the Master Rule-Module Clearinghouse 14, or by an authorized financial entity 28, while the User provides at least one associated Execution Command 52, to form a single Rule-Module 50.

Pattern Data 54 of a User is stored electronic data, which is customized to at least one User. A single Pattern Data 54 includes any of the following stored User-customized and User-unique electronic data: a primary personal verification code (PVC) 202, which is optionally alpha-numeric; demographic information; an email address; a UIA_VC 206; a financial account; a stored-value account containing pre-paid or pre-earned financial; the User's date of birth; a secondary PVC 202; a telephone number, User Account Data; Financial Administrator Account Data a mailing address; purchasing patterns; financial accounting data; a UUC 200. Although a UUC 200 is optionally used as Pattern Data 54, the UUC 200 is unique to each User and is not shared between Users.

Any such Pattern Data 54 may be provided to the Master Rule-Module Clearinghouse 14 by: a User; an Master Rule-Module Clearinghouse 14; or an authorized third-party 28 such as a Financial Administrator.

Pattern Data—Financial Account Data

Financial account data is any information pertaining to a User Account or a Financial Administrator Account (respectively, User Account Data and Financial Administrator Account Data). Such data includes any of the following: a number which uniquely locates or routes a transaction to a financial account; a number which uniquely identifies a financial account; instructions or commands pertaining to the processing of a financial transaction, including which financial account should be used under which circumstances, the number of units of financial to be debited from a User Account under which circumstances and the number of units of financial to be credited to a Financial Administrator Account under which circumstances. Such circumstances may include: User usage location, User usage frequency, User usage recency, User usage demographics and User usage volume of electronic financial transactions.

Execution Commands (ECs)

The Execution Commands 52 executed by the Execution Platform 38 transmits electronic messages necessary for depositing, displaying, deducting, or disbursing financial. Such Execution Commands may include: a pre-calculated formula for surcharging a User's financial account during a financial transaction, such that said surcharge is automatically disbursed to a financial counter-party; a pre-designation that financial accounts are to be displayed to the User such that the User can select which financial account to invoke for the financial transaction; a pre-designation that financial counter-party entities are presented to the User on a UIA Display 6 such that the User may select which entity will be the counter-party of the financial transaction disbursement; a pre-designation that purchases from certain participating Financial Administrators will automatically invoke a financial disbursal to at least one certain financial counter-party; a pre-designation that upon accumulation of certain types of financial, such as frequent-flyer miles or free phone minutes, such types of financial will be automatically disbursed to a pre-designated financial counter-party; User Account Data; Financial Administrator Account Data; a pre-designation that upon accumulation of certain amounts of financial, there will be a disbursal to at least one pre-designated financial counter-party; a pre-designation that upon one financial counter-party having received a certain quantity of financial transactions from the User, perhaps even within a certain timeframe, the User will be notified or further financial disbursal will automatically transfer to a different counter-party.

In one embodiment of a scrip transaction, a Rule-Module 50 from the Master Rule-Module Clearinghouse 14 contains an Execution Command 52 which permits a Financial Administrator to itself contribute financial directly to a Financial Administrator based upon a User's purchases. In such transactions, units of financial are electronically debited from the User Account controlled by the Financial Administrator, and corresponding units of financial are electronically credited to the Financial Administrator Account.

The Rule-Module Clearinghouse's 14 Execution Commands 52 may further provide several execution designations including any of the following: immediate cash discounts or premium charges to a User's financial account during a commercial transaction; a deduction of financial units from a User's financial account, and an immediate transaction thereof via electronic funds transfer (EFT) to a Financial Administrator; and an accrual of financial which are credited towards a User's future purchase of a product or service.

Any Execution Command 52 is invoked by any Pattern Data 54 with which it is associated. As shown in FIG. 7, in one embodiment, a single Pattern Data 54 is associated with multiple Execution Commands 52, thereby forming multiple Rule-Modules 50. Also shown in FIG. 7 is another embodiment, where multiple Pattern Data 54 are associated with a single Execution Command, again forming multiple Rule-Modules 50. Also shown in FIG. 6, another embodiment there is only one Pattern Data 45 associated with one Execution Command 52. Any User-customized Execution Command 52 may be provided to the Master Rule-Module Clearinghouse 14 by the User.

Figure 5:
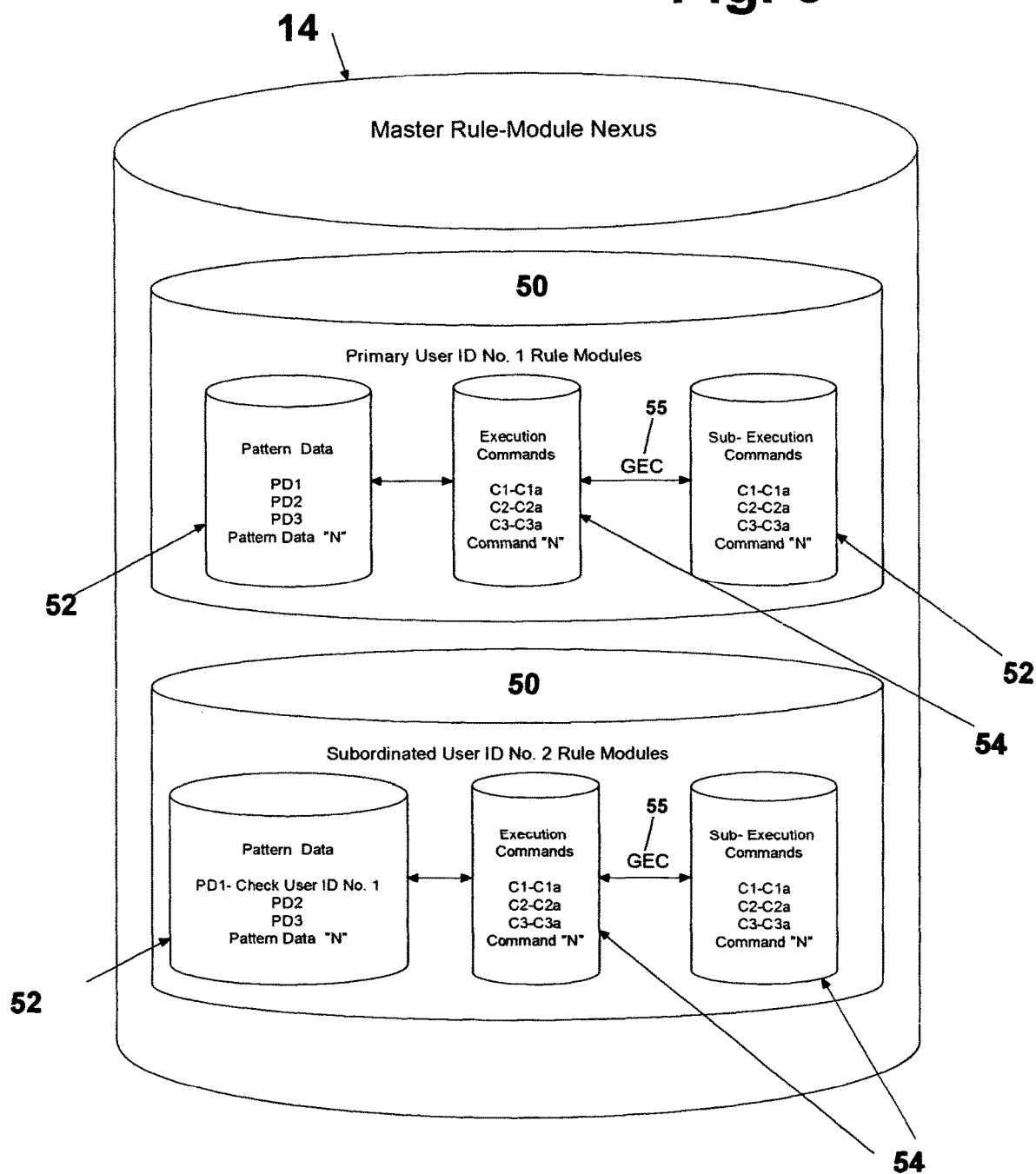
FIG. 5 shows an embodiment of the Rule-Modules for a plurality of Users within the Rule-Module Clearinghouse.

As shown in FIG. 7, in one embodiment, a single Pattern Data 54 is associated with multiple Execution Commands 52, thereby forming multiple Rule-Modules 50. Also shown in FIG. 5 is another embodiment, where multiple Pattern Data 54 are associated with a single Execution Command, again forming multiple Rule-Modules 50. Also shown in FIG. 6, another embodiment there is only one Pattern Data 45 associated with one Execution Command 52. Any user-customized Execution Command 52 may be provided to the Clearinghouse 14 by any of the following: the user, the Clearinghouse 14, or an to authorized third-party.

There are several embodiments of user-customized Execution Commands 52 that govern access to electronic data such as web sites, web site content and platforms. In one embodiment, an Execution Command 52 governing electronic transmissions for data access is a Global Execution Command (GEC) 55 that is unique to the user. Each such Execution Command 52 is optionally invoked by the User Verification Approval Code 206 serving as the Pattern Data 54. This Execution Command 52 is a software command that provides an authorized user access to any secured electronic data, such as those on third-party 28 platforms. Invoking this Execution Command 52 enables the user to simultaneously access all Internet chat or messaging forums, web sites and on-line platform content to which the user has authorization.

In another embodiment, the third-party 28 being contacted by the user for data access is also identified by the Verification Platform using public/private key cryptography. Once the third-party is successfully identified by the Verification Platform, this invokes a Rule-Module in the Clearinghouse which is unique to this third-party and which is used to confirms to the user that the correct third-party platform was accessed.

In another embodiment, the Global Execution Command 55 is an Execution Command 52 that activates any of the following: a plurality of the Financial Accounts of a User; all of the Proprietary Financial Accounts of a User, an on-line or Internet-connected device, such as a wireless pager, a wireless or tethered telephone, a network computer, an exercise machine that is connected to the Internet, an electronic book; an on-line public access Internet Terminal 2, an automobile or household appliance that is connected to the Internet, an Internet-connected personal digital assistant such as a Palm Pilot™; an on-line photocopy machine; an Internet-connected digital audio player such as the Rio™. In several such instances, the executed Rule-Module 50 renders the on-line or Internet connected device operational and permits the user that has gained access using their UUCs to conduct on-line activity to control or otherwise access the above mentioned Internet connected devices. For example, in one embodiment, an exercise machine incorporates a UIA 16 and is connected to the Internet. A user of the exercise machine enters their UUC 200 sample, which is compared to registered UUC 200 by the Verification Platform 12. Once the user is identified using their UUC 200, and the exercise device is identified using its hardware verification code, the Rule-Module executes a command allowing the user to gain access to the exercise device. Optionally, additional Rule-Modules 50 allow a user to save the details of their exercise activity (number of times, weight amount, date of exercise, etc.) on that exercise device as Pattern Data 54, in order to keep track of past performance and as a template for future exercise routines.

In another embodiment, an Internet-connected electronic book that incorporates a UIA 16, is activated when the Verification Platform successfully identifies the user. This allows the user to download text and graphics of complete novels or films for which they have previously paid.

In another embodiment, a personal digital assistant, such as the Palm Pilot™, incorporates a UIA 16. When activated after the Verification Platform 12 has successfully identified the user, the personal digital assistant permits the user to download and take on-line academic examinations. In another embodiment, an Internet-connected digital audio player such as the Rio™, incorporates a UIA 16. When activated as a result of successfully verification of the user by the Verification Platform 12, the audio player permits the user to download music for which they have authorization. Optionally, additional Rule-Modules 50 can track how many pages of the electronic book have been displayed and can retain a bookmark for the most recently read page. Optionally, additional Rule-Modules 50 can track how many times a downloaded electronic audio track has been played.

Upon the Verification Platform's 12 successful verification of the user from their bid UUC 200 and bid PVC 202, other embodiments of Execution Commands 52 governing electronic transmission access include permitting the user to access their health insurance account and validate their benefits to a health-care provider prior to being admitted to a hospital, to access their pre-paid entertainment account and validate to admittance personnel their eligibility to attend an entertainment event, such as a live music concert on a pre-prescribed day, at a pre-prescribed time and to sit in a pre-prescribed seat, to access their video club account and validate to a Financial Administrator their eligibility to rent videos under their pre-paid membership, to access their driver's license on-line and validate to an authority their eligibility to drive a car, to purchase restricted products like alcohol or tobacco, or to access a restricted entertainment event such as an R-rated film being shown in theatres, to access their credit-rating account and validate to a cashier their eligibility for check-writing privileges, to access an Internet web site and enter a real-time chat room with other people on-line.

Further embodiments of Execution Commands 52 governing electronic transmission access include entitling a user to extend an on-line user-customized session by repeating their user-customized session log-in by entering either their UUC 200 or at least one of their user-customized Pattern Data 54 when periodically queried to do so by the Verification Platform 12 or Clearinghouse 14, to access customized radio or television programming, wherein the user can be provided with customized programming, with or without time restrictions, that reflects pre-designated preferences, such as a channel broadcasting only news on companies in which the user has an investment or a channel broadcasting only music from Broadway theater shows which the user has seen or indicated a desire to see, to access restricted portions of corporate intranet 18 platforms on a selective basis, based upon pre-designated Pattern Data 54, such as the user's job title or company division, to access their travel reservations and validate to the admittance attendant that the user is eligible to travel, such as boarding a particular flight or a specific train, on a pre-prescribed day, at a pre-prescribed time, and to sit in a pre-prescribed seat, to access on-line position "papers" of user-customized political candidates and electoral ballot initiatives, and validate to an authorized third-party that the user is eligible to vote in particular elections, such as voting for a particular candidate running from a particular user-customized district.

There are several embodiments of user-customized Execution Commands 52 governing the processing of electronic data and electronic transmissions. Such Execution Commands 52 can govern: user-customized notification preferences for such electronic transmissions as real-time medical updates, pending Internet auctions, electronic stock trades and the like; user-customized instructions for user-location designating, for example, that the user may be located by third parties via whichever UIA 16 the user is using during an indicated time period, whereby the user can automatically receive their e-mails, instant messages, phone calls, faxes, and the like in real-time at the particular UIA 16 in use by him; user-customized travel customizations such as the user's preferences for lodging accommodations, travel costs, food, travel locations, and the like.

Further embodiments of user-customized Execution Commands 52 governing the processing of electronic data and electronic transmissions include: user-customized verification presentation preferences depending upon various pre-designated criteria such as the verification of a particular counter-parties, the user's sending location, and the like, whereby a user's pre-selected personal identifier, such as a distinct audio or visual sample, is electronically presented to a third-party counter-party of the user's electronic transmission; invocation of user-customized Internet environment preferences, whereby a user's preferences are used to create a customized Internet web portal with the user's preferred search engines, bookmarks, and the like; user-customized data presentation preferences, whereby the priority, formatting and organization of displaying data is pre-designated by the user, user-customized Internet search engines, and; user-customized intelligent data tracking and extrapolating agents.

In one embodiment of an Execution Command 52 governing the processing of an electronic transmission, the user-customized Internet search engine is customized to locate, retrieve and present electronic transmissions for the user using an intelligent tracking and extrapolating agent. In one embodiment, the user's customized Rule-Modules 50 provide instructions that even when the user is not logged onto a network, the Pattern Data 54 and Execution Commands 52 are periodically and automatically executed, added, changed or deleted based on the user's previous UIA 16 and on-line usage patterns. As a result, the user-customized search engine is automatically and progressively refined and customized to the user's evolving preferences and on-line activity patterns as tracked and interpreted by the user's own electronic, automated intelligent agent.

As an example of the above, the user's intelligent agent can direct the user's search engine to automatically conduct periodic, customized on-line data retrievals reflecting user-customized priorities for: product or service promotional offers or discounts via email or instant messaging; user-customized investment updates; user-customized medical or health information; competitive product or service prices across a broad range of on-line Financial Administrators; hobby or recreational interests; interactive user-customized on-line advertisements, wherein product or service providers are permitted to provide unsolicited information to a user based upon certain user-customized criteria; on-line event calendaring, wherein a user is automatically notified of upcoming events or activities reflecting their interests.

Further, the intelligent agent can extrapolate from the user's existing preferences and on-line activity patterns to automatically and periodically recommend to the user new data that may expand or delete the user's Pattern Data 54 and Execution Commands 52 based upon the intelligent agent's algorithmic projection of what the user's on-line preferences and activities will be in the future.

In another embodiment, an Execution Command 52 functioning as an intelligent tracking and extrapolating agent centrally integrates data on the user's Internet browsing to provide user-customized recommendations on new products and services available from any number of Internet web sites or Internet Financial Administrators. Examples include the Execution Commands for retrieval of new types of music, books, and investment opportunities that reflect the user's preferences, but that such recommendations are pre-selected based on the Execution Command 52 having automatically conducted competitive price-comparisons from various third-party platforms. In another embodiment, an Execution Command 52 integrates user-customized data from a user's calendaring or scheduling software program to provide the user with customized recommendations on user-customized offering for products, services or upcoming events based on the user's pre-scheduled activities in their on-line calendar.

In another embodiment, an Execution Command 52 appends a customized, user-customized audio or visual identifier which accompanies an electronic transmission for presentation to the counter-party. This identifier is appended to the user's electronic transmission as a form of "electronic personal signature" to readily notify the counter-party that the authenticated user sent the message. This identifier may be a unique image or sound sampled from the user, or it may be a non-unique, distinct graphical or audio selected by the user to reflect their personal preferences, such as a cartoon image or a favorite sound or audio tone.

In another embodiment where greater security is required, an Execution Command 52 governs the appending of a user-unique network credential or digital certificate to an electronic transmission. If a user employing a UUC 200 seeks to append their digital certificate to an electronic transmission, the user stores at least one command to sign electronic documents using their private keys, which are themselves centrally stored on a Clearinghouse 14 server. As such, the user's private keys are invoked as a header for the user's electronic transmission which, in combination with the electronic document itself and an MD5 calculation of the document, together form a digital signature. At a later time, an authorized counter-party can use the user's public key from the Master RMC 14 or a third-party certifier to verify the authenticity of the sender and the electronic document's contents to yield a secure, authenticated electronic transmission. In this way, users do not have to manage their own private keys, nor do they have to retain physical possession of their digital certificates via smart cards or personal computers with resident user-customized data. In one embodiment, public keys of a particular certifying authority are initially stored in the UIA 16 at the time of construction.

In another embodiment, an Execution Command 52 governs the processing of an on-line, user-customized calendaring program or Internet calendaring web site, wherein the user's on-line scheduling calendar is automatically updated by the user-customized search engine and the user-customized intelligent search and tracking agent based upon user-customized Pattern Data 54. This could include, but would not be limited to, automatically updating the user's on-line calendar based on upcoming: user-customized entertainment events, user-customized business seminars, user-customized airline discounts to the user's preferred destinations, user-customized candidate and elections bulletins, and the like.

In another embodiment, the user pre-designates Execution Commands 52 governing the processing of electronic transmissions which filter the access and presentation of data when the user is subordinated user who is co-registrant or legal dependant of the primary user himself. Examples of such subordinated users could be the children or the spouse of a user. Examples of such access and presentation, or viewing, filters may be restrictions pre-designated by the primary user governing: subordinated user access to Internet web sites with adult or violent content; subordinated user access to on-line television or radio programming with adult or violent content; subordinated user access to the Internet 18 with restrictions covering on-line session length; subordinated user access to educational on-line resources which are automatically "pushed" to the subordinated user during a particular on-line session, as pre-determined by the primary user, in order to pro-actively circumscribe the content which a particular subordinated user is permitted to view or download.

In another embodiment, an Execution Command 52 provided to the Clearinghouse 14 by an authorized third-party, such as a user's employer, governs the processing and prioritization of electronic transmissions to the user on an intranet 18. As such, the Execution Command 52 determines which electronic transmissions are automatically "pushed" to the user during a particular on-line session, as pre-determined by the authorized third-party, in order to pro-actively circumscribe the content which a particular user is permitted to view or download Embodiments of user-customized Execution Commands 52 governing the display or presentation of electronic transmissions include controlling the organization and prioritization of on-line content such that text, audio and graphics are displayed according to a user's pre-determined preferences. This includes displaying informational updates in a certain prioritization order, wherein user-customized regional news may be presented prior to national or international news, displaying expenditure records in user-customized categories which reflect anticipated tax deduction categories, such as home improvement expenses, charitable contributions, and the like, displaying customized user-customized Internet web sites or portals, including the user's pre-designated bookmarks, preferred web links, calendaring programs, email mail addressing rosters, multiple email accounts with their accompanying inbox messages, user-customized instant messaging "buddy" lists.

Other embodiments of user-customized Execution Commands 52 governing the display or presentation of electronic transmissions include: displaying accrued user-customized consumer rewards incentives or customized on-line advertising according to a user's prescribed priorities, such that skiing apparel is presented to the user at a time based on their calendaring program's designating their scheduled winter vacation or such that an advertisement for new coffee flavors from the user's preferred vendor is presented during the user's morning log-on session; displaying the user's customized fitness program on an Internet-connected exercise machine, whereby the user is reminded of the number of repetitions the user performed at what difficulty level during their last exercise session, and thereby also presents a recommended number of repetitions and a recommended difficulty level for the user's current session.

Other embodiments include Execution Commands 52 governing: presentation or display filters which circumscribe what text, graphic or audio content the user is permitted to view; presentation or display filters which govern which products or services a user is permitted to purchase, such as a subordinated user whose parent is a primary user, and where the subordinated user is prohibited from purchasing cigarettes, is limited in their selection of on-line Financial Administrators, is limited in the amount of on-line session time the user is permitted to have in a single day, and the like Preferably, each verification request and each transmission request, whether successful or not, is logged in the Logging Platform (LF) 42.

In a preferred embodiment, more than one Clearinghouse 14 platforms provide fault tolerance from either natural or man-made disasters. In this embodiment, each Verification Platform uses a backup power generator, redundant hardware, mirrored platforms, and other standard fault tolerant equipment known in the industry Global Queries and Global Execution Commands In one embodiment of the invention, the customer management data from a User's scanned UFT 62 matches Global Queries 53 which invoke customer-customized Pattern Data 54 which in turn invoke Global Execution Commands 55. An example would be as follows: upon the Verification Platform 12 having generated a Verification Approval Code 206 as a result of a successful match of the User's bid UUC 200 scanned from the User's UFT 62 and bid PVC 202 as gathered by the UIA 16, the Verification Platform 12 submits that customer's unique Verification Approval Code 206 to the Clearinghouse 14. In this embodiment, all submitted Verification Approval Codes 206 automatically match to a set of Global Queries 53 in the Clearinghouse 14. For example, when any Verification Approval Code is submitted, it matches automatically with Global Queries 53 such as the following: "What is the customer's income level?"; "What that the customer's home address?"; "What is the customer's account status?". The answers to these Global Queries 53 are contained in the customer-customized Pattern Data 54 which are statements that contain data customized to the customer. In this example, the Pattern Data 54 responses to the above Global Queries 53 are, respectively, as follows: "Fifty-five thousand dollars"; "206 Walnut Street, San Francisco, Calif."; "All payments are current". In this embodiment, these Pattern Data 54 responses invoke Global Execution Commands 55 which govern automatic response programs such as, respectively: "Send the customer a notice of newly allowable tax deductions courtesy of H&R Block® accountants"; "Inform the customer via email that there is a sale on compact disc stereo systems at the Circuit City® retail store in Emeryville near his home"; "Notify the customer that he is eligible to enter into the biller's drawing for free apparel and sports accessories as an incentive because his account is in good standing". In this embodiment, therefore: the Global Queries 53 and the Global Execution Commands 52 apply automatically to any or all Verification Approval Codes 206 that are submitted to the Clearinghouse 14, and are actually non-specific, or non-customized, to any particular customer; however, the Pattern Data 54 is specific to, or customized to, the specific customer whose Verification Approval Code 206 has been submitted. In this manner, this embodiment renders a platform architecture for the Clearinghouse 14 that has: customer-customized sub-platforms with customer-customized Pattern Data 54; while the Global Queries 53 and the Global Execution Commands 55 sub-platforms are not customized to any one single customer.

Execution Commands—Financial Transactions

Figure 13:
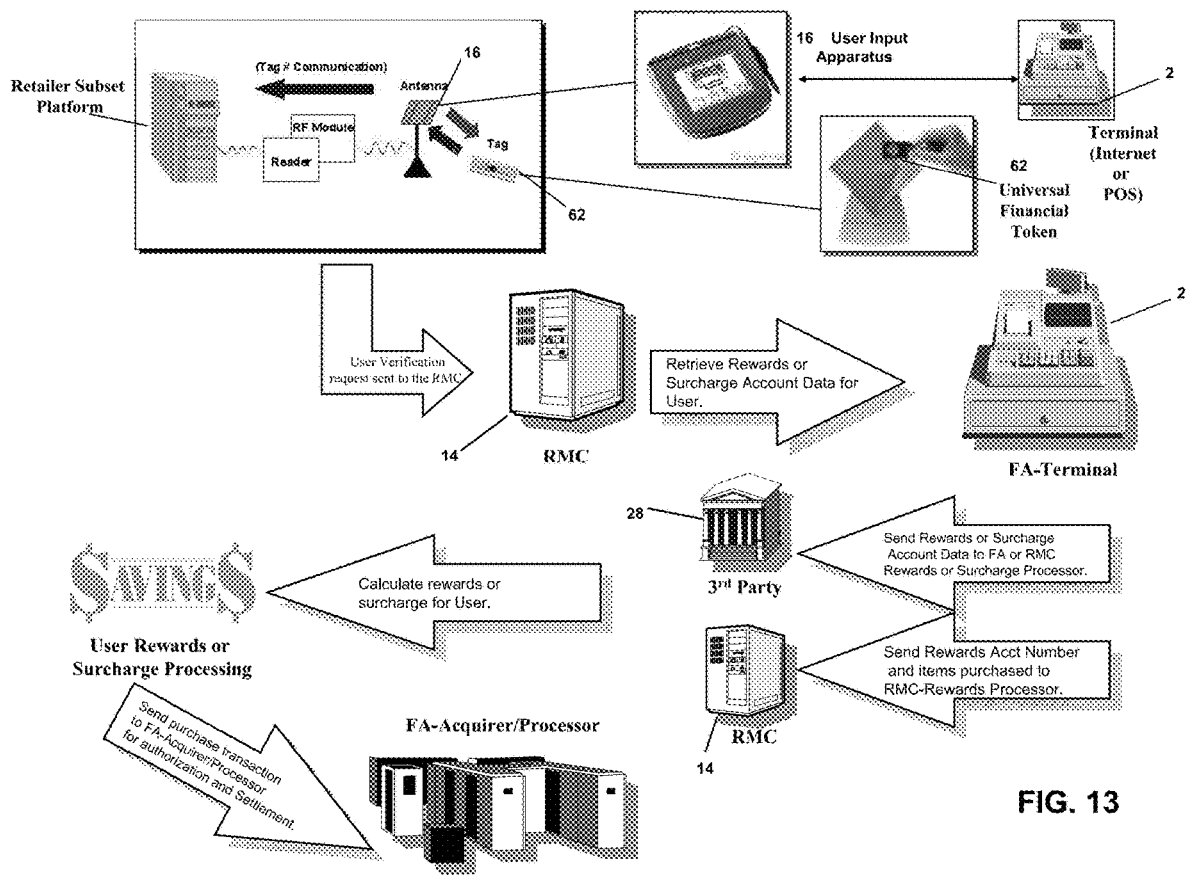
FIG. 13 shows a RMC financial transaction for rewards.

As shown in FIG. 13, this embodiment of the Rule-Module Clearinghouse 14 executes a rewards or coupon transaction: a transaction is sent from the UIA 16 to the RMC 14 for a User's UUC-PVC verification; the RMC 14 retrieves the customer's rewards account number and purchasing account information (e.g., credit account number); the rewards account number and list of items purchased are sent to the Financial Administrator (FA)-Rewards Processor; the FA-Rewards Processor generates predetermined rewards, coupons or incentives; the purchase price, along with the customer's purchasing account information, are sent to the FA-Acquirer for authorization and later settlement.

Figure 14:
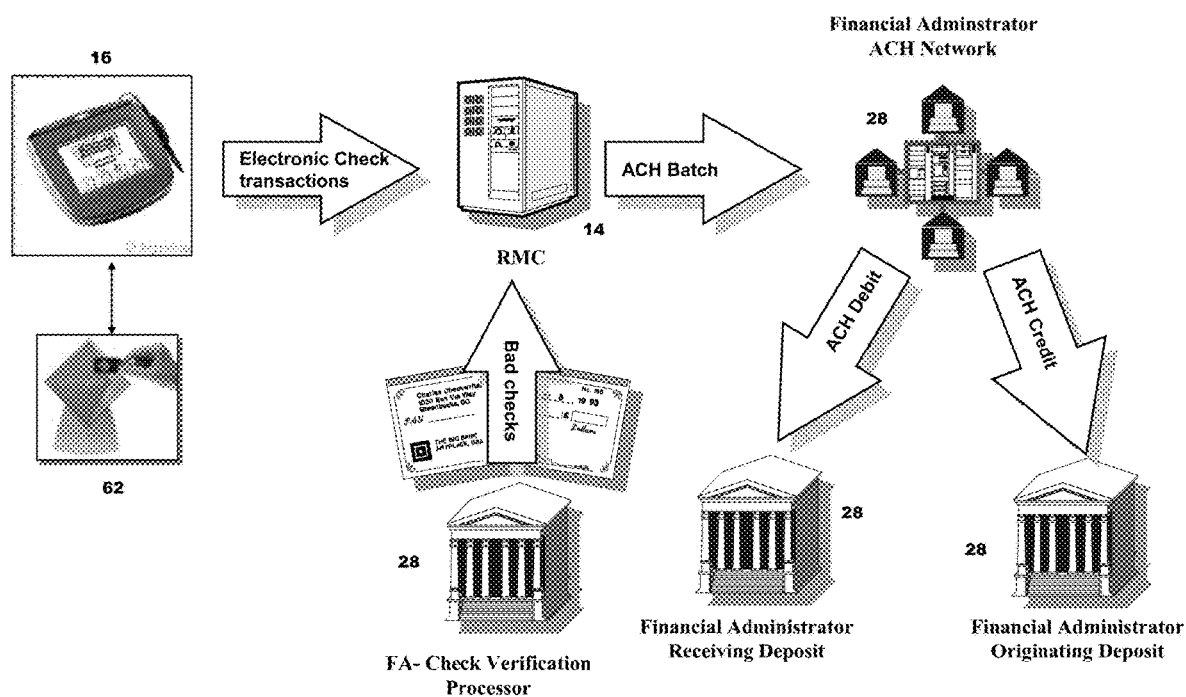
FIG. 14 shows a RMC financial transaction for an electronic check (eCheck).

As shown in FIG. 14, this embodiment of the Rule-Module Clearinghouse executes an electronic check transaction: a) the retail UIA at point of sale sends the e-Check transaction data to the RMC for a User's UUC-PVC verification; b) a positive matching verification enables the transaction to then be passed along to a FA-Check Verification Processor where certain high-risk e-Check transactions are vetted by in order to weed out previously tagged bad check writers, and to avoid a decline at the point of sale; the e-Checks are then batched and sent to the FA-ACH Network for processing; the ACH Network then doles out ACH credits and debits to the appropriate Originating Depository Financial Administrators (ODFA) and Receiving Depository Financial Administrators (RDFA).

Figure 15:
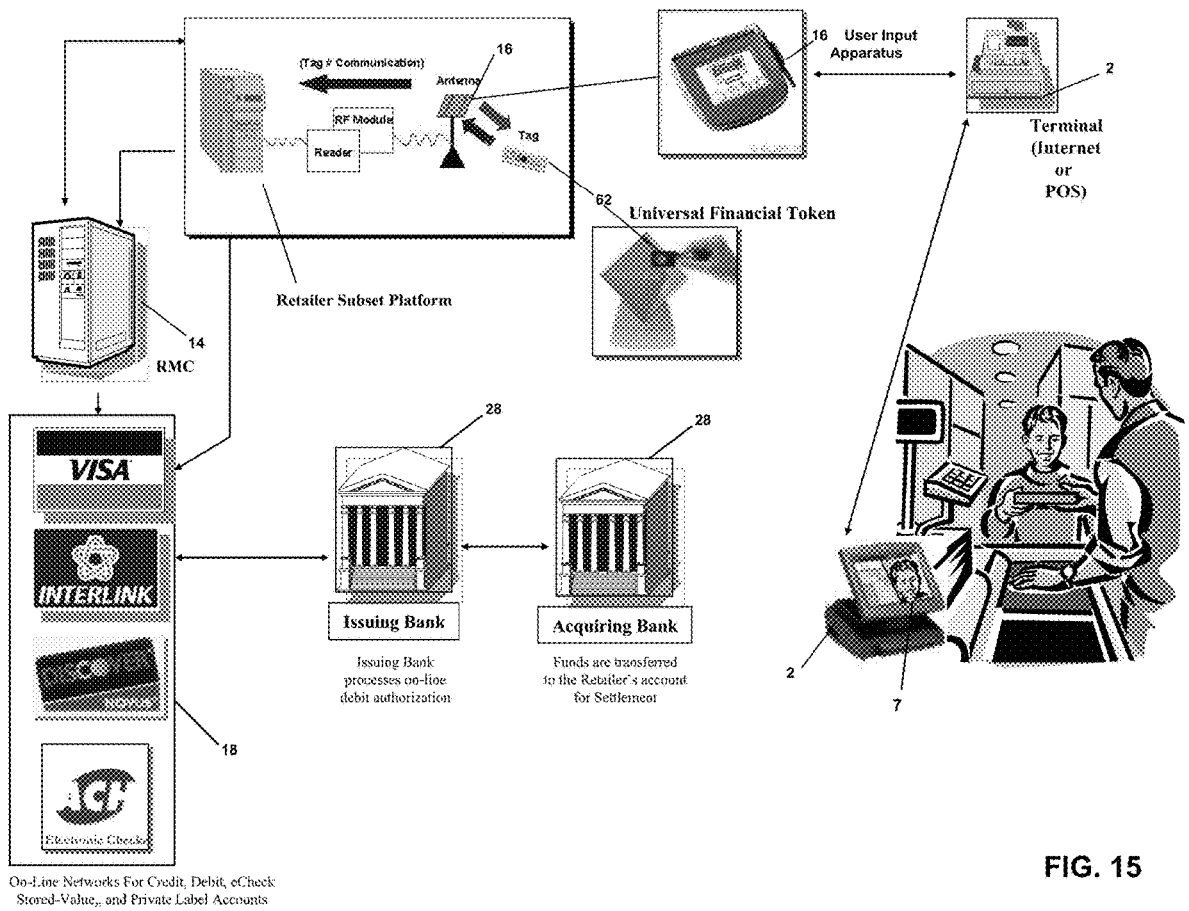
FIG. 15 and FIG. 16 show RMC financial transactions for Credit and Debit.
Figure 16:
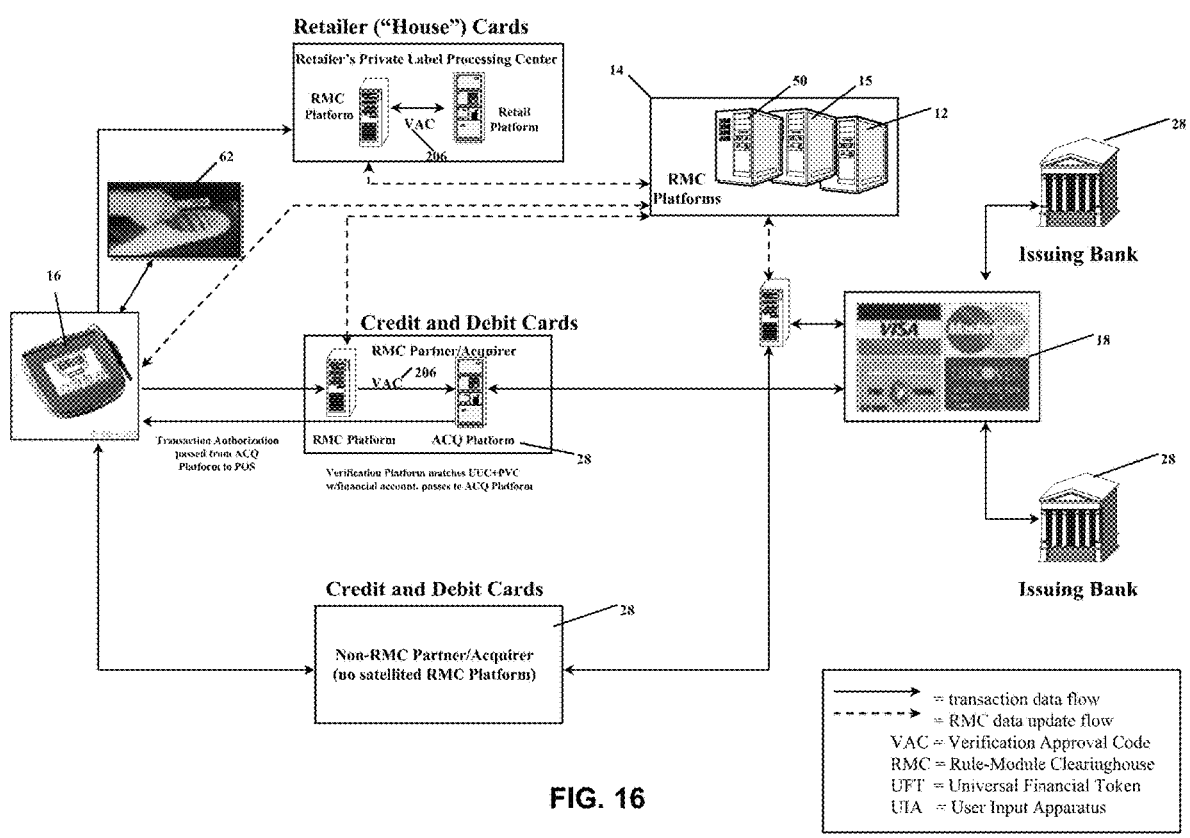

As shown in FIG. 15 and FIG. 16, these embodiments of the Rule-Module Clearinghouse executes credit and debit transactions: a User's Unique User Code (UUC) is scanned from his Universal Financial Token (UFT) 62 by the User Input Apparatus (UIA) 16; the User enters his Personal Verification Code (PVC) into the UIA 16, where both the UUC 200 and PVC are encrypted; the financial transaction data is appended to the UUC-PVC packet, either automatically if the UIA 16 is integrated with the Terminal-Electronic Cash Register (ECR) 2, or; manually by a cashier if the UIA 16 is not integrated directly to the Terminal-ECR 2; the packet is transmitted to the Rule-Module Clearinghouse (RMC) 14 for User verification and financial account access; the RMC 14, upon verifying the User, invokes Rule-Modules of the User, returns the User's financial account data along with the User's name and Private Code for display to the User via the UIA; the User recognizes his name, Private Code, financial accounts as seen on the UIA Display 6, and selects a financial account either by entering an alphanumeric code, or touching a financial account icon, for payment at a Financial Administrator (FA)-Retailer; the UIA-Terminal 2 at FA-Retailer either transmits the encrypted financial transaction to a modem bank at the FA-Processor 28 which handles FA-Retailer's credit card transactions on behalf of FA-Retailer's Acquiring Bank 28, or, transmits the encrypted financial transaction to the RMC 14, which then forwards it to the FA-Processor 28; the selected financial account data tells the FA-Processor 28 to route the transaction data (account number, issuing bank code and transaction amount) to the appropriate on-line network 18, with a query as to whether the account is valid and the transaction can be authorized; the account data tells the FA-Processor 28 to route the query to the FA-Issuing Bank 28, which determines that the account is valid, the credit balance is sufficient to cover the amount of the transaction; the FA-Issuing Bank 28 responds affirmatively to the FA-Processor 28; the FA-Processor 28 hands off the approval to the FA-Acquirer Bank 28, which routes the approval to FA-Retailer 28 and marks FA-Retailer's account for settlement.

FIG. 15 also shows the user verification means further comprising a user facial photograph display means, whereupon if the VP 12 outputs a positive matching determination that the user is authorized to access the rule-module database, the RMC 14 transmits the user's registered facial photograph 7 for the UIA 16 or the Terminal 2 to display for a third-party present, such as a cashier, in real-time during the financial transaction, to visually compare the user's actual with the user's displayed facial photograph 7.

FIG. 16 also shows Subset RMC Platforms 17 co-located with an FA-Processor 28, including private label "house accounts", Visa, MasterCard, Discover, Interlink and Amex. Upon the RMC's verification of the User's bid UUC-PVC data, the credit/debit card and merchant point-of-sale financial transactions are processed through both the RMC partners and third-party, non-partner FA-Acquirers 28. The Master RMC Platforms 14 updates the Subset RMC Platforms 17.

Figure 17:
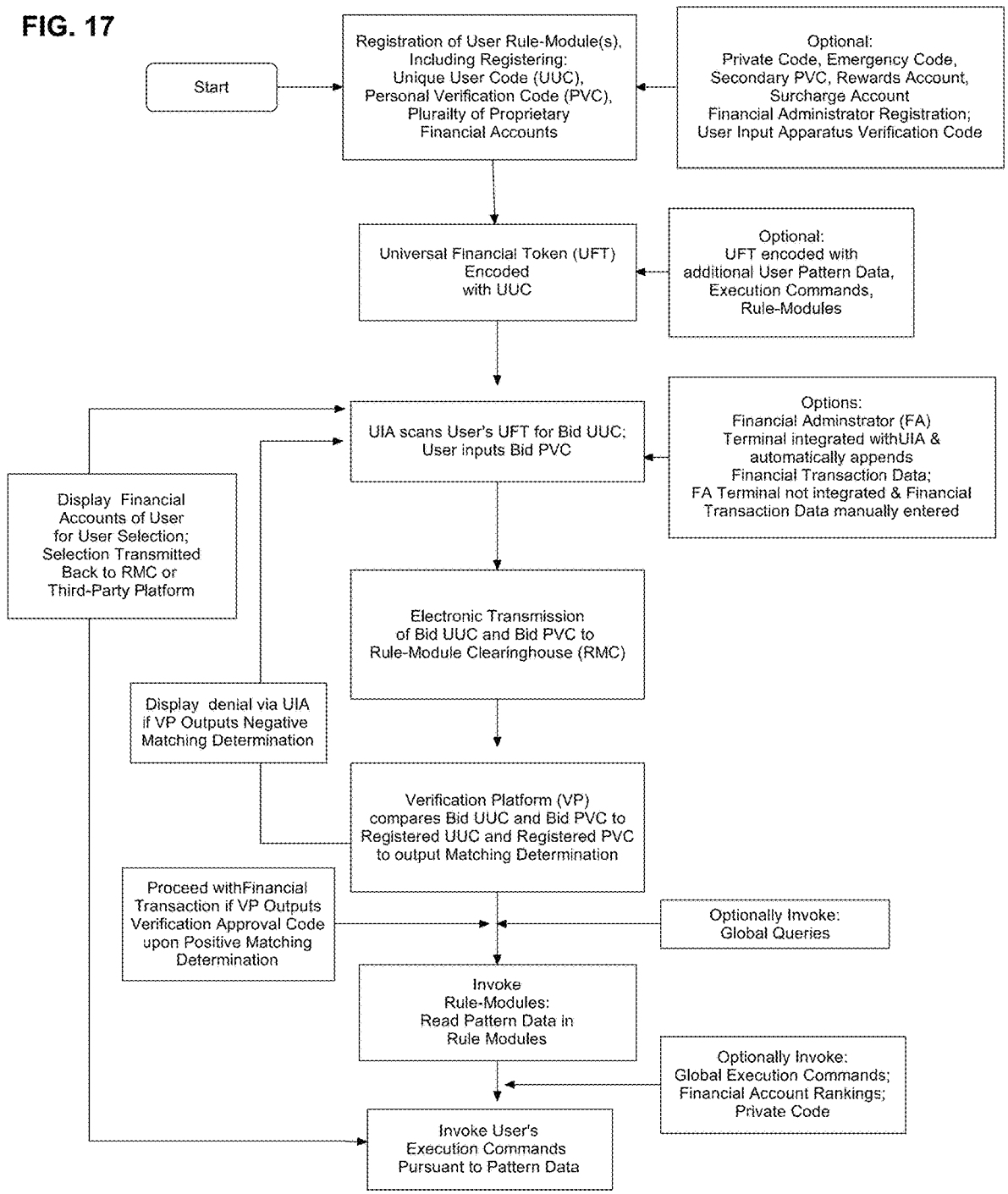
FIG. 17 shows a flow chart of registration and transaction processing with the Rule-Module Clearinghouse.

FIG. 17 shows a flow chart of registration and transaction processing with the Rule-Module Clearinghouse.

Figure 18:
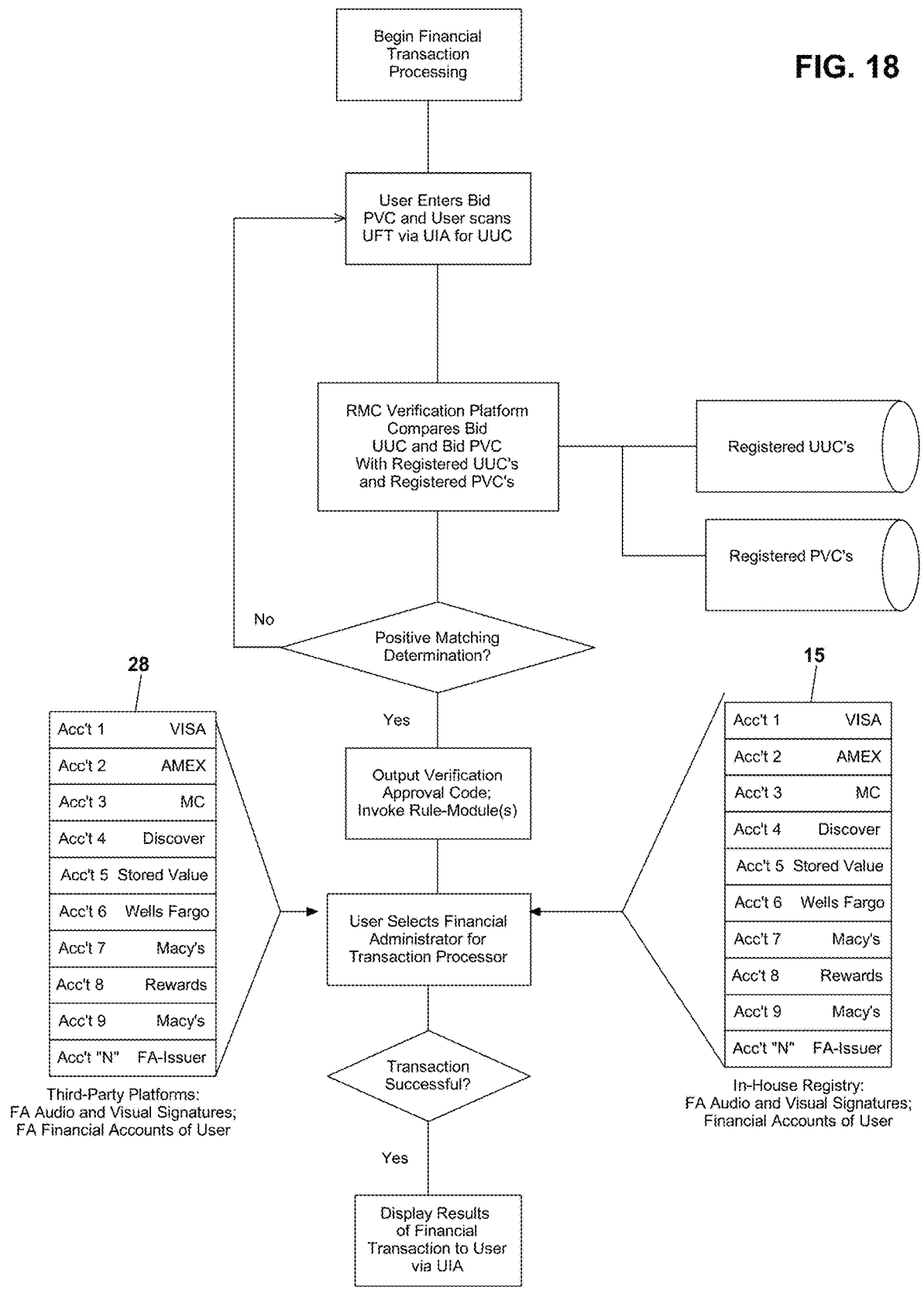
FIG. 18 shows a flow chart of registration and transaction processing with the Rule-Module Clearinghouse, In-House Registry, and Third-Party Platforms.

FIG. 18 shows a flow chart of registration and transaction processing with the Rule-Module Clearinghouse, In-House Registry, and Third-Party Platforms.

FIG. 14 through FIG. 27 show process flow embodiments of Rule-Module Clearinghouse to processing of financial transactions. A transaction is initiated from the UIA 16 when the User enters his PVC and the User's UUC 200 is scanned from his UFT 62, along with optionally appending the financial transaction data from the POS-Terminal 2, whereby a request (TRQ1) is transmitted to RMC 14; The RMC 14 transmits a reply packet (TRP1) including customer account information is sent back to UIA 16 and POS-Terminal 2; Once the customer has chosen the financial account, a second request (TRQ2) with transaction amount and selected account is sent to the RMC 14; The RMC 14 will process the transaction with Financial Administrator processor, and reply back (TRP2) the results to UIA 16 and POS-Terminal 2. POS-Terminal 2 will submit the results to retail main server (TRQ3).

In-House Registries of Financial Accounts

In FIG. 18, the preferred embodiment is shown in which there is a platform containing at least one Financial Account of a User or at least one Financial Administrator Account in the Rule-Module Clearinghouse 14. A financial account is defined as an account that contains any of the following: a) pre-purchased financial deposited in a stored value account, or; b) a registered financial account which is designated to donate financial based upon the User's purchases. An electronic financial donor account (User Account) is an account controlled by a User or a Financial Administrator (Financial Administrator), from which financial is debited as a result of an electronic financial transaction. An electronic financial counter-party account (Financial Administrator Account) is an account controlled by a counter-party of financial transactions (Financial Administrator), to which financial is credited as a result of an electronic financial transaction.

In one embodiment, there is at least one electronic Master In-House Registry 15 platform containing all of the financial accounts in the Rule-Module Clearinghouse and there is at least one electronic Local or Subset In-House Registry 19 platform containing a sub-set of the financial accounts in the Rule-Module Clearinghouse. In another embodiment, the financial accounts of the user reside within third-party platforms 28, external to the Master RMC 14.

Execution Platform

In a preferred embodiment, an Execution Command 52 of a Rule-Module 50 causes an electronic financial transaction to be executed by the Execution Platform 38. The Execution Platform 38 may be on a platform which is located within the Master RMC 14 itself, or it may be co-located with an entity platform 28 that is external to the Master RMC 14. In the event that a designated entity platform 28 cannot be contacted for the electronic financial transaction to be completed, the financial transaction is "declined".

In one embodiment, if the Financial Administrator approves the transaction, the Execution Platform 38 returns a transaction number to the In-House Registry 15, and the User's financial account is thereby adjusted through either a credit or debit. The transaction number is returned to the UIA 16, which lists the transaction on a daily transaction summary. The User need take no further action since financial transactions are automatically settled, at which point a calculation is made to automatically adjust the User's designated financial account.

In another embodiment, the Execution Platform 38 uses Rule-Modules 50 from the Master Rule-Module Clearinghouse 14 which permit a Financial Administrator to itself contribute financial directly to a Financial Administrator based upon a User's purchases. In such transactions, units of financial are electronically debited from the User Account controlled by the Financial Administrator, and corresponding units of financial are electronically credited to the Financial Administrator Account.

Decryption Platform

In a preferred embodiment, all messages the Data Processing Center 14 receives, with the exception of those not transmitted via a UIA 16, contain a UIA hardware verification code, a sequence number, and a Message Authentication Code (MAC). MACs, also known as cryptographic checksums, are well known in the computer industry, and are used to assure that any changes to the content of the message will be detectable by the entity receiving the financial transaction. The Decryption Platform 22 validates the message's MAC and checks the sequence number for that particular UIA. If the Decryption Platform 22 determines that both the MAC and the sequence number are valid, the DP 22 uses the unique secret key for that particular UIA 16 to decrypt the message. For the decryption to function properly, the Decryption Platform 22 must contain a copy of each UIA's DUKPT key table.

If the decryption operation fails, or if the MAC check fails, the message is considered an invalid message. The Decryption Platform 22 logs a warning to the logging facility (LF) 42, terminates processing for the message, and returns an error message to the originating UIA 16.

Before the Decryption Platform 22 replies to a message that includes a response key, it encrypts the response message with that response key. The Decryption Platform 22 also generates a MAC for the response and appends it to the message.

Preferably, error messages are not encrypted although the Decryption Platform 22 does include a MAC for message authentication. Such messages never include confidential information. However, most response messages include a status or response codes that can indicate whether the request succeeded or not. For example, when the Execution Platform 38 declines a financial transaction for a specific reason, it does not return an error message, it returns a normal financial transaction response message with a response code set to "failed".

Gateway Platform (GP)

The Gateway Platform 26 serves as an intermediary between redundant Verification Platform 12 and redundant in-house Registry 15 platforms, routing electronic financial transactions from platforms on overload to platforms that have available capacity. The Gateway Platform 26 also periodically queries platforms to ensure that are operative and to alert the system administrator is any server is inoperative.

Prior Fraud Platform (PFP)

The PFP 27 is a central repository for UUCP and biometric records which have had prior fraud associated with them. Every new customer's UUCs 200 and biometrics are checked against all PFP 27 records with the intent of reducing recidivism. In one embodiment, there is an automatic User prior fraud check step, wherein the User's bid UUC's 200 and biometrics are compared against previously registered UUC's 200 and biometrics in the PFP 27 wherein if a match occurs, the Rule-Module Clearinghouse 14 and Verification Platform 12 are alerted to the fact that the User has attempted to re-access the Rule-Module Clearinghouse 14 after having already been registered with the PFP 27.

Firewall (FW)

The Firewall (FW) 40 provides a first line of defense against network viruses and computer hackers. All communication links into or out of the Verification Platform 12 and Master Rule-Module Clearinghouse 14 server sites first pass through a secure Firewall 40 Machine.

Preferably, the firewall 40 Machine, an Internet-Local or Subset-Internet router, only handles messages destined for the Gateway Platform 26 machines.

UIA-quipped Terminals 2 send packets to Verification Platform 12 and Master Rule-Module Clearinghouse 14 server sites via modem, X.25, or other communication medium. The Verification Platform 12 and Master Rule-Module Clearinghouse 14 server sites rely on a entity to supply the modem banks required to handle the volume of calls and feed the data onto the Master RMC 14 backbone.

For communications between Verification Platform 12 and Master Rule-Module Clearinghouse 14 server sites, the FW 40 Machines send out double-length DES encrypted packets. The server site LAN component handles the encryption and decryption: the firewall 40 does not have the ability to decrypt the packets.

A properly configured network sniffer acts as an intruder detector as backup for the FW 40. If an anomalous message is detected, the intruding messages are recorded in their entirety, an operator is alerted, and the Firewall 40 is physically shut down by the sniffer.

The Firewall 40 disallows any financial transactions from the internal network to the rest of the Internet. An electronic financial transaction message requires about 400 bytes and registration packets require about 10 to 20 KB. To handle 1000 electronic financial transactions per second and 16 registration packet per second, the Firewall 40 machines are able to process about 400 KB per second.

Logging Platform

In a preferred embodiment, the Logging Facility 42 logs all electronic financial transaction attempts, whether successful or not, to write-once media, so that a record is kept of each financial transaction and each error that has occurred during the operation of the Verification Platform 12.

Figure 8:
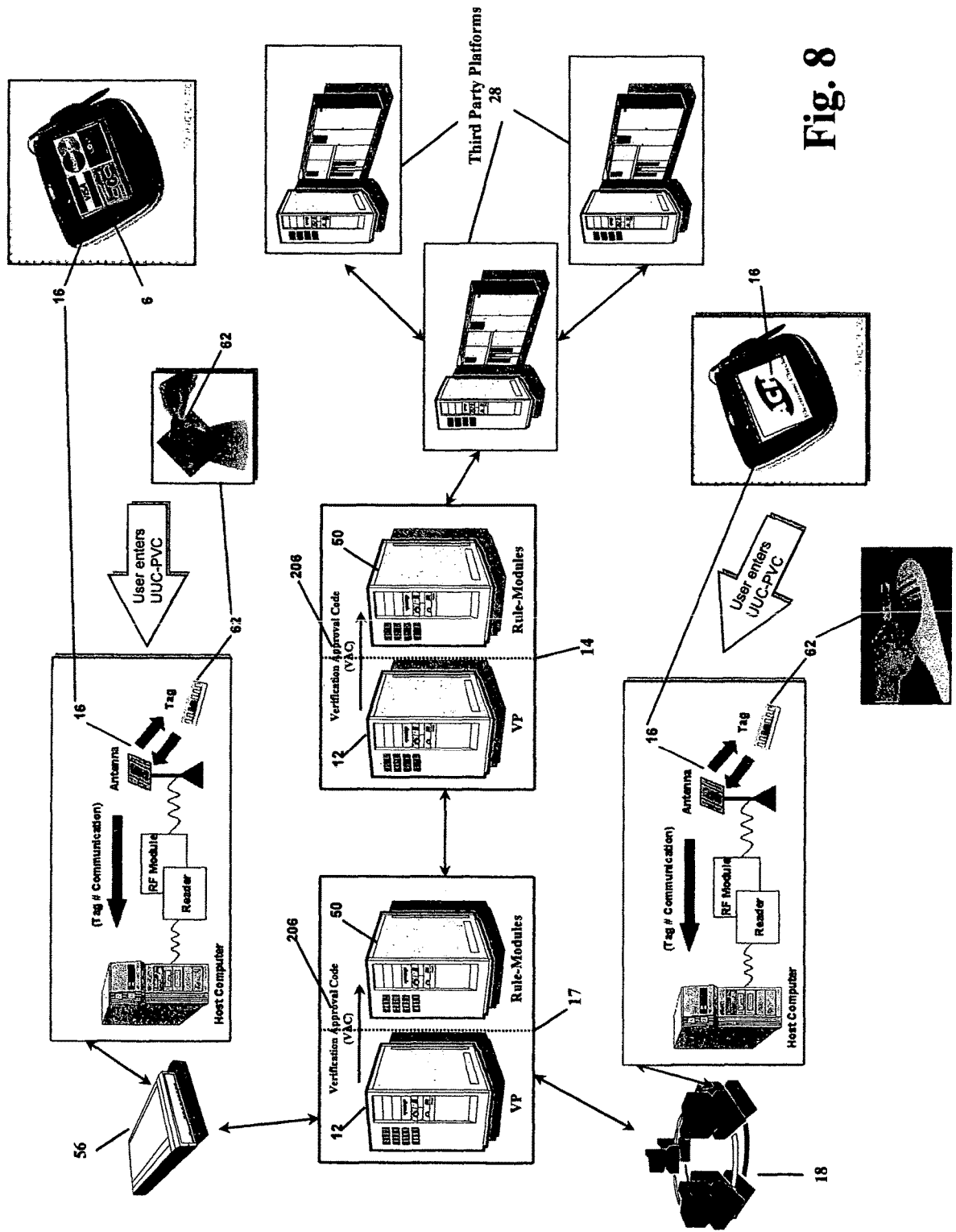
FIG. 8 and FIG. 8A show embodiments of the invention, depicting wireless modem and networked connections between various UIA's and the RMC, including Subset RMC's, a Master RMC, Redundant Master RMC, and Third-Party Platforms.

Interconnections and Communications Among the Electronic Verification Platform, Rule-Module Clearinghouse and In-House Registry In one embodiment depicted in FIG. 8, the Verification Platform 12 platform is physically distinct and separate from the Master Rule-Module Clearinghouse 14. In one embodiment depicted in FIG. 8A and FIG. 18, the In-House Registry 15 platforms with each housed in independent platforms or joint platforms. Clearinghouse 14 and In-House Registry 15 are alternatively in separate locations. In another embodiment depicted in FIGS. 1 and 3, the Verification Platform 12 is physically integrated with the Rule-Module Clearinghouse and the In-House Registry 15, whereby the Verification Platform 12, Master Rule-Module Clearinghouse 14 and the In-House Registry 15 are physically interconnected and integrated together within one server or platform. In both embodiments, communications among the Verification Platform 12, the Master Rule-Module Clearinghouse 14 and the In-House Registry 15 occur via many different methods and means that are well known in the art. Most depend on the particular communication networks already deployed by the organization or company that deploys the electronic financial transaction authorization system.

In one embodiment the, the Verification Platform 12, the Master Rule-Module Clearinghouse 14 and the In-House Registry 15 are connected via Ethernet to a Local or Subset router, which is connected to a network operations center (NOC) via frame relay lines. Messages are sent among the Verification Platform 12, the Master Rule-Module Clearinghouse 14 and the In-House Registry 15 using TCP/IP over this network. In another embodiment, the Verification Platform 12, the Master Rule-Module Clearinghouse 14 and the In-House Registry 15 are connected via a cellular digital packet data (CDPD) modem to a CDPD provider, who provides TCP/IP connectivity from the Verification Platform to an intranet 18 to which at least one Master Rule-Module Clearinghouse 14 is attached.

In yet another embodiment, an Verification Platform 12 is connected via the Internet, as is at least one Master Rule-Module Clearinghouse 14 and at least one In-House Registry 15. TCP/IP is used to transmit messages from among the Verification Platform 12, the Master Rule-Module Clearinghouse 14 and the In-House Registry 15. There are many different ways to connect the Verification Platform, the Master Rule-Module Clearinghouse 14 and the In-House Registry 15 that are well understood in the industry, such as cable TV networks, cellular telephone networks, telephone networks, the Internet, an intranet, a LAN, a WAN, or an X.25 network.

The Verification Platform 12 compares a User's bid UUC 200 with previously stored UUC 200 from registered Users.

The Verification Platform 12, the Master Rule-Module Clearinghouse 14 and the In-House Registry 15 hardware platforms are high-reliability platform platforms, well known in the art, such as those available from Sun™, Compaq™, Tandem™, IBM™ and the like. Further, the Verification Platform 12, the Master Rule-Module Clearinghouse 14 and the In-House Registry 15 software may incorporate scalable platform architecture, well known in the art, such as those available from Oracle™, Sybase™, Informix™, and the like.

Electronic Verification Platform, Rule-Module Clearinghouse and In-House Registry: Master Platforms and Local or Subset Platforms In certain embodiments, a Master Verification Platform 12 is responsible for storage of the entire set of UUC 200 and digital certificates registered for use with this invention. An electronic Master Rule-Module Clearinghouse 14 is responsible for storage of the entire set of Pattern Data 54, Execution Commands 52, and Rule-Modules 50 registered for use with this invention. An electronic Master In-House Registry 15 is responsible for storage of the entire set of User Accounts and Financial Administrator Accounts registered for use with this invention.

Each Master Verification Platform 12, Master Rule-Module Clearinghouse 14 site is preferably made up of a number of computers and platforms connected together over a LAN (known in the industry). Multiple and redundant Master computer sites ensure reliable service in the face of disaster or serious hardware failure at any single central computer site.

In another embodiment, there is at least one Local or Subset verification platform 12 server which stores a subset of the entire set of UUC 200 and digital certificates registered for use with this invention. In another embodiment, there is at least one Local or Subset Rule-Module Clearinghouse 17 server which stores a subset of the entire set of Pattern Data 54, Execution Commands 52, and Rule-Modules 50 registered for use with this invention. Such Pattern Data 54 and Execution Commands 52 subsets are circumscribed by any number of criteria including, usage location, usage frequency, usage recency, usage demographics and usage volume of electronic financial transactions. In another embodiment, there is at least one Local or Subset In-House Registry 19 server which stores a subset of the entire set of User Accounts and Financial Administrator Accounts registered for use with this invention.

It is preferred that the Master platforms have a Firewall 40 machine which is the entry point of data and messages into these computers, and a Gateway Platform 26 which is a system coordinator and message processor.

Figure 19:
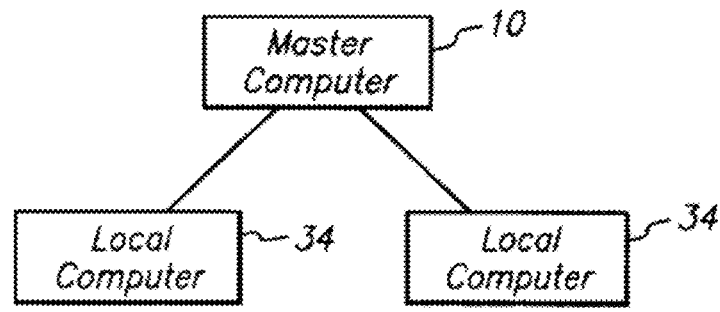
FIG. 19 through FIG. 21 show use-sensitive embodiments, with Master, Intermediary, and Local (or Subset) configurations.
Figure 20:
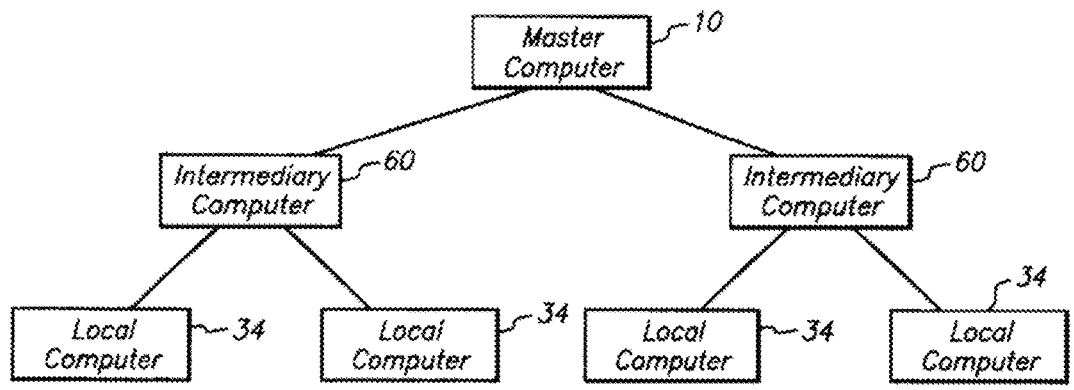
Figure 21:
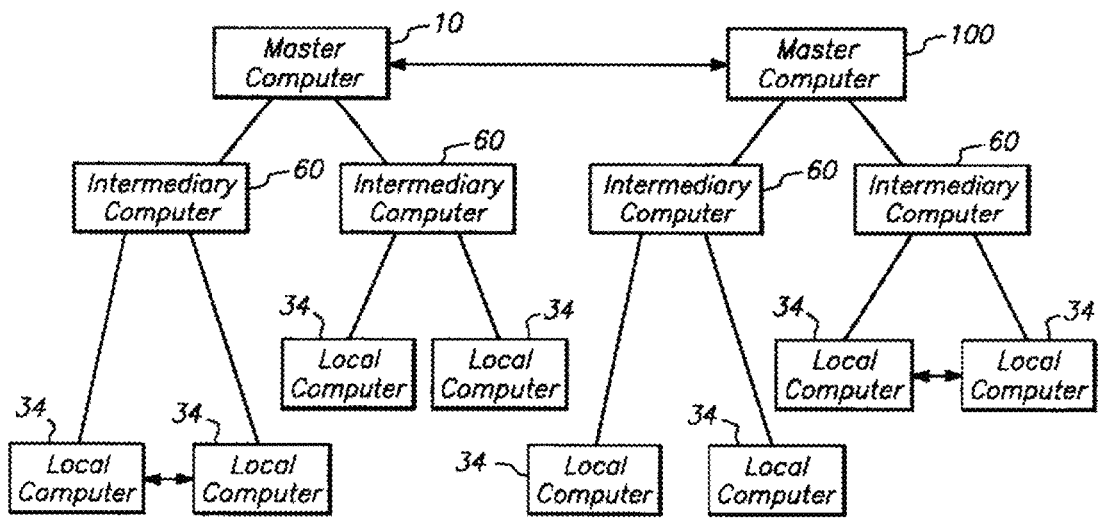
Figure 22:
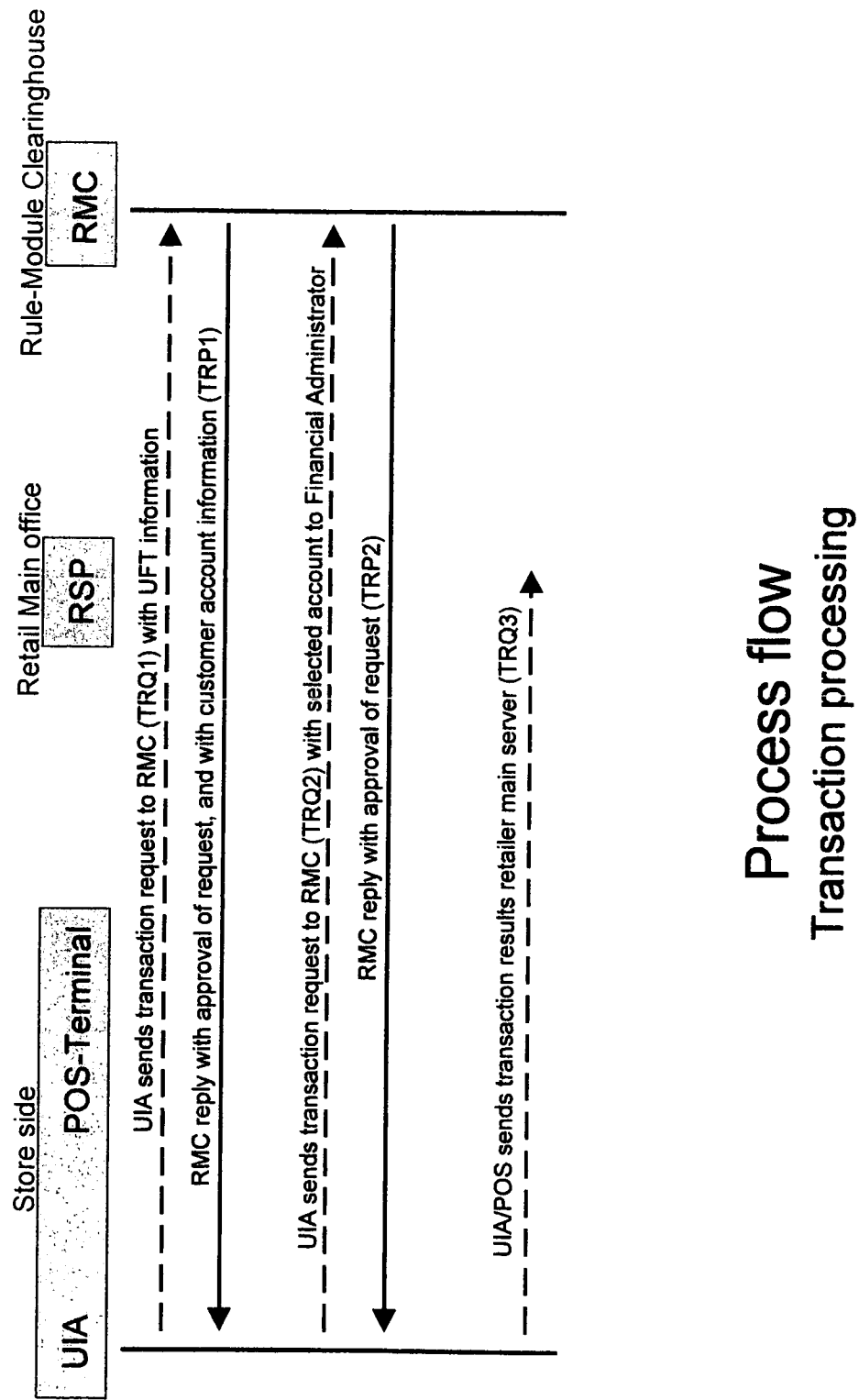
Figure 23:
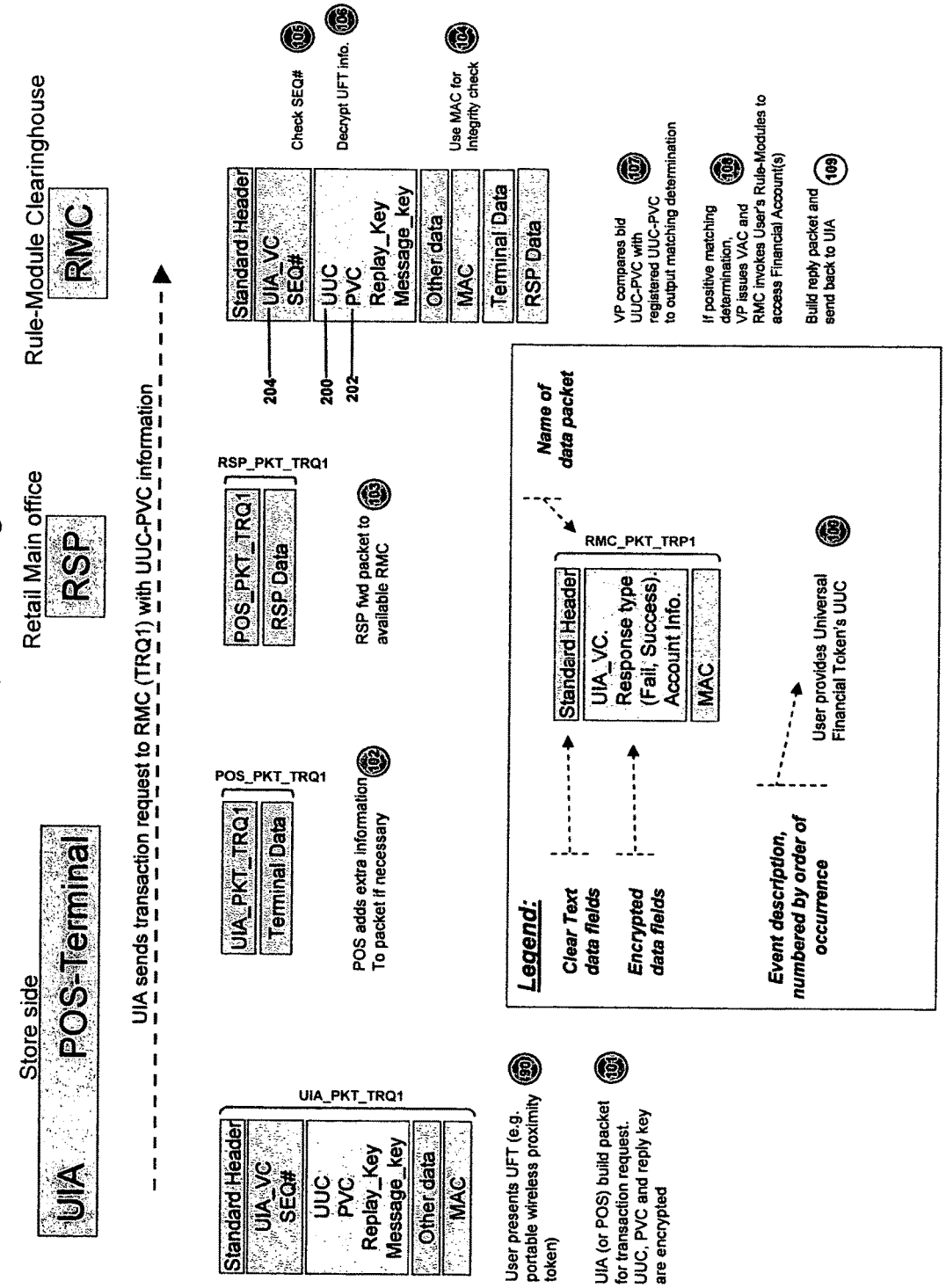
Figure 24:
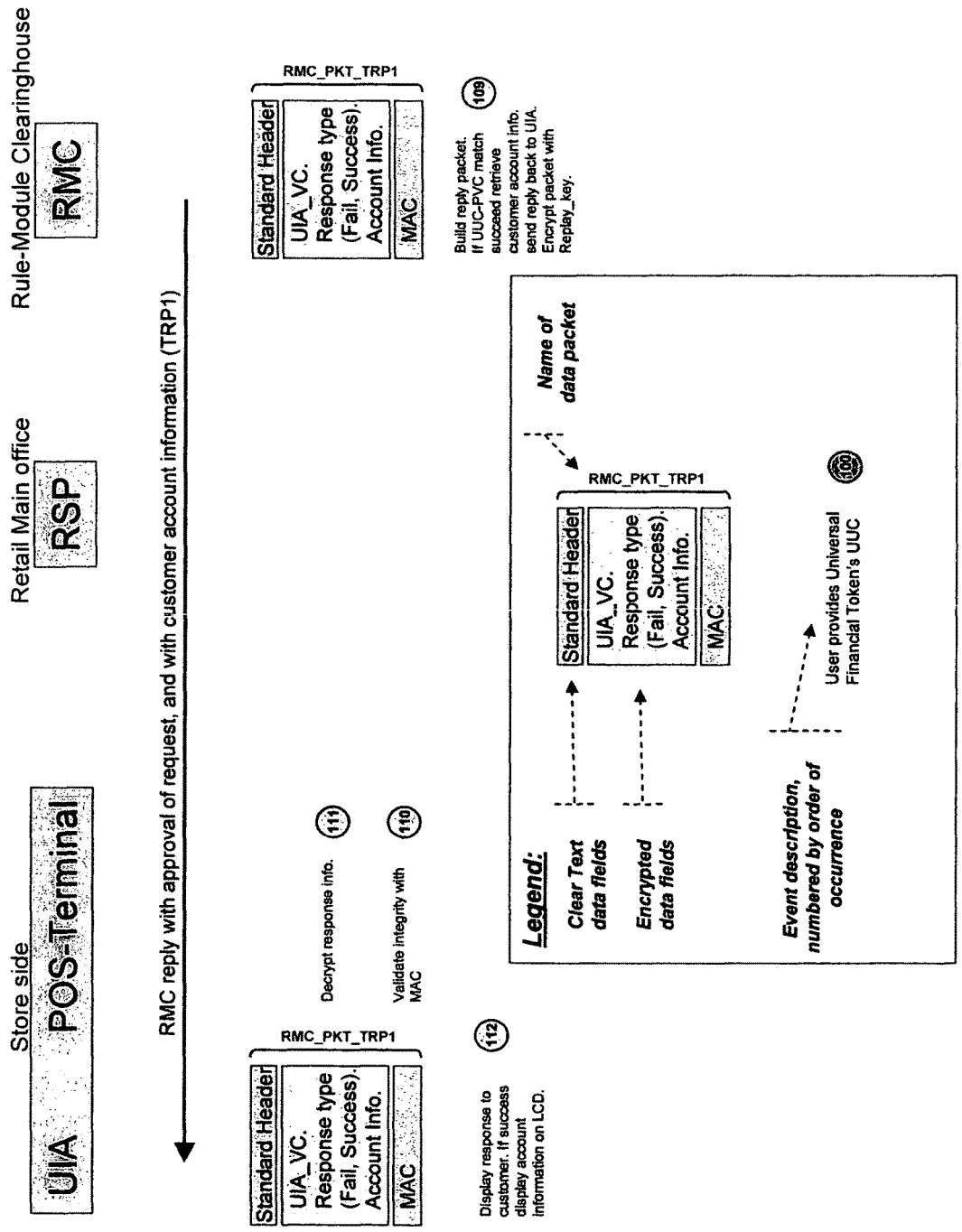
Figure 25:
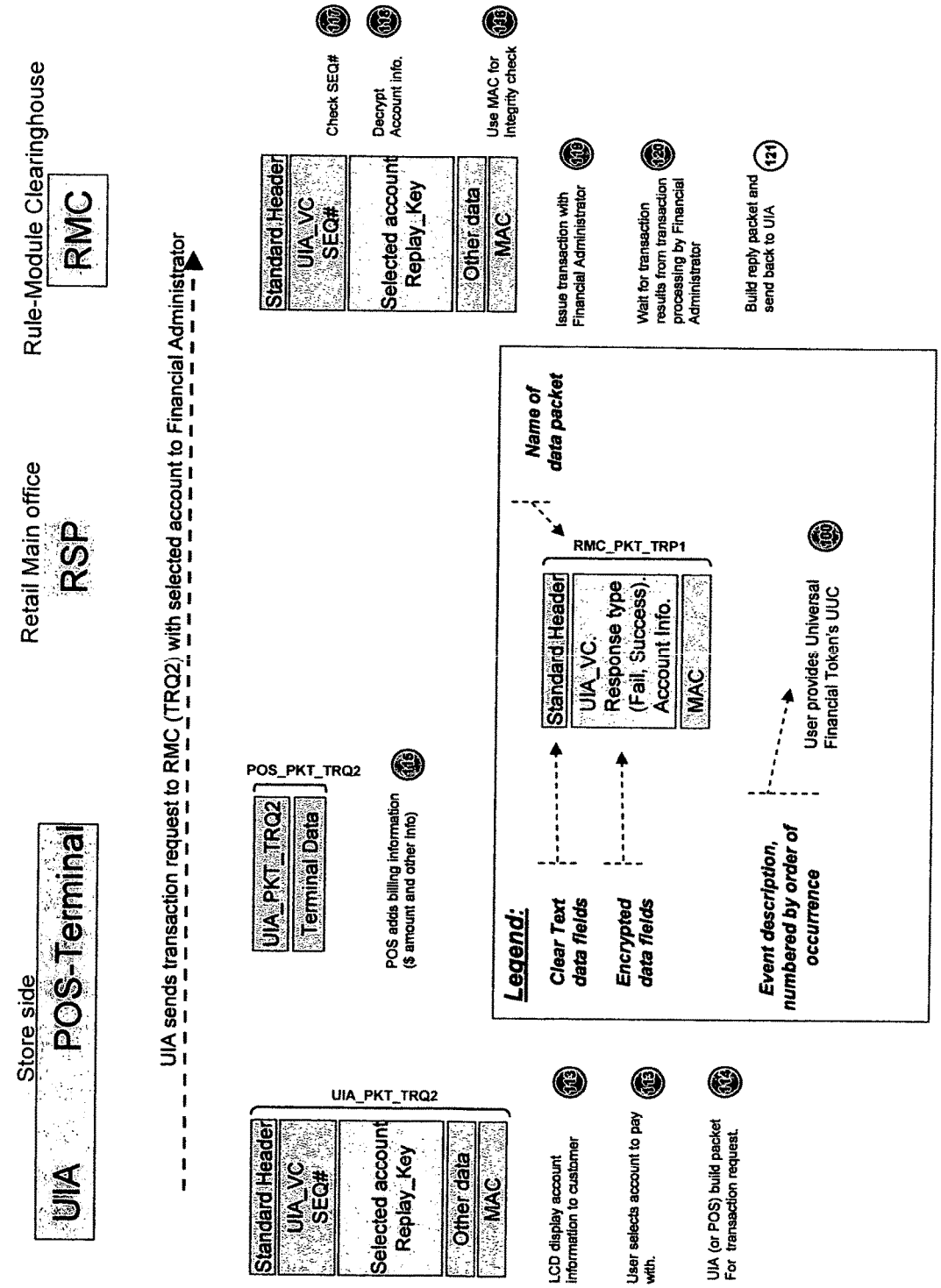
Figure 26:
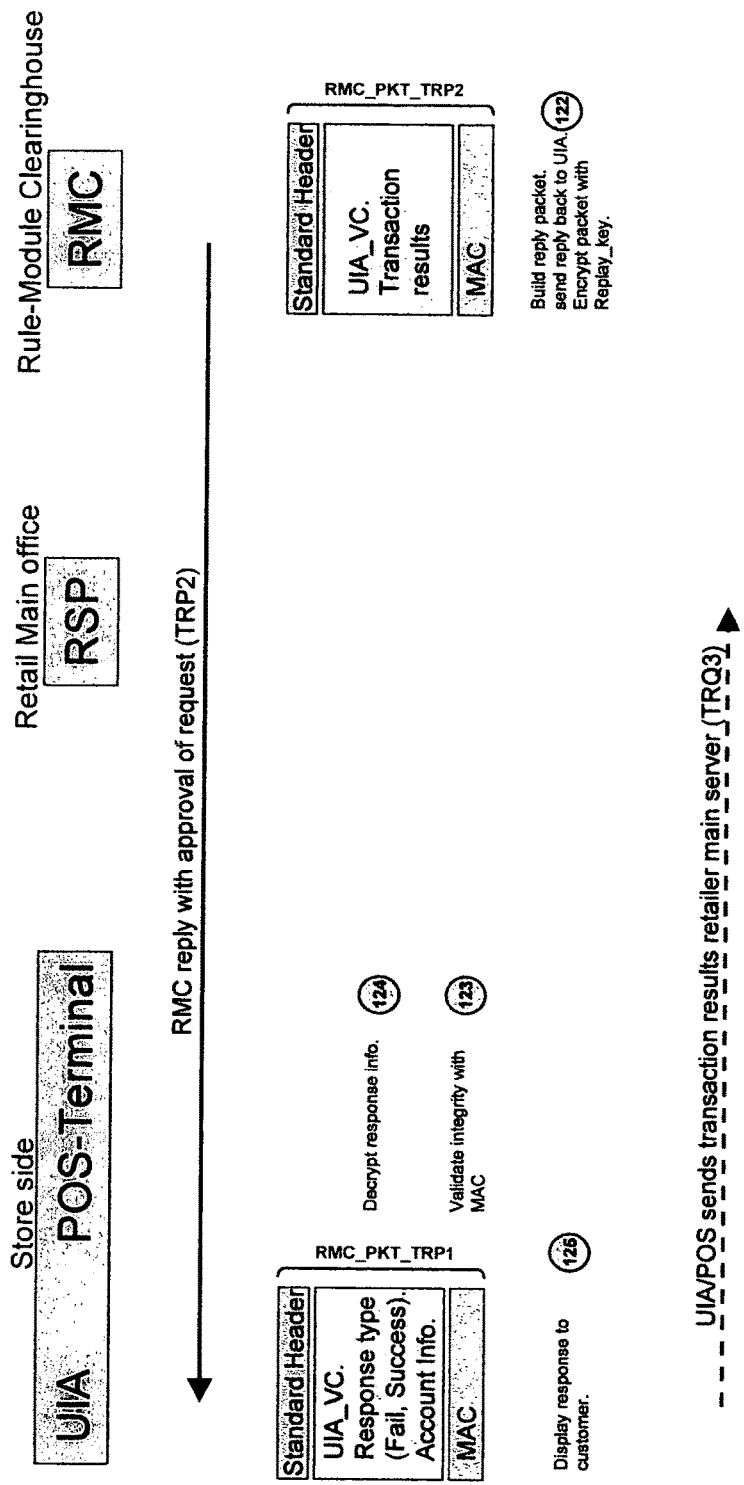

Use-Sensitive Configurations for Verification Platform, Rule-Module Clearinghouse and In-House Registry FIG. 19 through FIG. 21 show use-sensitive embodiments, with Master, Intermediary, and Local (or Subset) configurations.

Figure 3:
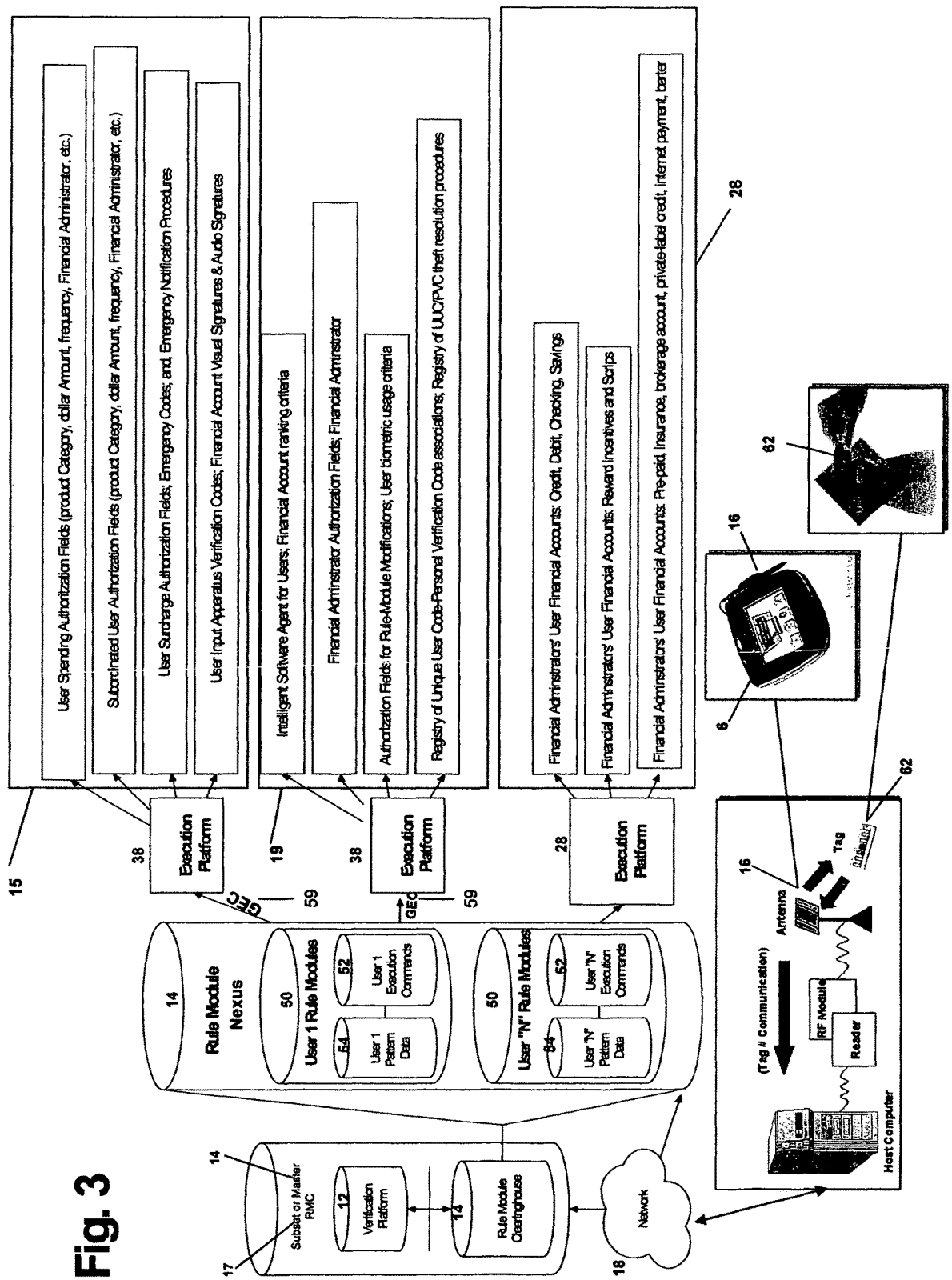
FIG. 3 shows an embodiment of the invention depicting various configurations with an In-House Registry 15, internal Execution Platforms and external Execution Platforms, and Third-Party Platforms.
Figure 4:
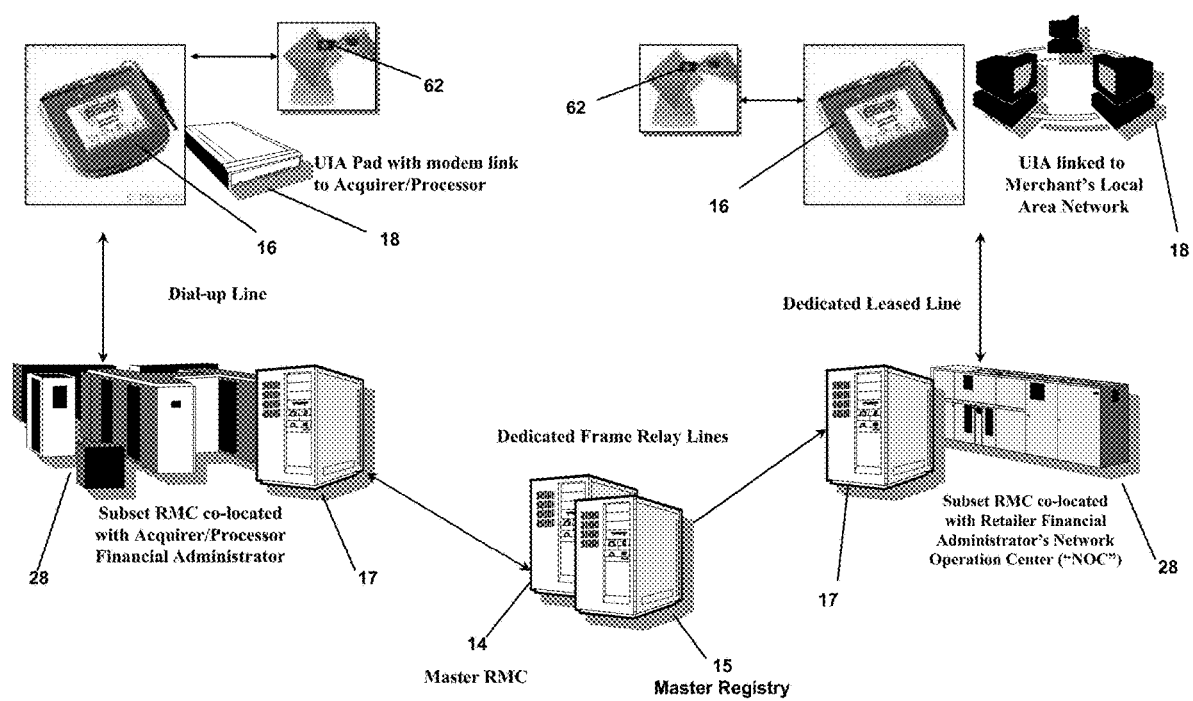
FIG. 4 shows an embodiment of the invention wherein the Rule-Module Clearinghouse's network connectivity maintains dedicated frame relay lines to RMC Platforms co-located with Financial Administrators' Acquirer sites and Financial Administrators' Retailer Network Operation Centers (NOCs) in order to update and backup the RMC's data network. In turn, these RMC Platforms are linked to UIAs in Financial Administrators' retail locations through either the Retailer's in-store dedicated link to the Network Operations Center (NOC), or dial-up connectivity to an Acquirer/Processor.
Figure 8A:
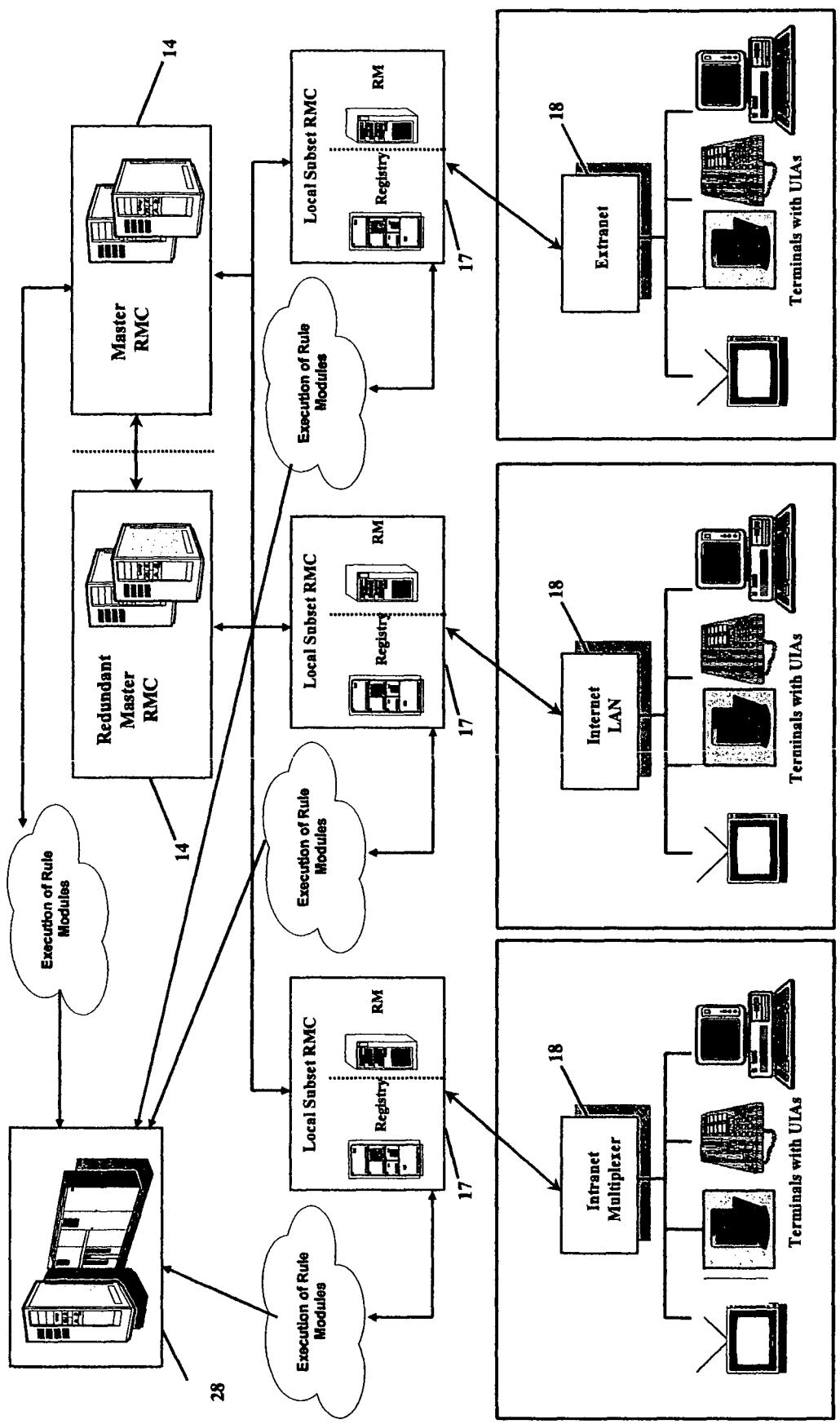
Figure 9:
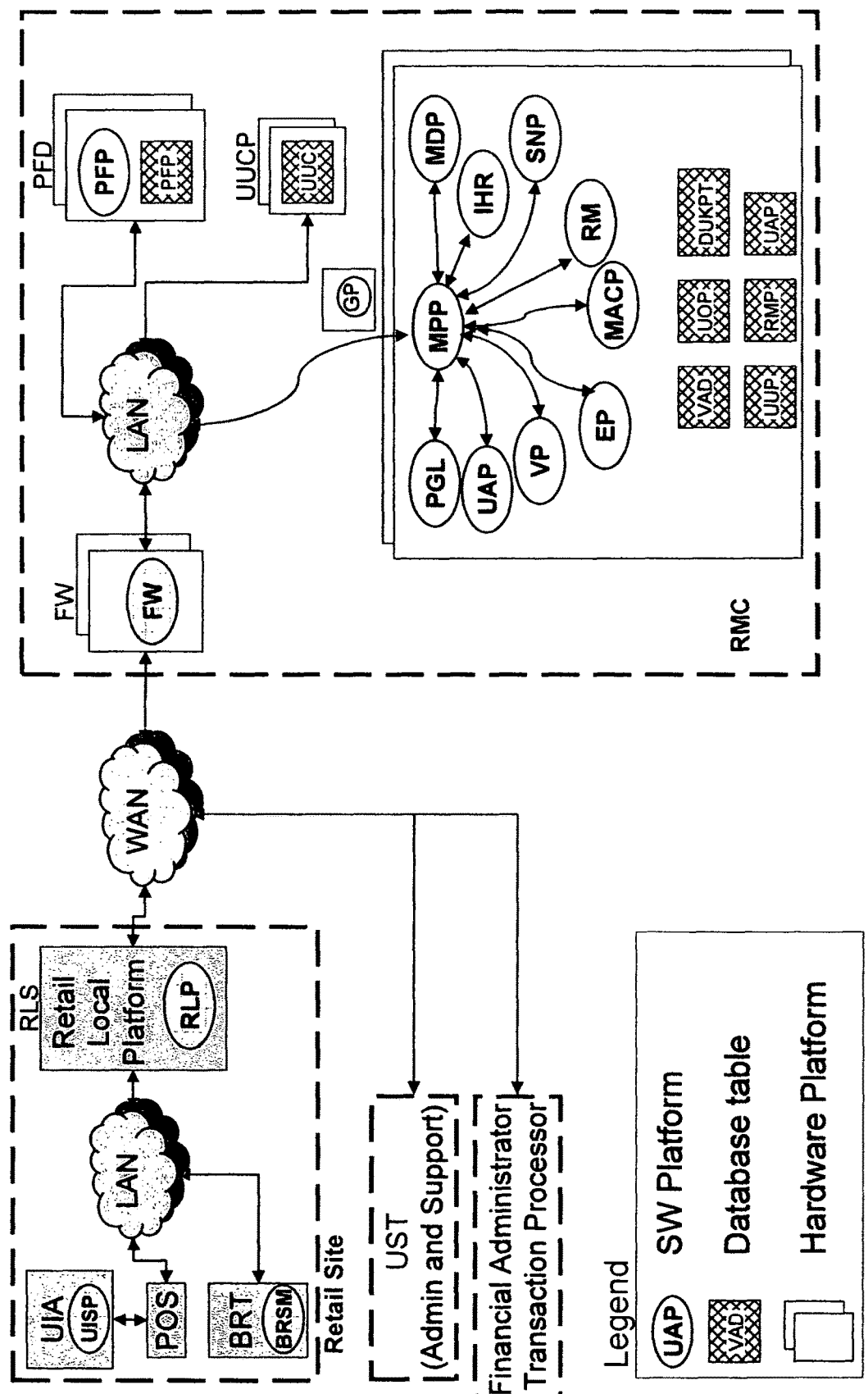
FIG. 9 through FIG. 11 shows a system block diagram and system architecture for a retail Point-of-Sale connected to a remote RMC.
Figure 10:
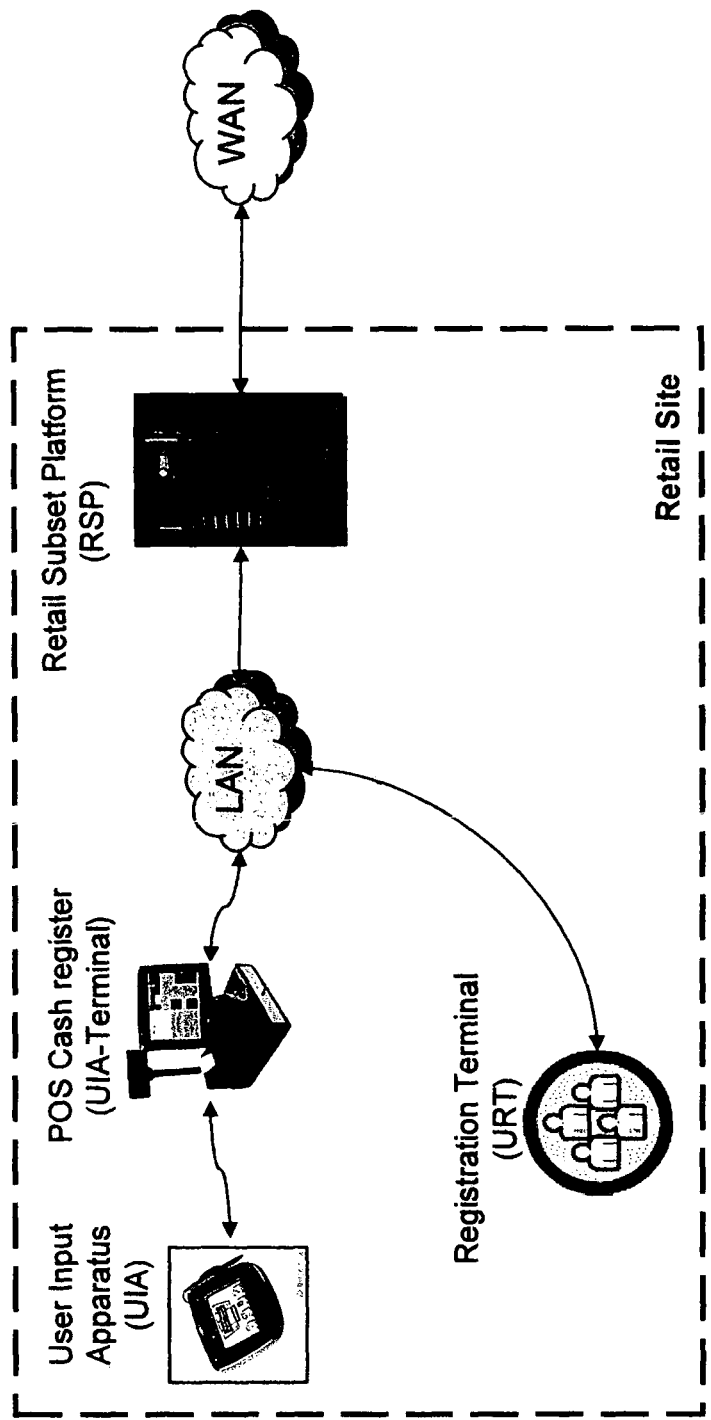
Figure 11:
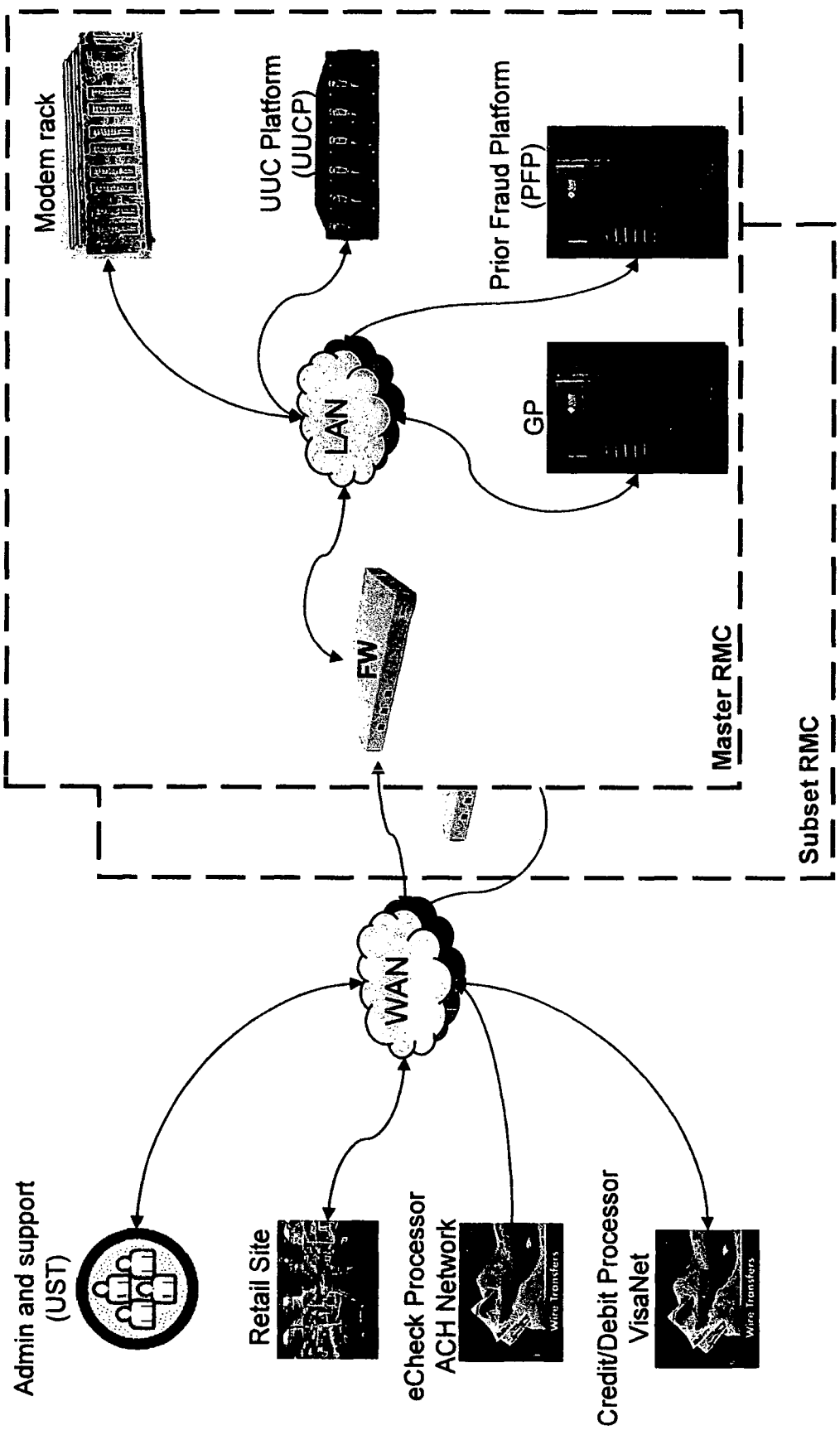
Figure 12:
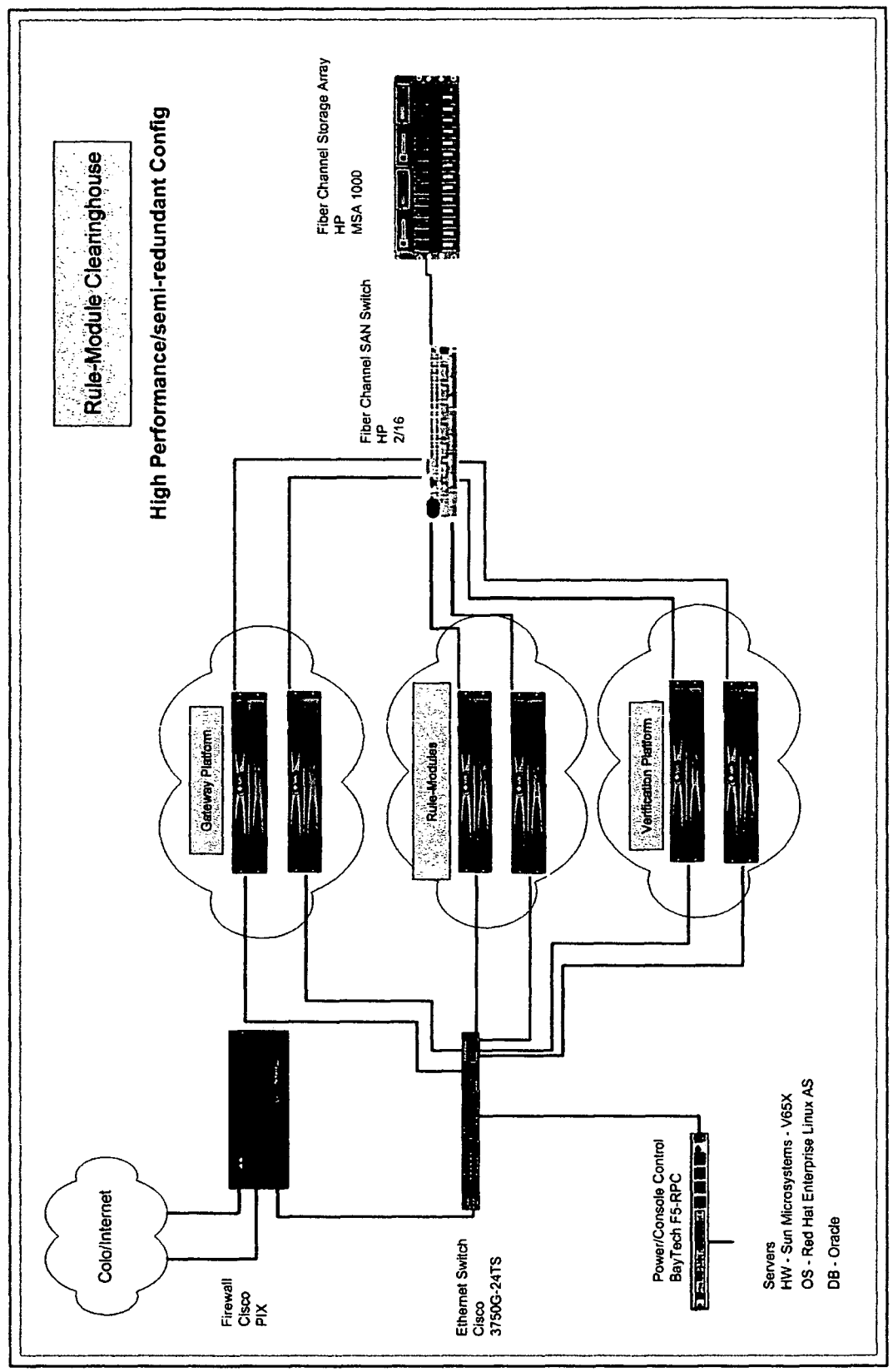
FIG. 12 shows a high performance, semi-redundant configuration for the RMC

As shown in FIG. 3 and FIG. 8A, in some embodiments the invention has use-sensitive data processing capabilities, wherein at least two Verification Platforms 12, at least two Rule-Module Clearinghouses, or at least two electronic Registries 14 exist, some of which respectively store a subset of the total data registered with the system.

One embodiment comprises at least one Master Verification Platform 12, one Master Rule-Module Clearinghouse 14, which respectively contain the entire set of all data registered with the system. This embodiment further comprises at least two Local or Subset Verification Platforms 12, at least two Local or Subset Rule-Module Clearinghouses 17, that are physically apart from each other. Each Local or Subset verification platform 12, Local or Subset Rule-Module Clearinghouse 17 and Local or Subset In-House Registry 19 contains a subset of the data contained respectively within the Master Verification Platform 12, Master Rule-Module Clearinghouse 14. Data communications lines allow electronic financial transactions to flow between each Local or Subset verification platform 12, Local or Subset Rule-Module Clearinghouse 17 or Local or Subset In-House Registry 19, and the Master Verification Platform 12, Master Rule-Module Clearinghouse 14 or Master In-House Registry 15.

In this embodiment, verification request electronic financial transactions are first sent to the Local or Subset verification platform 12, Local or Subset Rule-Module Clearinghouse 17 or Local or Subset In-House Registry 19 for processing. If a party cannot be identified by the Local or Subset verification platform 12 or if the requisite Rule-Module 50 or Financial Account is not contained, respectively, in the Local or Subset Rule-Module Clearinghouse 17 or the Local or Subset In-House Registry 19, the electronic financial transaction is forwarded to the Master Verification Platform 12, the Master Rule-Module Clearinghouse 14 or the Master In-House Registry 15. If the parties are identified properly by the Master Verification Platform 12 or if the requisite Rule-Module 50 or Financial Account is located, respectively, in the Master Rule-Module Clearinghouse 14 or the Master In-House Registry 15, the electronic financial transaction is processed appropriately. In addition, the User's verification information can be transmitted from the Master Verification Platform 12 to the Local or Subset Verification Platform 12, so that the next time the User will be successfully identified by the Local or Subset Verification Platform 12. This can likewise occur for the Master Rule-Module Clearinghouse 14 and Local or Subset Rule-Module Clearinghouses 17, and Local or Subset Registries 17.

In another embodiment of a use-sensitive system, the system further comprises a purge engine for deleting a party's User-customized information from the Local or Subset Verification Platform 12, the Local or Subset Rule-Module Clearinghouse 17 or the Local or Subset In-House Registry 19 platforms. In order to store only records for those parties who use the system more than a prescribed frequency and prevent the overload of platforms with records from parties who use the system only occasionally, the record of a party is deleted from the Local or Subset Verification Platform 12, Local or Subset Rule-Module Clearinghouse 17 or Local or Subset In-House Registry 19 platforms if there has been no attempt to verify the party upon expiration of a predetermined time limit.

In order to make communications between the Master platforms 14 and the Local or Subset platforms 17 secure, the system further comprises encryption and decryption means, wherein communications between the Master platforms 14 and Local or Subset platforms 17 are encrypted.

Preferably, within the Rule-Module Clearinghouses of the use-sensitive embodiment, each Master Platform (or Master Computer) 10, each Intermediary Platform (or Intermediary Computer) 60, and each Local or Subset Platform (or Local or Subset Computer) 34, has electrical power backup and multiple redundancy in all of its critical hardware and platform systems.

External Computers or External Entity Platforms

In one embodiment, an Execution Command 52 optionally requires the RMC 14, including the Master Rule-Module Clearinghouse 14 and the Execution Platform 38, to communicate with at least one external entity 28 computer or platform to conduct a User's financial transaction. For example, the Execution Platform 38 may need to communicate with: a banking or credit card institution; a retailer's purchasing incentives platform for generating financial; a financial counter-party's computers to determine the correct financial counter-party account for financial disbursal. In this embodiment, at least one Local or Subset Rule-Module Clearinghouse 17 or at least one Local or Subset In-House Registry 19 is located within an external entity computer.

Financial Transactions

Figure 6:
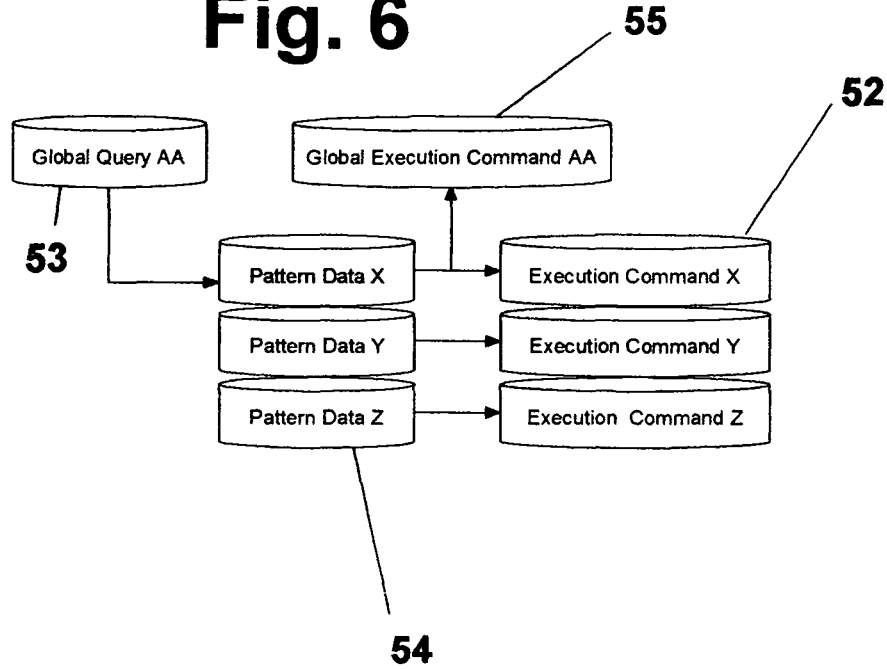
FIGS. 6 and 7 show various embodiments of Rule-Modules, with various associations between Pattern Data and Execution Commands, including Global Queries and Global Execution Commands.
Figure 7:
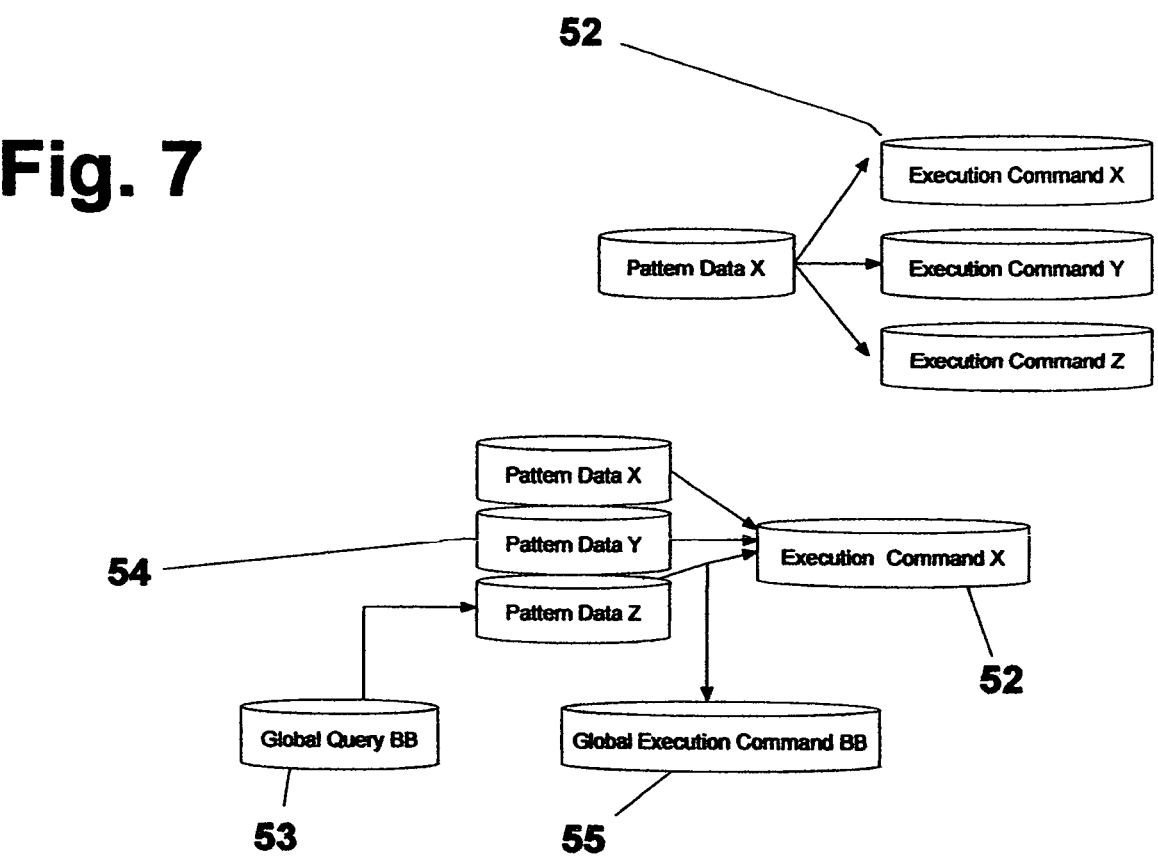

Retail point of sale transactions as shown in FIG. 6 are characterized by verifying the User using their UUC 200 or UUC 200 sample-PVC on a UIA 16 controlled by Financial Administrator. The User is thus identified through a UUC, while the Financial Administrator is identified through the UIA's hardware verification code.

In a preferred embodiment, a User at the point of sale originates a financial transaction in the following manner. The User submits a bid UUC 200 obtained from their physical person by the UIA's UUC 200 sensor. The UIA 16 determines that the UUC 200 is non-fraudulent, and then translates and compresses that UUC 200 into a format suitable for rapid financial transaction to the RMC 14.

In one embodiment, the User enters a PVC code into the UIA keypad. The UIA 16 transmits the UUC-PVC to the Master RMC 14 for verification, along with the UIA hardware verification code. The Master RMC 14 identifies the User and the financial account of the User using the UUC-PVC sample. The Master RMC 14 identifies the Financial Administrator's Donator Account using the UIA hardware verification code that was previously registered by the participating Financial Administrator.

The transaction data is entered into the UIA 16, either using an electronic cash register or manually, by the User. The User then either approves or cancels the transaction using the UIA's keypad. Once the financial transaction is approved, the UIA 16 transmits the financial transaction to the RMC 14. The Master RMC 14 then forwards the transaction for execution and settlement to the financial responsible party, which may include any of the following: the Master RMC 14 itself, a participating Financial Administrator, an independent financial service provider, a financial institution, and the like.

Execution of the transaction may result in a declined transaction due to lack of financial or other problem condition reported by the Financial Administrator. If the transaction is declined, the Master RMC 14 transmits the decline notification back to the UTA 16, canceling the transaction.

On-Line Network and Communications for Financial Transactions

Network transactions are characterized by verifying the User using a communications network such as the Internet, an intranet, or an extranet. The User's bid UUC 200 is submitted through the User's personal UIA 16, or through a public UIA 16 attached to an ATM or other public Terminal 2. Parties identified through a digital certificate are registered network entities, such as either the Financial Administrator or the Financial Administrator. The User is identified through UUCs, while the Financial Administrator or the Financial Administrator, may be identified through the verification of a digital certificate issued by an authorized certifying authority.

In a preferred embodiment, the User locates the Financial Administrator by locating the participating Financial Administrator's place of business on the network: the web site, using the network address of the Financial Administrator. The User downloads the Financial Administrator's digital certificate to the UIA 16 that the User is using. The UIA 16 verifies that the digital certificate provided by the Financial Administrator is a valid certificate.

The User submits a bid UUC 200 obtained from their physical person using the UIA's UUC 200 sensor. The UIA 16 determines that the UUC 200 scan is non-fraudulent, and then translates and compresses that UUC 200 scan into a format suitable for rapid financial transaction to the RMC 14. In one embodiment, the User enters a PVC code into the UIA keypad.

The UIA 16 transmits the UUC-PVC to the Master RMC 14 for verification, along with the Financial Administrator's digital certificate.

Both parties verify the financial accounts to be involved in the transaction. The User does this in an automated manner. In a preferred embodiment, this occurs at the Master RMC 14 using account selection information included in the transaction by the User. The User's financial account is thereby automatically selected by the RMC 14.

The amount of the transaction is also transmitted to the UIA 16 by the Financial Administrator. The User either approves or cancels the transaction using the UIA's keypad. Once the transaction is approved, the UIA 16 transmits the financial transaction to the Master RMC 14, where the Master RMC 14 authorizes the financial transaction and transmits a new financial transaction to the appropriate financial In-House Registry 15.

The Master RMC 14 forwards the transaction for execution and settlement to the financial responsible party, which may include any of the following: the Master RMC 14 itself, a participating Financial Administrator, an independent financial service provider, a financial institution, and the like.

Execution by the Master RMC 14 may result in a declined transaction due to lack of financial in the account, a closed account, or some other immediately detectable problem condition. If the transaction is declined, the Master RMC 14 transmits the decline notification back to the UIA 16, and the transaction is cancelled.

In one embodiment, the UIA 16 is actually built-in and/or integrated with a personal computer. These personal computer UIA hardware verification codes are not used to verify either party in a transaction.

In another embodiment, the User can be a representative of a business entity that has permission to access the business entity's financial accounts to conduct direct transactions with a financial counter-party.

In yet another embodiment, settlement of a transaction is delayed for an agreed-upon time period, to enable implementation of net-30 settlement terms and the like.

In one embodiment, the financial amounts from a network transaction are deposited into an escrow account for an Internet Financial Administrator or a User, instead of being directly calculated into the User's financial account or donated directly to a Financial Administrator, as a direct settlement for the transaction to be debited or credited.

From the foregoing, it will be appreciated how the objectives and features of the invention are met. First, the invention provides a financial transaction computer system and method that eliminates the need for a User to possess and present any personalized man-made tokens, in order to authorize a transaction.

Second, the invention provides a financial transaction computer system that is capable of verifying a User's unique authority to access the Rule-Module Clearinghouse by algorithmically combining their unique user code and personal verification code.

Third, the invention verifies the User's authority based upon one or more unique data gather directly from the User.

Fourth, the invention provides a cost-effective financial transaction system that is practical, convenient, and easy use.

Fifth, the invention provides a system of secured access to a financial computer system that is highly resistant to fraudulent transaction authorization attempts by unauthorized Users.

Sixth, the invention provides a financial transaction authorization system that enables a User to notify authorities that a particular access request is being coerced by a third party without giving notice to the third party of the notification.

Although the invention has been described with respect to a particular Verification Platform and method for its use, it will be appreciated that various modifications of the apparatus and method are possible without departing from the invention, which is defined by the claims set forth below.

The invention claimed is:

1. A method comprising:
    a. Registering a user rule-module, wherein a rule-module is registered to a user within a data processing platform remotely located from a user device, said registration rule-module further comprising at least one pattern data of a user associated with at least one computing command of the user, and wherein:
        (i) said pattern data:
            a) comprises: a plurality of proprietary financial accounts; predetermined criteria of the user for an automated transaction surcharge, and; a unique user code containing a non-biometric, electronically scannable data string provided by the data processing platform, said unique user code further comprising any of the following: a dynamic code which changes periodically based on predetermined criteria synchronized with the verification platform, and; a static code which remains constant based on a predetermined code synchronized with the verification platform, and;
            b) further comprises any of the following: a personal verification code, containing a non-biometric data string formed from numbers, symbols, or alphabetic characters selected by the user; a secondary personal verification code, distinct from the personal verification code, containing a non-biometric data string formed from numbers, symbols, or alphabetic characters selected by the user; an emergency code, distinct from any other code of the user containing a non-biometric data string formed from an alpha-numeric sequence, visual icon, or audio signal selected by the user; a purchasing pattern of the user based upon predetermined criteria; a private code, distinct from any other code of the user and not used verifying the user, containing a non-biometric data string formed from an alpha/numeric/symbol sequence selected by the user;
        (ii) said computing command which accesses the plurality of proprietary financial accounts pursuant to invoking the transaction surcharge, wherein the transaction surcharge is a financial amount debited from a first proprietary financial account of the user and credited to a second proprietary financial account of the user, said transaction surcharge comprising a variable financial amount, wherein the variable financial amount is calculated as a function of a formula comprising any of the following criteria: an income of the user; a period of time; a purchasing frequency of the user; a balance in a proprietary financial account of the user; an economic indicator, and; a financial objective of the user;
    b. Encoding a universal financial token, wherein the universal financial token is encoded with the unique user code, and; which performs short range contactless communications;
    c. Transmitting verification data, wherein verification data of the user is transmitted to a verification platform which makes a matching determination to verify the user's authority to access the data processing platform, wherein the user's verification data is gathered by the user device, said verification data comprising: (i) the unique user code as scanned from the universal financial token; and; (ii) the personal verification code as input by the user;
    d. Invoking a rule-module, wherein upon the verification platform making a positive matching determination, at least one rule-module of the user is invoked by the data processing platform, which accesses the plurality of proprietary financial accounts of the user without an automated benefit-driven function to process an on-line financial transaction based on increasing reward incentives for the user;
    Whereby, the user accesses the plurality of proprietary financial accounts using the universal financial token and the data processing platform.

2. The method of claim 1, further comprising resolving theft of the unique user code, wherein upon the unique user code being fraudulently duplicated, the data processing platform invokes any of the following: changing the personal verification code; encoding a new unique user code, distinct from the fraudulently duplicated unique user code, into the user's universal financial token, and; authorizing the user to input the secondary personal verification code, as an alternative to the unique user code, for verification data during verifying the user.

3. The method of claim 1, further comprising: (i) displaying the private code to the user verifies to the user that the data processing platform has been accessed, and; (ii) emergency alert notification comprises the emergency code being gathered from the user by the user device and transmitted to the data processing platform to alert the data processing platform of any of the following: that the verification data has been compromised; that the universal financial token has been compromised, and; that the user has been coerced to access the data processing platform.

4. The method of claim 1, wherein accessing proprietary financial accounts further comprises any of the following electronic functions: querying and presenting to the user, data related to the proprietary financial accounts; processing an on-line financial transaction, comprising selecting at least one of said proprietary financial accounts, and making a credit of a financial amount to, or making a debit of a financial amount from, said at least one proprietary financial account.

5. The method of claim 2, further comprising authorizing the user to input the secondary personal verification code as a function of any of the following predetermined criteria: a limited time period for using the secondary personal verification code; limited access to proprietary financial accounts when using the secondary personal verification code; a limited frequency for using the secondary personal verification code, and; a limited geography for using the secondary personal verification code.

6. The method of claim 1, wherein: the plurality of proprietary financial accounts are rendered simultaneously accessible as a function of using the data processing platform; the plurality comprises at least two, and; a proprietary financial account comprises a financial account distinguishable from at least one other financial account because the respective accounts reside with different financial administrators.

7. The method of claim 1, wherein the purchasing pattern is a function of predetermined criteria comprising any of the following: user purchasing over a period of time; user purchasing frequency; user purchasing recency; financial amounts of user expenditures; user purchasing locations, and; user tax deduction categories.

8. A system with at least one computer executable program tangibly embodied on at least one computer readable medium, said system comprising:
   a. A data processing platform computer, remotely located from, and in communications over a network with, a user device, which registers at least one rule-module to a user, wherein at least one pattern data of the user is associated with at least one computing command of the user, and wherein:
      (i) said pattern data:
         a) comprises: a plurality of proprietary financial accounts; predetermined criteria of the user for an automated transaction surcharge, and; a unique user code containing a non-biometric, electronically scannable data string provided by the data processing platform, said unique user code further comprising any of the following: a dynamic code which changes periodically based on predetermined criteria synchronized with the verification platform, and; a static code which remains constant based on a predetermined code synchronized with the verification platform, and;
         b) further comprises any of the following: a personal verification code, containing a non-biometric data string formed from numbers, symbols, or alphabetic characters selected by the user; a secondary personal verification code, distinct from the personal verification code, containing a non-biometric data string formed from numbers, symbols, or alphabetic characters selected by the user; an emergency code, distinct from any other code of the user, containing a non-biometric data string formed from an alpha-numeric sequence, visual icon, or audio signal selected by the user; a purchasing pattern of the user based upon predetermined criteria; a private code, distinct from any other code of the user and not used verifying the user, containing a non-biometric data string formed from an alpha/numeric/symbol sequence selected by the user;
      (ii) said computing command accesses the plurality of proprietary financial accounts pursuant to invoking the transaction surcharge, wherein the transaction surcharge is a financial amount debited from a first proprietary financial account of the user and credited to a second proprietary financial account of the user, said transaction surcharge comprising a variable financial amount, wherein the variable financial amount is calculated as a function of a formula comprising any of the following criteria: an income of the user; a period of time; a purchasing frequency of the user; a balance in a proprietary financial account of the user; a economic indicator, and; a financial objective of the user;
   b. A universal financial token encoded with the unique user code;
   c. A verification platform, which receives verification data of the user and produces a matching determination to verify the user's authorization to access the data processing platform, wherein the user device gathers the verification data, said verification data comprising: (i) the unique user code as scanned from the universal financial token; and; (ii) the personal verification code as input by the user;
   d. A in-house registry platform which, upon issuance of a positive matching determination by the verification platform, accesses the plurality of proprietary financial accounts of the user via invocation of at least one rule-module of the user by the rule-module clearinghouse, without an automated benefit-driven function to process an on-line financial transaction based on increasing reward incentives for the user;
   Whereby, the user accesses the plurality of proprietary financial accounts using the universal financial token and the data processing platform.

9. The system of claim 8, further comprising a theft resolution platform which, upon the unique user code being fraudulently duplicated, invokes any of the following:
   changing the personal verification code; encoding a new unique user code, distinct from the fraudulently duplicated unique user code, into the user's universal financial token, and;
   authorizing the user to input the secondary personal verification code, as an alternative to the unique user code, for verification data received by the verification platform.

10. The system of claim 8, further comprising: (i) displaying the private code to the user verifies to the user that the data processing platform has been accessed, and; (ii) emergency alert notification comprises the emergency code being gathered from the user by the user device and transmitted to the data processing platform to alert the data processing platform of any of the following: that the verification data has been compromised; that the universal financial token has been compromised, and; that the user has been coerced to access the data processing platform.

11. The system of claim 8, wherein the in-house registry platform comprises any of the following functions: querying and presenting to the user, data related to the proprietary financial accounts; processing an on-line financial transaction, comprising selecting at least one of said proprietary financial accounts, and making a credit of a financial amount to, or making a debit of a financial amount from, said at least one proprietary financial account.

12. The system of claim 9, further comprising authorizing the user to input the secondary personal verification code as a function of any of the following predetermined criteria: a limited time period for using the secondary personal verification code; limited access to proprietary financial accounts when using the secondary personal verification code; a limited frequency for using the secondary personal verification code, and; a limited geography for using the secondary personal verification code.

13. The system of claim 8, wherein: the plurality of proprietary financial accounts are rendered simultaneously accessible as a function of using the data processing platform; the plurality comprises at least two, and; a proprietary financial account comprises a financial account distinguishable from at least one other financial account because the respective accounts reside with different financial administrators.

14. The system of claim 8, wherein the purchasing pattern is a function of predetermined criteria comprising any of the following: user purchasing over a period of time; user purchasing frequency; user purchasing recency; financial amounts of user expenditures; user purchasing locations, and; user tax deduction categories.

\* \* \* \* \*